United States Patent
Tenmyo

(10) Patent No.: US 6,850,375 B2
(45) Date of Patent: Feb. 1, 2005

(54) LIGHTING APPARATUS AND IMAGE PICKUP APPARATUS

(75) Inventor: Yoshiharu Tenmyo, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 364 days.

(21) Appl. No.: 10/128,767

(22) Filed: Apr. 23, 2002

(65) Prior Publication Data

US 2002/0186972 A1 Dec. 12, 2002

(30) Foreign Application Priority Data

May 10, 2001 (JP) ........................................ 2001-140146
Jul. 6, 2001 (JP) ........................................ 2001-206728
Mar. 28, 2002 (JP) ........................................ 2002-092653

(51) Int. Cl.$^7$ .............................................. G02B 5/04
(52) U.S. Cl. ...................... 359/831; 359/832; 359/833; 359/834; 359/633; 359/642
(58) Field of Search ................................ 359/831–834, 359/633, 642, 726; 362/3, 16, 308–314, 327–331, 359–360, 340

(56) References Cited

U.S. PATENT DOCUMENTS

| | | | | |
|---|---|---|---|---|
| 2,254,962 A | * | 9/1941 | Bitner et al. ................ | 362/327 |
| 5,404,869 A | * | 4/1995 | Parkyn et al. ............... | 126/699 |
| 5,577,492 A | * | 11/1996 | Parkyn et al. ............... | 126/698 |
| 5,813,743 A | | 9/1998 | Naka ............................ | 362/16 |
| 5,884,104 A | | 3/1999 | Chase et al. ................... | 396/6 |
| 6,575,582 B2 | * | 6/2003 | Tenmyo ........................ | 362/16 |

* cited by examiner

Primary Examiner—Mohammad Sikder
(74) Attorney, Agent, or Firm—Robin, Blecker & Daley

(57) ABSTRACT

The present invention discloses a lighting apparatus including a light source, an optical member that is placed in front of the light source and provided with a reflecting surface for reflecting light from the light source or prism sections each made up of a refracting surface which receives the light incident from the light source and a reflecting surface for reflecting the light incident from this refracting surface. Here, in the optical member, there is a plurality of pairs of the reflecting surfaces or prism sections arranged in the direction perpendicular to the optical axis within a plane including the radial direction of the light source centered on the optical axis. The present invention can provide a low-profile lighting apparatus using light from the light source with high efficiency.

21 Claims, 62 Drawing Sheets

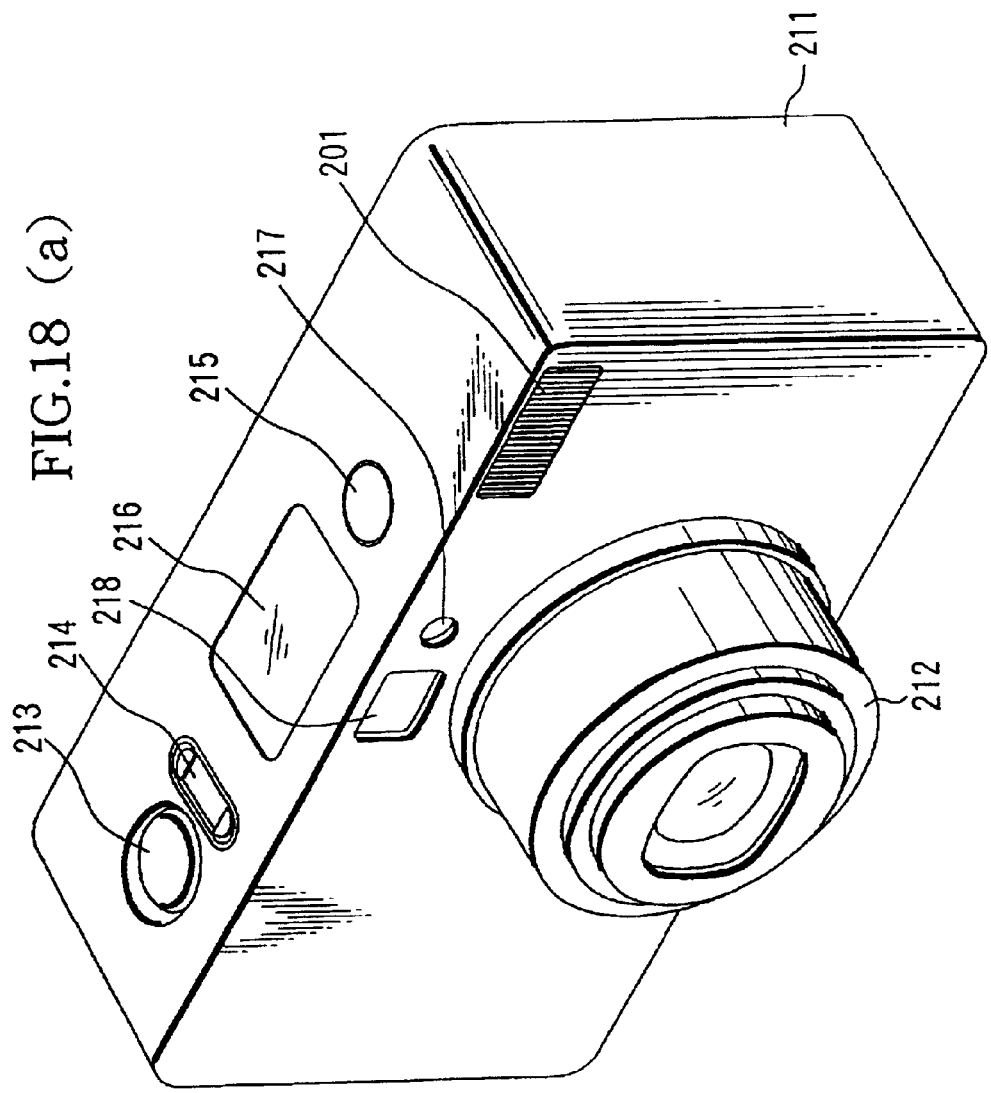

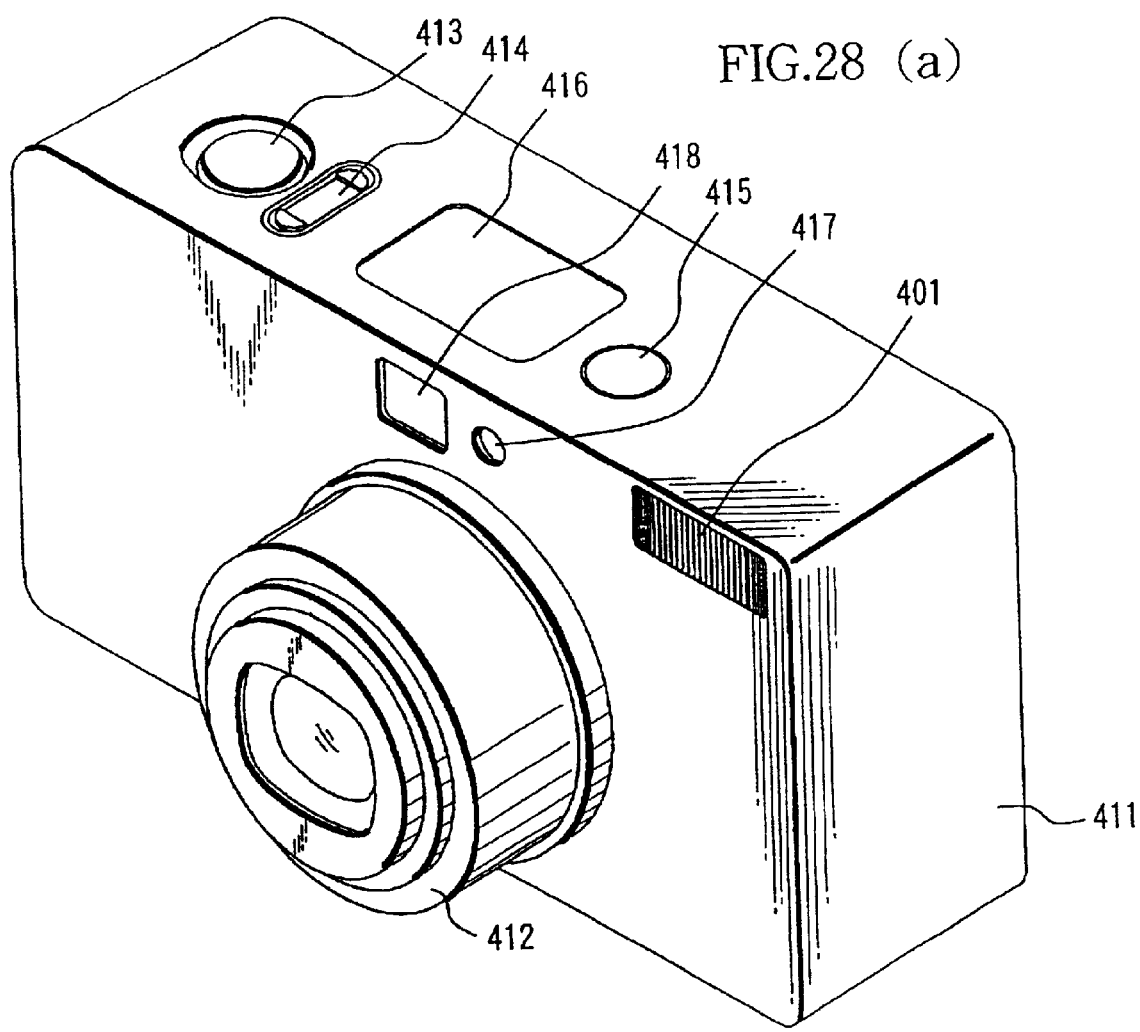

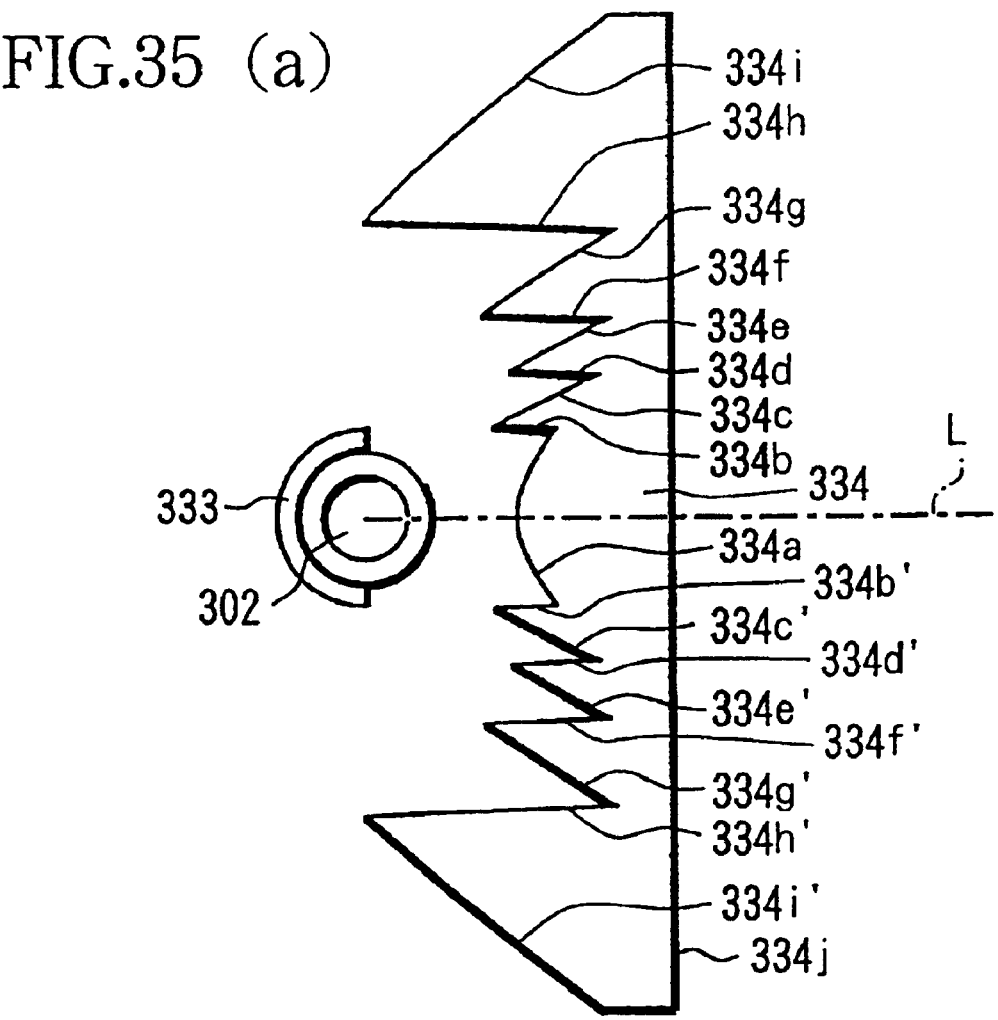

LIGHTING APPARATUS AND IMAGE PICKUP APPARATUS

BACKGROUND OF THE INVENTION

1. Field of the Invention

The present invention relates to a lighting apparatus and an image pickup apparatus equipped therewith.

2. Description of the Related Art

A lighting apparatus used for an image pickup apparatus such as a film camera, digital still camera and video camera is conventionally constructed of a light source and optical members such as a reflector and Fresnel lens that guide a luminous flux generated from this light source forward.

Such a lighting apparatus is available in various designs to efficiently condense the luminous flux irradiated from the light source in various directions within a required irradiation field angle. Especially, there is a proposal of placing optical members using total reflection such as a prism or light guide instead of a Fresnel lens placed in front of the light source so far and thereby improving light condensing efficiency and reducing the size of the apparatus in recent years.

An example of this type of proposal described in Japanese Patent Laid-Open No. 2000-250102 is the one using an optical member provided with a cylindrical lens section having positive refracting property that condenses luminous flux emitted from a light source forward and a prism section that refracts the luminous flux emitted from the light source sideward and then leads the luminous flux forward using a total reflecting surface placed behind. The lighting apparatus according to the proposal in this Publication makes a light distribution from the center of the light source generally uniform by an optical action of the above-described optical member and then irradiates illuminating light from the same plane of outgoing light. This makes it possible to realize a small-sized illumination optical system with high condensing efficiency.

Image pickup apparatuses tend to become much smaller and thinner in recent years than before and there is even a proposal of an extremely thin digital camera such as a card size camera unprecedented by previous arts.

In line with this, a smaller, thinner light source is also an essential condition and there is a strong demand for making commercially feasible an illumination optical system, which will not deteriorate the optical performance under such conditions.

Against such a background, it is also possible to use the lighting apparatus proposed in the above-described Japanese Patent Laid-Open No. 2000-250102 as an ultra-small lighting apparatus.

However, the lighting apparatus proposed in the above-described Publication is still thick in the thickness direction and is not thin enough to be housed in a card size camera. For this reason, this cannot be said as an ideal configuration for a lighting apparatus mounted on a card type camera or card type electronic flash.

SUMMARY OF THE INVENTION

It is an object of the present invention to provide a highly efficient lighting apparatus and image pickup apparatus equipped therewith capable of realizing an extremely thin illumination optical system and providing required optical performance and light distribution characteristic.

In order to attain the above-described object, the lighting apparatus of the present invention includes a light source, an optical member which is placed in front of the light source and provided with a reflecting surface to reflect light from the light source, characterized in that the optical member includes a plurality of the reflecting surface pairs arranged in the direction perpendicular to the longitudinal direction of the light source on both sides of the optical axis.

Furthermore, the optical member can be provided with a plurality of prism section pairs made up of a refracting surface that receives light incident from the light source and a reflecting surface that reflects the light incident from the refracting surface arranged in the direction perpendicular to the longitudinal direction of the light source on both sides of the optical axis.

In the above-described invention, it is possible to form a lens section having positive refracting power on and close to the optical axis on the entrance surface side of the optical member and form the plurality of reflecting surface pairs in the peripheral section.

Furthermore, in the above-described invention, it is also possible to place the edge on the light source side formed by intersection between the refracting surface and the reflecting surface of each prism section closer to the light source side for a prism section which is farther from the optical axis in the direction perpendicular to the longitudinal direction of the light source. In this case, it is also possible to place the edges of one out of the plurality of prism section pairs, farthest from the optical axis in the direction perpendicular to the longitudinal direction of the light source in substantially the same position as the center position of the light source in the direction of the optical axis.

Furthermore, in the above-described invention, it is also possible to include a reflection member which is placed behind the light source and which reflects light from the light source toward the optical member and allow the reflection member to extend to a position to cover at least part of the reflecting surface of one out of the plurality of prism section pairs, farthest from the optical axis in the direction perpendicular to the longitudinal direction of the light source.

Furthermore, in the above-described invention, it is also possible to determine the shape of the each reflecting surface in such a way that the range of light irradiated through each reflecting surface and the range of light irradiated through the lens section practically overlap with each other.

Furthermore, in the above-described invention, it is also possible to make the relation of positions between the light source and the optical member in the direction of the optical axis changeable.

Furthermore, in order to attain the above object, the lighting apparatus according to the present invention includes a light source, an optical member which is placed in front of the light source and a reflection member which is placed in such a way as to cover the back of the light source and the front space between the light source and the optical member, and reflects light irradiated from the light source forward, characterized in that the optical member includes a lens section which is placed on and close to the optical axis on the entrance surface side of the optical member and has positive refracting power and a reflecting section which is placed to the peripheral side of the lens section, provided closer to the optical axis than the area of the reflection member covering the front space through which the reflected light passes, and reflects light from the light source forward.

In the above-described invention, it is possible to form the reflecting section like a prism having a refracting surface that receives light incident from the light source and a reflecting surface that reflects light incident from this refracting surface. In this case, it is also possible to construct the refracting surface of the reflecting section with a flat surface whose gradient with respect to the optical axis is 4° or less. It is also possible to provide a pair or a plurality of the reflecting sections on both sides of the optical axis.

Furthermore, in the above-described invention, it is possible to determine the shape of the reflecting section in such a way that the range of light irradiated through the reflecting section and the range of light irradiated through the lens section and the reflection member substantially overlap with each other.

Furthermore, in the above-described embodiment, it is possible to set an angle α formed by light emitted from the center of the light source and incident on the reflecting section with respect to the optical axis within a range of $20° \leq \alpha \leq 70°$.

Furthermore, in the above-described invention, it is possible to make the irradiation range variable by changing a relation of positions between the light source and the optical member in the direction of the optical axis.

Furthermore, in order to attain the above object, the lighting apparatus according to the present invention includes a light source, an optical member which is placed in front of the light source and provided with a lens section having positive refracting power and being placed on and close to the optical axis on the entrance surface side of this optical member, a first reflection member which is placed in such a way as to cover the back of the light source and the front space between the light source and the optical member and reflects light irradiated from the light source forward and a second reflection member which is placed to the peripheral side of the lens section in the vicinity of the entrance surface of the optical member and closer to the optical axis side than the area through which the light reflected by the part of the first reflection member covering the front space passes and which reflects light from the light source forward.

In the above-described invention, it is possible to provide a pair or a plurality of pairs of the second reflection members on both sides of the optical axis.

Furthermore, in the above-described invention, it is possible to determine the shape of the second reflection member in such a way that the range of light irradiated through the second reflection member, and the range of light irradiated through the lens section and the first reflection member substantially overlap with each other.

Furthermore, in the above-described invention, it is possible to set an angle α formed by the light emitted from the center of said light source and incident on the second reflection member with respect to the optical axis within a range of $20° \leq \alpha \leq 70°$.

Furthermore, in the above-described invention, it is possible to make the irradiation range variable by changing a relation of positions between the light source, the optical member and the second reflection member in the direction of the optical axis.

Then, it is possible to mount the lighting apparatus according to each of the above-described invention on an image pickup apparatus. In this case, the image pickup apparatus can have a card-type configuration.

DETAILED DESCRIPTION OF THE PREFERRED EMBODIMENTS

Figure 1:
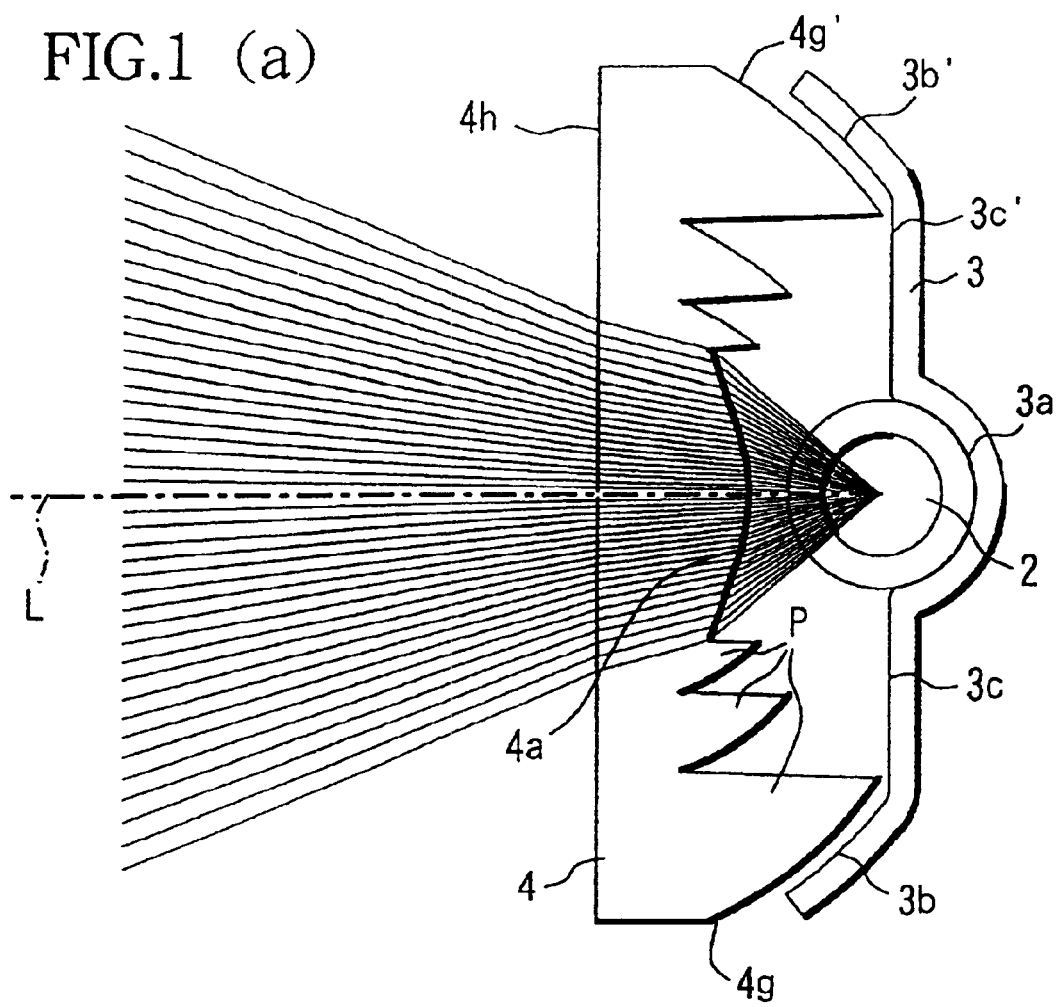
FIG. 1 is a longitudinal sectional view of a lighting apparatus according to an embodiment of the present invention in the radial direction of a discharge tube.
Figure 1:
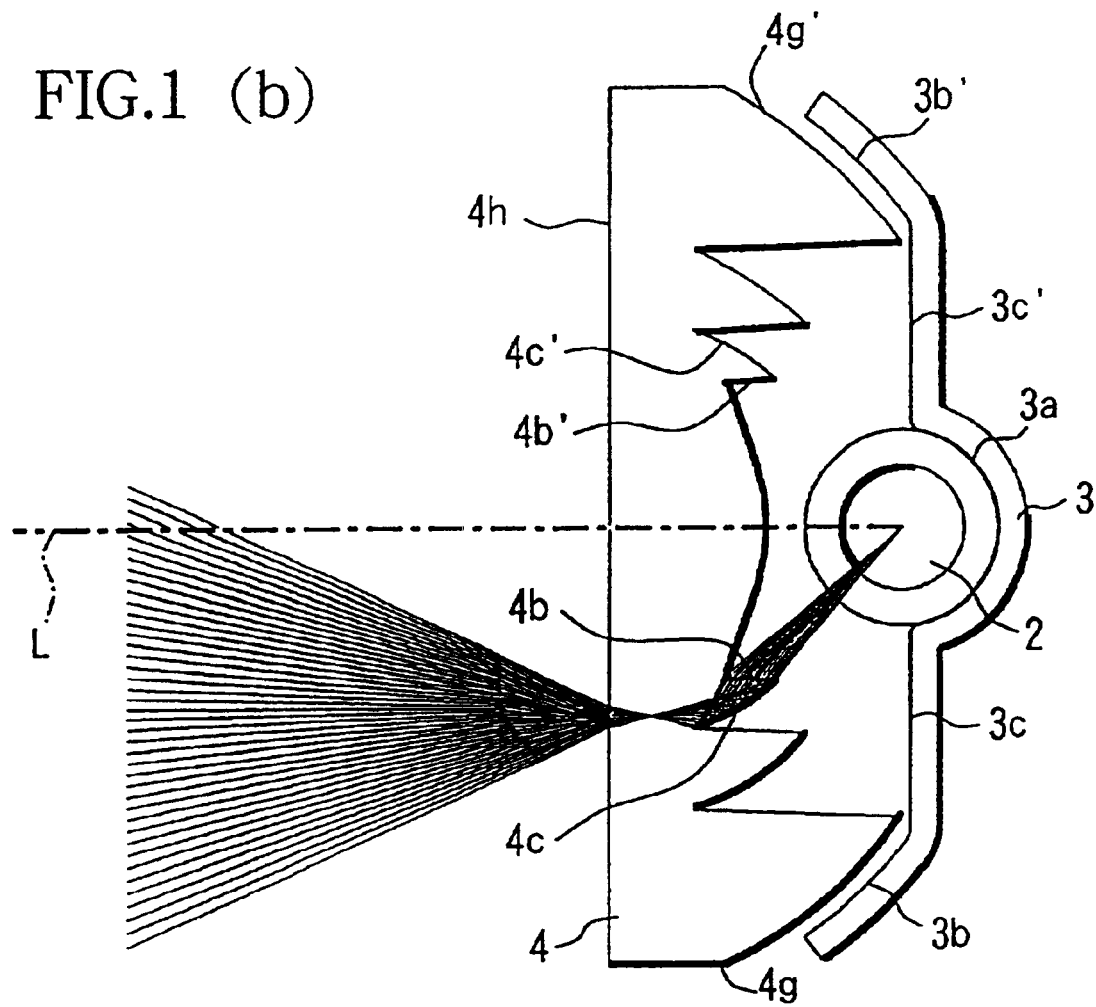
Figure 2:
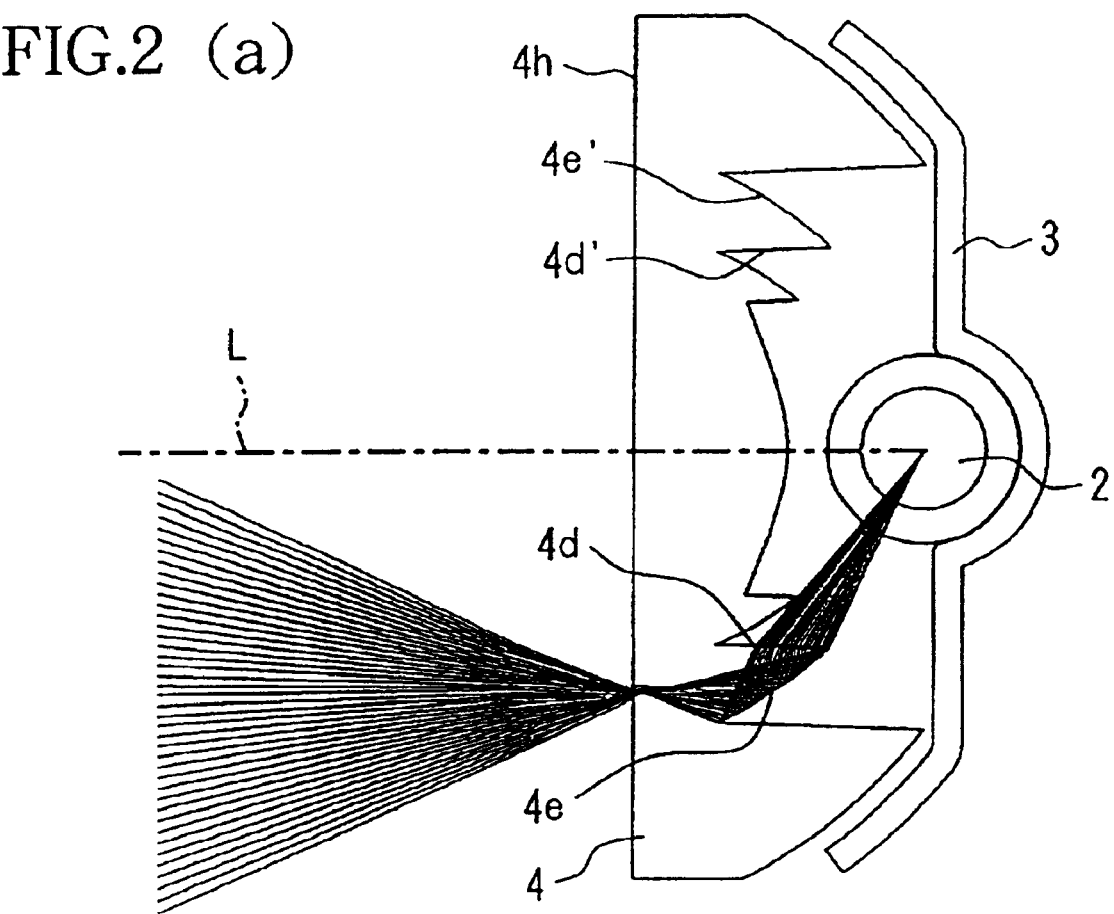
FIG. 2 is a longitudinal sectional view of the lighting apparatus according to the embodiment shown in FIG. 1 in the radial direction of the discharge tube.
Figure 2:
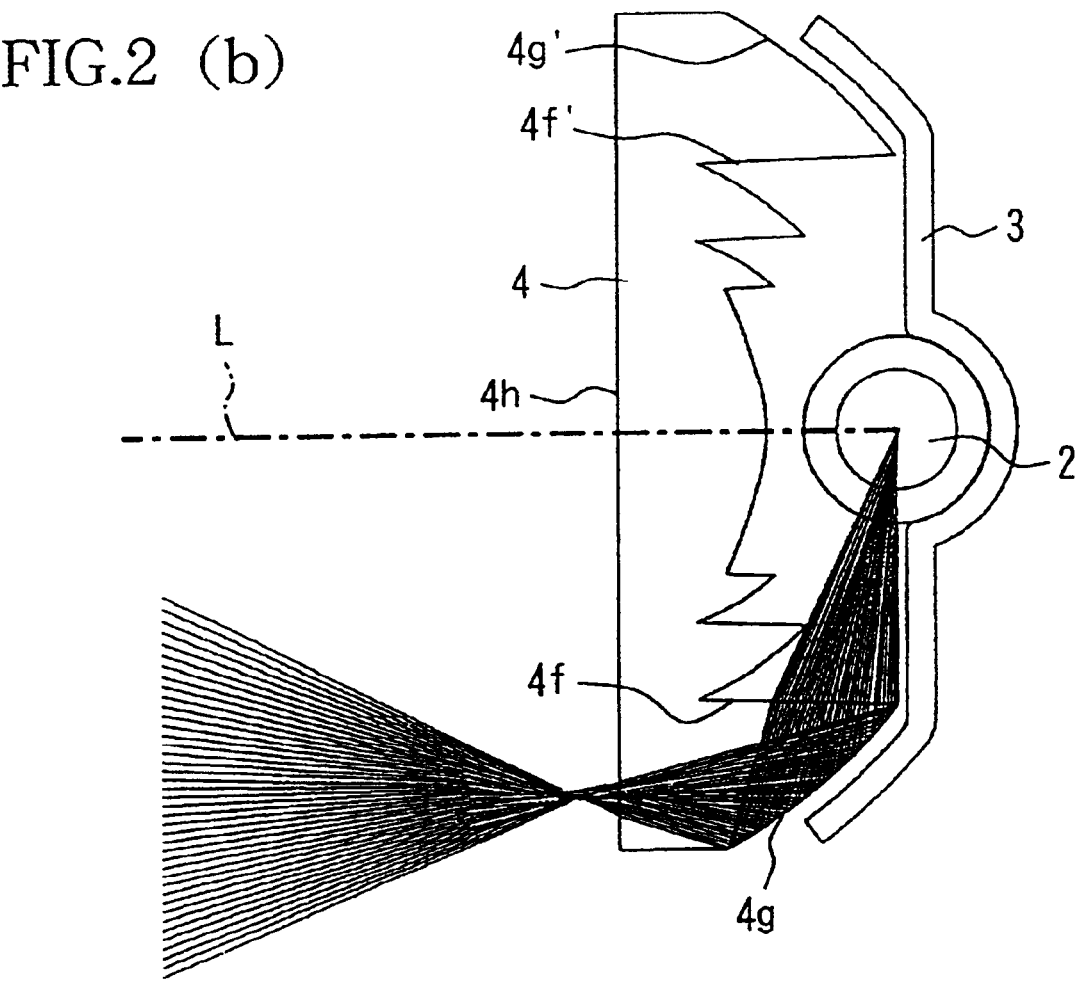
Figure 3:
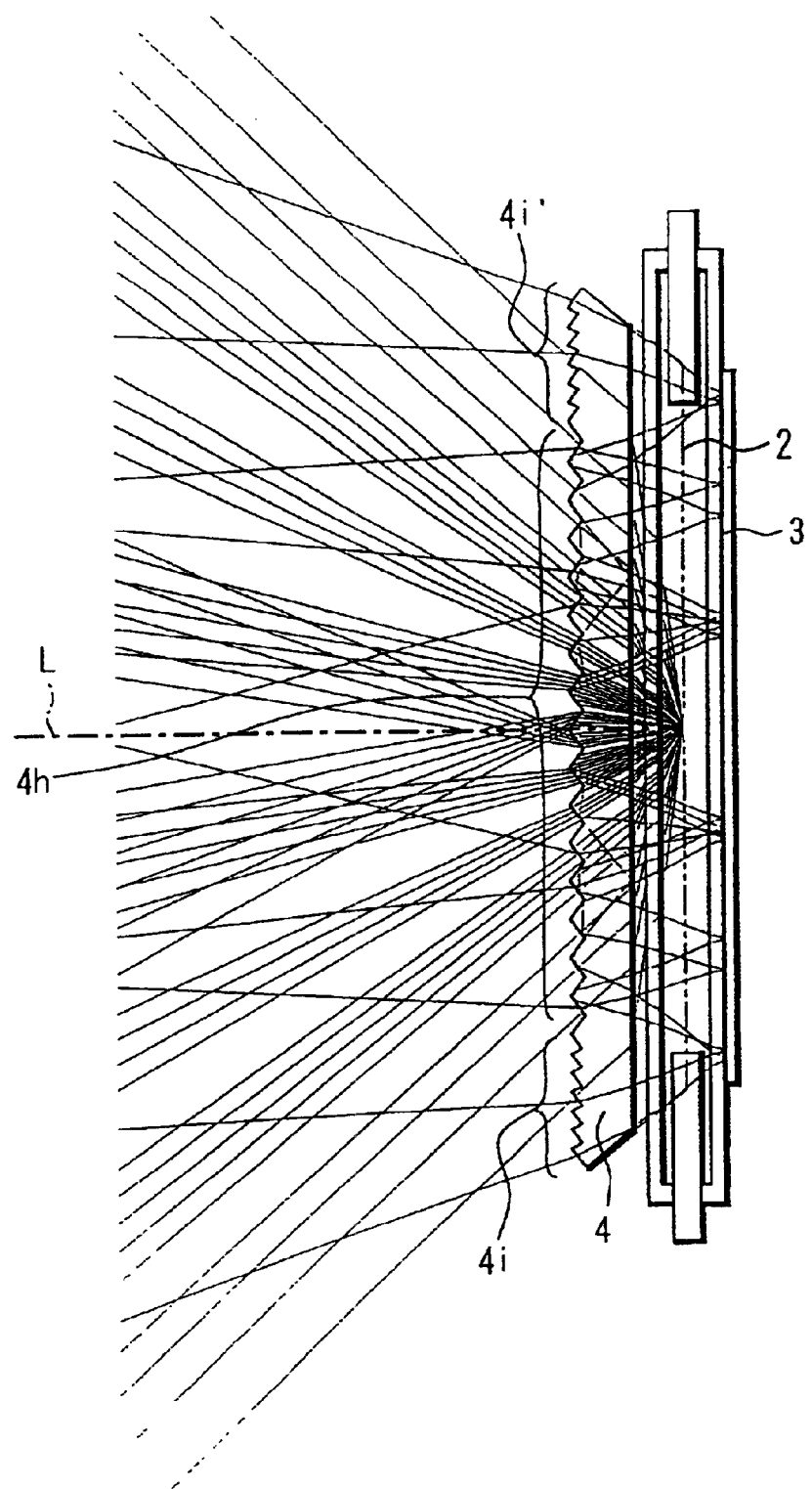
FIG. 3 is a sectional view of the lighting apparatus according to the embodiment shown in FIG. 1 in the axial direction of the discharge tube.
Figure 4:
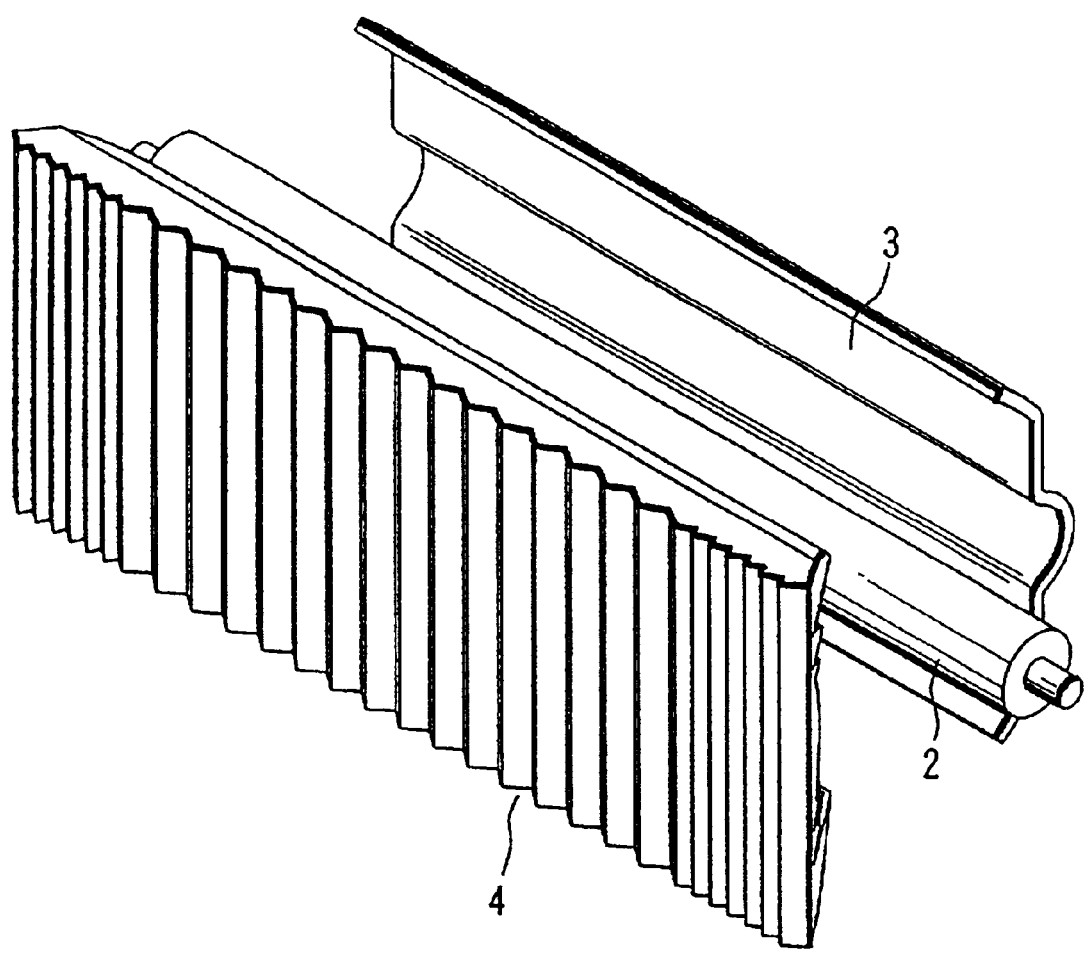
FIG. 4 is an exploded perspective view showing a main optical system of the lighting apparatus according to the embodiment shown in FIG. 1.
Figure 5:
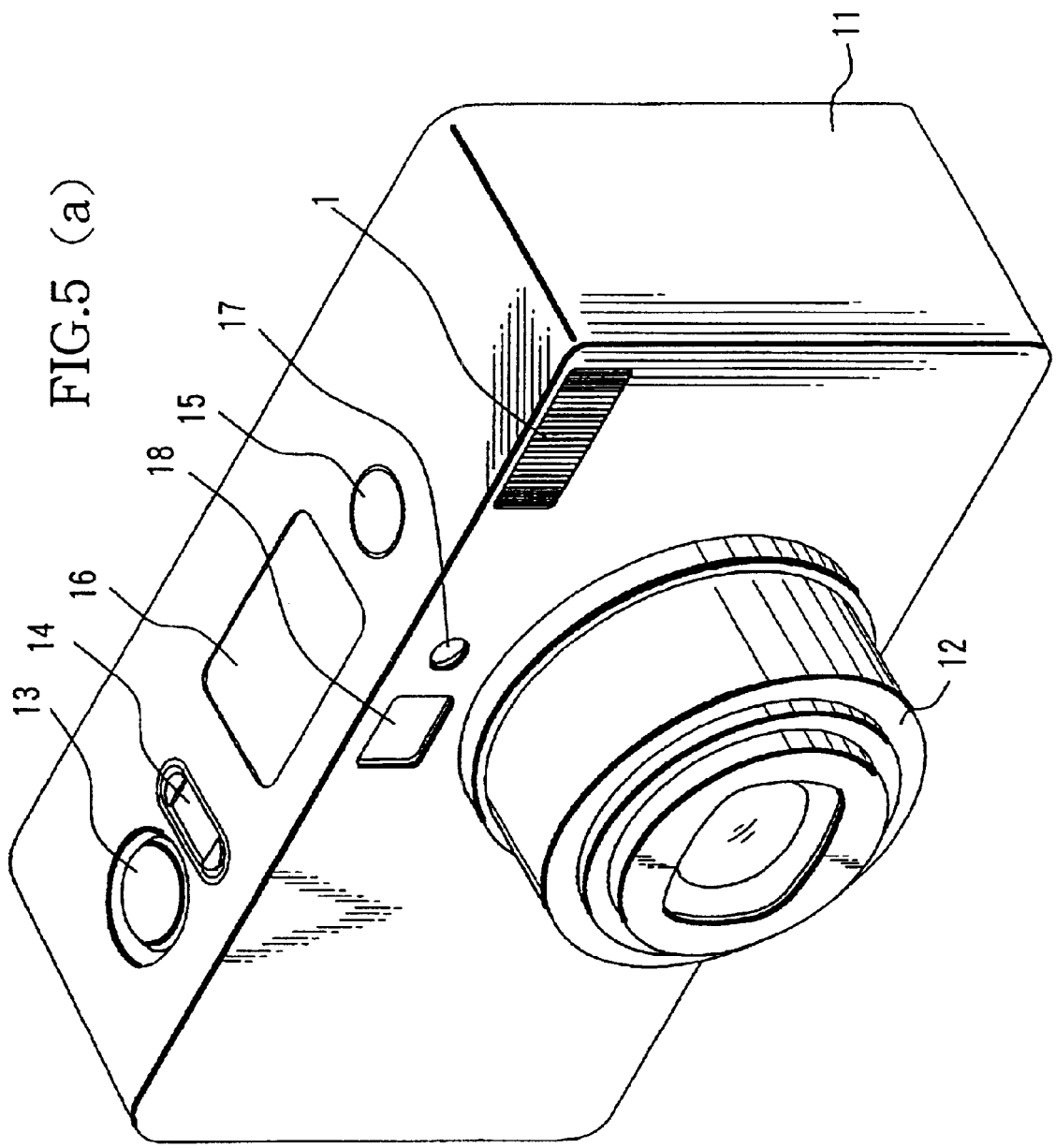
FIG. 5 is a perspective view of a camera equipped with the lighting apparatus according to the embodiment shown in FIG. 1.
Figure 5:
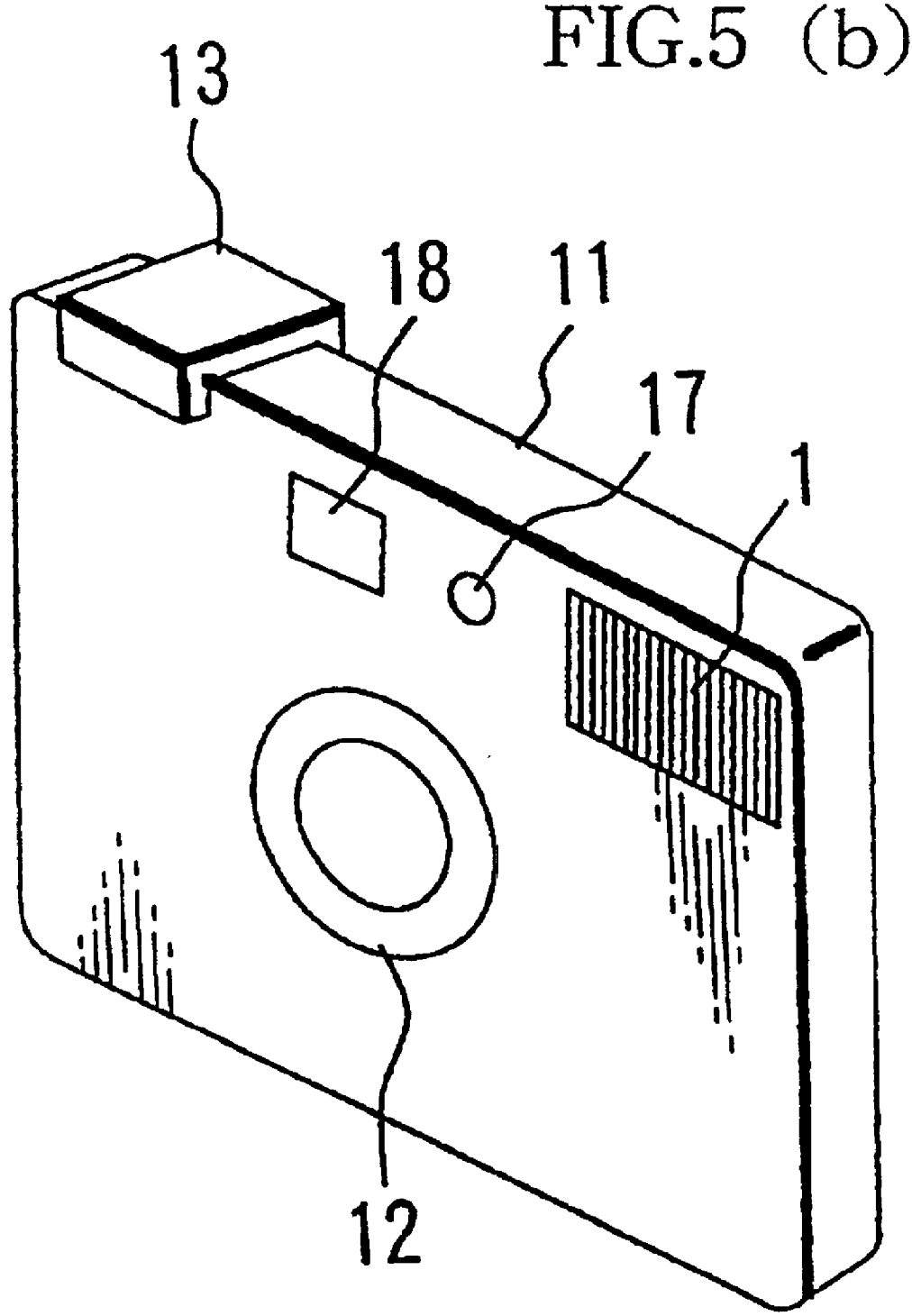

FIG. 1 to FIG. 5 show a camera lighting apparatus, which is an embodiment of the present invention. FIG. 1 and FIG. 2 are sectional views of main members of the optical system of the above-described lighting apparatus on a plane including the radial direction of a discharge tube and the vertical direction (direction perpendicular to the optical axis) of this plane is the direction perpendicular to the longitudinal direction of the discharge tube (light source). FIG. 3 is a sectional view of the above-described lighting apparatus cut with a horizontal plane including the center axis of the discharge tube making up the optical system. FIG. 4 is an exploded perspective view showing the main optical system of the above-described lighting apparatus and FIG. 5 is a perspective view of a camera equipped with the above-described lighting apparatus.

FIG. 1 to FIG. 3 also show traced drawings of representative light beams emitted from the center of the discharge tube, which is the light source, and especially FIG. 1(a), 1(b) and FIG. 2(a), 2(b) show the luminous flux emitted from the center of the light source on the same section segmentized according to the position of the incident light.

FIG. 5(a) shows a compact camera and FIG. 5(b) shows a card type camera. In these figures, reference numeral 11 denotes the body of the camera and reference numeral 1 denotes a lighting apparatus placed at the top of the body of the camera 11. Reference numeral 12 denotes picture-taking lens and reference numeral 13 denotes a shutter release button.

In FIG. 5(a), reference numeral 14 denotes an operation member to zoom the picture-taking lens 12 and depressing this operation member 14 frontward allows an image to zoom in and depressing this operation member 14 backward allows an image to zoom out.

Furthermore, reference numeral 15 denotes a mode setting button to switch between various modes of the camera and reference numeral 16 denotes a liquid crystal display window to inform the user of the operation of the camera.

In FIGS. 5(a) and 5(b), reference numeral 17 denotes a light receiving window of a photometer to measure the brightness of external light and reference numeral 18 denotes an inspection window of a finder.

Then, the members that determine an optical characteristic of the lighting apparatus will be explained in detail using FIG. 1 to FIG. 4.

In these figures, reference numeral 2 denotes a cylindrical discharge tube (xenon tube). Reference numeral 3 denotes a reflector that reflects forward the member of the luminous flux emitted from the discharge tube 2 and directed backward in the direction of the irradiation optical axis. This reflector 3 has a high-reflectance inner surface made of a metallic material such as radiant aluminum, or is made of a resin material having an inner surface on which a high-reflectance metal-evaporated surface is formed.

Reference numeral 4 denotes a prism-like one-piece optical member and on the entrance surface of light from the discharge tube 2, there is a plurality of prism section pairs P made up of refracting surfaces 4b, 4d, 4f, 4b', 4d', 4f' having refracting power in the direction perpendicular to the longitudinal direction of the discharge tube 2 and reflecting surfaces 4c, 4e, 4g, 4c', 4e', 4g' that almost satisfy a total reflection condition for the light incident from these refracting surfaces arranged in the direction perpendicular to the longitudinal direction of the above-described discharge tube 2 on both sides of the optical axis L.

Furthermore, as shown in FIG. 3, on the plane of outgoing light of the optical member 4 is a prism array 4h having refracting power in the longitudinal direction of the discharge tube 2. As the material of the optical member 4, a high transmittance optical resin material such as acrylic resin or glass material is suitable.

In the above-described configuration, in the case where the camera is set, for example, to "electronic flash auto mode", after the shutter release button 13 is pressed by the user, a control circuit (not shown) decides whether light should be emitted from the lighting apparatus 11 or not based on the brightness of external light measured by a photometer (not shown), sensitivity of the film loaded or the characteristic of an image pickup device such as a CCD or CMOS.

When the control circuit decides that "light should be emitted from the lighting apparatus", the control circuit outputs a light-emitting signal and allows the discharge tube 2 to emit light through a trigger lead wire attached to the reflector 3.

Of the luminous flux emitted from the discharge tube 2, the luminous flux component emitted backward in the direction of the irradiation optical axis L enters the optical member 4 placed in front of the discharge tube 2 through the reflector 3 and the luminous flux component emitted forward in the direction of the irradiation optical axis directly enters the optical member 4. These both luminous flux components are changed to luminous flux having a predetermined light distribution characteristic through the optical member 4 and then irradiated onto an object.

Hereafter, in the above-described lighting apparatus 11, a setting of an optimal shape to keep the light distribution characteristic uniform within the required irradiation range while significantly slimming the overall shape of the lighting optical system in particular will be explained using FIG. 1 to FIG. 3.

First, a basic concept for optimizing the light distribution characteristic in the direction perpendicular to the longitudinal direction (vertical direction) of the discharge tube 2 will be explained using FIG. 1 and 2. All FIG. 1(a), 1(b) and FIG. 2(a), 2(b) show the same section and show different light beam tracing lines in different cases.

These figures show inner and outer diameters of the glass tube making up the discharge tube 2. In an actual light-emitting phenomenon of this type of discharge tube, light is often emitted from the full inner diameter to improve the efficiency and it is reasonable to consider that light is emitted virtually uniformly from light-emitting points across the full inner diameter of the discharge tube 2. However, for simplicity of explanation, suppose the luminous flux emitted from the center of the discharge tube 2 is representative luminous flux and the figures only show luminous flux emitted from the center of the discharge tube 2.

As an actual light distribution characteristic, the light distribution characteristic as a whole changes in a direction in which luminous flux spreads slightly due to luminous flux emitted from the periphery of the discharge tube 2 in addition to the representative luminous flux as shown in the figures, but this luminous flux has almost an identical tendency of light distribution characteristic, and therefore the following explanations will be based on this representative luminous flux.

First, the characteristic shape of the optical system of the above-described lighting apparatus will be explained one by one. The shape of the back of the reflector 3 in the direction of the irradiation optical axis is semi-cylindrical (hereinafter referred to as "semi-cylindrical section 3a") almost concentric with the discharge tube 2. This is a shape, which is effective to return the reflected light at the reflector 3 to close to the center of the discharge tube 2 again, and has the effect of preventing adverse influences from refractions of the glass part of the discharge tube 2.

Furthermore, such a configuration makes it possible to handle the light reflected by the reflector 3 as the outgoing light almost equivalent to the direct light from the discharge tube 2, and thereby reduce the size of the entire optical system. Furthermore, the reason that the reflector 3 has a semi-cylindrical shape is that having a size smaller than this will require the size of the optical member 4 to be increased to condense sideward luminous flux, while having a size larger than this will increase luminous flux trapped inside the reflector 3, resulting in a reduction of efficiency.

On the other hand, the upper and lower peripheral sections of the reflector 3 are shaped (hereinafter referred to as "curved surface section 3b, 3b'") so as to cover the back of the reflecting surfaces 4g and 4g' placed in such a way that the boundary edge E between the refracting surfaces 4f and 4f' of the outermost prism section in the vertical direction of the prism sections P of the optical member 4 and the reflecting surface 4g and 4g' is located at almost the same position as the center of the discharge tube 2 in the direction of light axis.

This is because, the luminous flux emitted from the center of the discharge tube 2 can be ideally reflected (totally reflected) by the reflecting surfaces 4g and 4g' as shown in FIG. 2(b), whereas some of the luminous flux emitted from the front side of the discharge tube 2 (left to the center of the discharge tube 2 in the figure), especially when the discharge tube 2 has a large inner diameter, cannot satisfy the total reflection condition on the reflecting surfaces 4g and 4g' and cannot be totally reflected, thereby including a luminous flux component that goes out of the reflecting surfaces 4g and 4g'. It is for this reason that the above-described shape is adopted for the reflector 3 in order to effectively use this luminous flux.

In this way, by extending the shape of the reflector 3 over the upper and lower sides of the optical member 4 along the shapes of the reflecting surfaces 4g and 4g' as shown in the figure, it is possible to allow the luminous flux which cannot be totally reflected by the reflecting surfaces 4g and 4g' and which goes out of the reflecting surfaces 4g and 4g', to reenter the optical member 4 and also lead the reflected luminous flux to within a predetermined irradiation range efficiency.

Then, the shape of the optical member 4 that has the largest influence on the light distribution characteristic of the above-described lighting apparatus 11 will be explained. In order for the optical member 4 to obtain a light distribution capable of uniformly illuminating the required irradiation range with the thinnest shape in the direction of the optical axis, this embodiment determines the shapes of its members as follows.

As shown FIG. 1(a), the luminous flux emitted from the discharge tube 2 toward the vicinity of the irradiarion optical axis passes through a cylindrical lens surface 4a formed in the central area (the area is placed on and close to the optical axis L. In other words, the optical axis L passes through the area.) of the entrance surface of the optical member 4 that gives positive refracting power, is changed to a luminous flux having a uniform light distribution characteristic within a predetermined angle range and then goes out of the exit surface 4h.

Here, in order to provide a uniform light distribution characteristic, the cylindrical lens surface 4a of this embodiment is constructed to have a continuous non-spherical shape so that the angle of the light going out of the center of the discharge tube 2 is proportional to the angle of the light going out of the cylindrical lens surface 4a and the light is condensed at a certain rate.

Then, the luminous flux component shown in FIG. 1(b), that is, the luminous flux component emitted from the center of the discharge tube 2 upward and downward at a slightly greater angle than that of the luminous flux component shown in FIG. 1(a) above (however, the figure will show only the luminous flux component emitted downward hereafter) will be explained.

This luminous flux component is refracted through first refracting surfaces 4b and 4b' made up of flat surfaces, enters into the prism section P and then most of the luminous flux component is totally reflected by the first reflecting surfaces 4c and 4c' made up of predetermined curved surfaces and changed to a luminous flux having a light distribution characteristic almost equivalent to the irradiation angle distribution in FIG. 1(a).

Here, the angle range of the luminous flux component incident on the refracting surfaces 4b and 4b' is much narrow than the incident angle range of the luminous flux component shown in FIG. 1(a). For this reason, fitting the above-described member within the irradiation angle range shown in FIG. 1(a) requires the first reflecting surfaces 4c and 4c' to be shaped so that the angle range of the luminous flux is spread considerably at a certain rate. Optimizing the shapes of the first reflecting surfaces 4c and 4c' based on this concept makes it possible to almost match the resulting irradiation angle range as shown in the figure with the irradiation range shown in above-described FIG. 1(a).

Furthermore, as shown in FIG. 2(a), the luminous flux component which is emitted from the center of the discharge tube 2 upward and downward at a greater angle than that of the luminous flux component of above-described FIG. 1(b) is refracted through the second refracting surfaces 4d and 4d' made up of flat surfaces, enters into the prism section P, and most of the luminous flux is totally reflected by the second reflecting surfaces 4e and 4e' made up of predetermined curved surfaces and changed to a luminous flux with a uniform light distribution characteristic almost equivalent to the irradiation angle distribution in above-described FIG. 1(a) and 1(b).

Even in this case, the angle range of the luminous flux incident on the second refracting surfaces 4d and 4d' is much narrower range than the angle range of the luminous flux shown in FIG. 1(a) as in the case of FIG. 1(b), and fitting the above-described luminous flux component within the irradiation angle range shown in FIG. 1(a) requires the second reflecting surfaces 4e and 4e' to be shaped so that the angle range of the luminous flux is spread considerably at a certain rate. Optimizing the shapes of the second reflecting surfaces 4e and 4e' based on this concept makes it possible to almost match the resulting irradiation angle range as shown in the figure with the irradiation range shown in above-described FIG. 1(a).

Furthermore, as shown FIG. 2(b), the luminous flux component emitted from the discharge tube 2 upward or downward at the greatest irradiation angle is refracted through the third incident surfaces 4f and 4f' made up of flat surfaces, enters into the prism section P, and most of the luminous flux is totally reflected by the third reflecting surfaces 4g and 4g' made up of predetermined curved surfaces, changed to a luminous flux having a uniform light distribution characteristic almost equivalent to the irradiation angle distribution in above-described FIG. 1(a), 1(b) and 1(c) and then goes out of the plane 4h.

Thus, in the sections shown in FIG. 1 and FIG. 2, all the luminous flux emitted from the center of the discharge tube 2 are divided into luminous flux components of a total of 7 areas by optical actions of the cylindrical surface 4a and 6 pairs of refracting surfaces and reflecting surfaces in FIG. 1(a). However the irradiation angle ranges of the luminous flux components of these areas overlap with each other and form a uniform light distribution on the irradiation surface.

Thus, segmentizing the shapes of the first to third reflecting surfaces into smaller portions than the conventional arts makes it possible to obtain effects specific to this embodiment unprecedented by the conventional arts.

First, the reflecting surfaces are not placed continuously in the direction of the optical axis as in the cases of the conventional arts, but placed discretely and a plurality of reflecting surface layers is placed in the vertical direction perpendicular to the irradiation optical axis L in such a way as to overlap one another, which makes it possible to significantly reduce the thickness of the lighting optical system in the vertical direction including the optical member 4.

That is, placing the first reflecting surfaces 4c and 4c' outside the cylindrical lens surface 4a symmetrically in the vertical direction, placing the second reflecting surfaces 4e and 4e' symmetrically in the vertical direction outside the area of the reflecting surfaces 4c and 4c' where the positions in the direction of the optical axis overlap one another and placing the third reflecting surfaces 4g and 4g' symmetrically in the vertical direction outside the areas of the above-described two reflecting surfaces 4c, 4c', 4e and 4e' where the positions in the direction of the optical axis overlap one another makes it possible to reduce the thickness of the reflecting surface as a whole in the direction of the optical axis to a half or less. By adopting such arrangement, this embodiment makes it possible to construct a lighting optical system capable of obtaining a predetermined light distribution characteristic with a thickness as small as approximately 4 mm.

Second, constructing a plurality of surfaces having total reflex action can prevent the problem of a conventional light guide type electronic flash, that is, the problem that when an optical member generally made of a resin optical material is placed close to a light source, the optical member is melted by heat produced by the light source and it is impossible to obtain the original optical characteristic depending on the light-emitting condition.

That is, by constructing the reflecting surface with a plurality of layers, it is possible to place the edge E, which is a boundary between the refracting surface and reflecting surface of the optical member 4 which is most vulnerable to heat, away from the light source, minimize the influence of radiant heat and convection heat produced during continuous light emission on the optical resin material and prevent deterioration of the optical characteristic.

Third, it is possible to construct a lighting optical system, which is small but with little efficiency deterioration. That is, since the reflecting surface is basically constructed as a surface with total reflex action, there is little efficiency deterioration, there is also fewer luminous flux components emitted from other than the center of the light source whose irradiation direction drastically changes thus providing high efficiency.

Furthermore, the reflector 3 is constructed of three parts of a semi-cylindrical section 3a, curved surface sections 3b and 3b' and flat surface sections 3c and 3c' and the flat surface sections 3c and 3c' constitute reflectors capable of effectively utilizing luminous flux by reflecting the luminous flux components emitted from the front (left side in the figure) of the center of the light source and directed diagonally backward. Thus, constructing this surface with a flat surface makes it possible to efficiently irradiate light within the required irradiation angle range of luminous flux emitted from other than the center.

Thus, it is possible to construct a small and highly efficient lighting optical system with little loss of light quantity to the outside of the required irradiation range using only a small number of members of the reflector 3 and optical member 4.

Then, a condensing action in the longitudinal direction of the discharge tube 2 according to this embodiment will be explained using FIG. 3.

FIG. 3 is a sectional view of the discharge tube 2 cut with a plane including the center axis accompanied by a traced drawing of light beams from the center of the light source. As shown in the figure, the exit surface of the optical member 4 is constructed of a prism array 4h having two slopes of the same angle formed in the central area and Fresnel lens sections 4i and 4i' formed in the peripheral sections.

This embodiment sets a constant angle of 105° as the apex angle of each of the prism array 4h in the central area. The prism array 4h with such an angle setting has the effect of allowing luminous flux components with a relatively large angle of incidence (luminous flux components with the angle of incidence on the optical member 4 ranging 30° to 40°) to go out of the exit surface with the same angle at which light is refracted through the entrance surface, that is, allowing luminous flux components to go out of the exit surface without being affected by refraction on the exit surface, having the effect of condensing incident luminous flux as luminous flux within a certain range of irradiation angles.

This embodiment shows an example where the apex angle of this prism array 4h is set to 105°, but the angle setting is not limited to this, and setting an angle smaller than this angle, for example, 90° makes it possible to set a narrower irradiation angle for luminous flux emitted from the optical member 4, and on the contrary, setting an angle greater than this angle, for example, 120° makes it possible to set a wider irradiation angle for luminous flux emitted from the optical member 4.

On the other hand, as shown in FIG. 3, there are also some outgoing luminous flux components, which are totally reflected by this prism array 4h and returned to the discharge tube 2 again. This luminous flux component is reflected by the reflector 3 and entered into the optical member 4 again, changed to a predetermined angle member by the prism array 4h and then irradiated onto an object.

Thus, most of luminous flux emitted from the center of the discharge tube 2 is changed to luminous flux with a certain angle distribution and irradiate out of the optical member 4. In this case, the light distribution is solely dependent on the angle setting of the prism array 4h and is not affected by the pitch, etc. of the prism array 4h, and therefore allows condensing control in an extremely shallow area without the need for the depth in the direction of the optical axis. Therefore, this makes it possible to drastically reduce the overall size of the lighting optical system.

Furthermore, as shown in the figure, Fresnel lens sections 4i and 4i' are formed on the exit surface on the periphery of the optical member 4. Though the optical member 4 is considerably thin, there is an area in this peripheral section where luminous flux with certain directivity is obtained and forming the Fresnel lens in this area allows relatively efficient condensing action.

In the figure, no conspicuous condensing operation in this portion is observable. This is because only luminous flux emitted from the center of the discharge tube 2 is shown and most of luminous flux emitted from around the end of the discharge tube 2 is changed to members that concentrate on the irradiation optical axis L.

Thus, determining the shape of the exit surface of each section of the optical member 4 allows even an extremely thin lighting optical system placed near the discharge tube 2 to condense luminous flux within a certain angle range efficiently.

Figure 6:
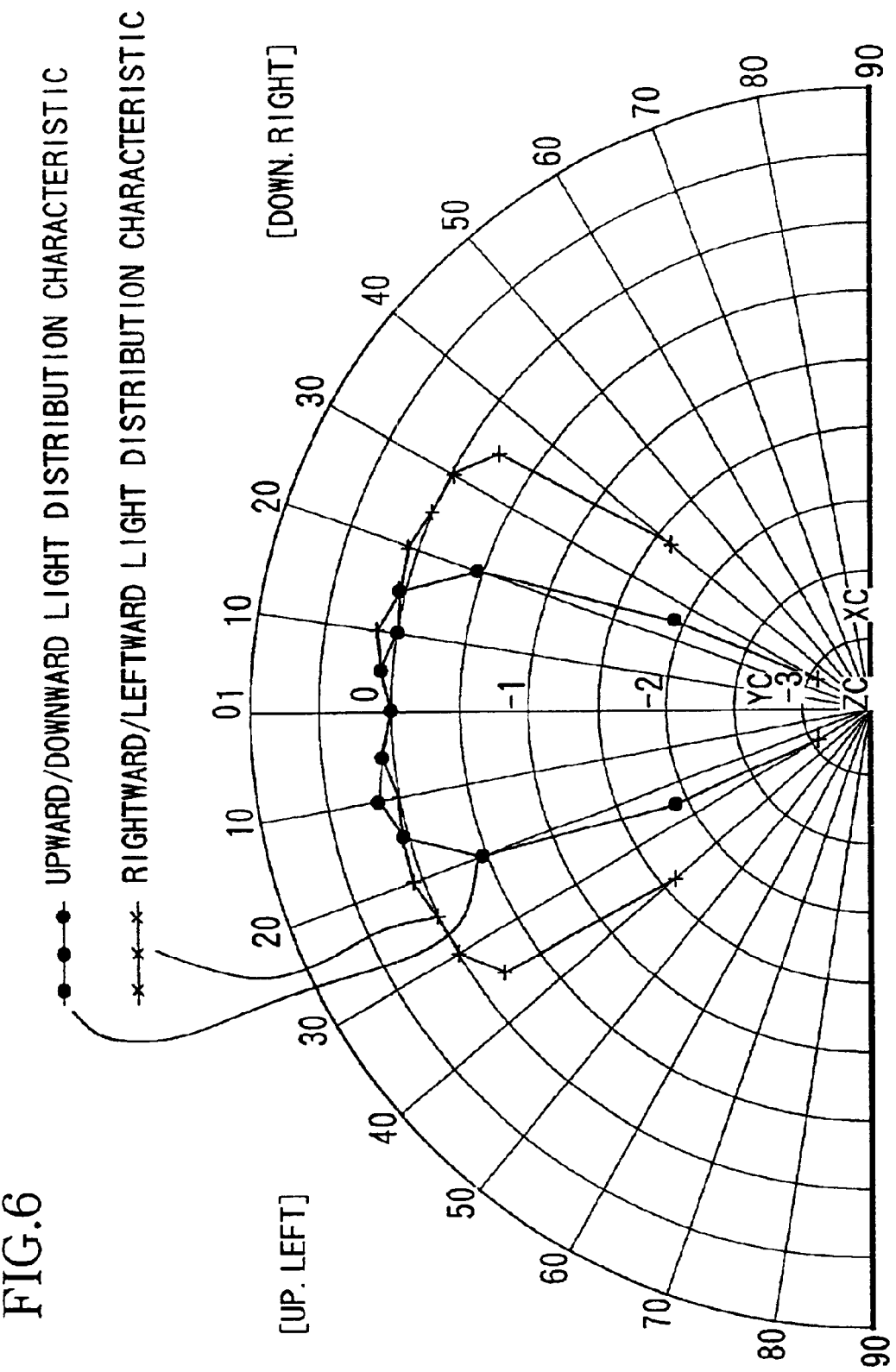
FIG. 6 is a light distribution characteristic diagram of the lighting apparatus according to the embodiment shown in FIG. 1.

FIG. 6 shows an actual light distribution characteristic diagram obtained in the optical system configuration in this embodiment. As shown in the figure, this embodiment can obtain a uniform light distribution characteristic within a certain angle range and obtain a characteristic of an ideal lighting optical system in which almost no light is irradiated outside the required irradiation angle range.

Thus, this embodiment performs condensing control for the longitudinal direction of the discharge tube 2 using the prism array 4h and Fresnel lens sections 4i and 4i' on the side of the exit surface of the optical member 4 and performs efficient condensing control for the direction quasi-perpendicular (vertical direction) to the longitudinal direction of the discharge tube 2 using the cylindrical lens surface 4a and a plurality of pairs of reflecting surfaces 4c, 4e, 4g, 4c', 4e' and 4g' placed on the side of the entrance surface of the optical member 4. This provides an ultra-thin lighting optical system with an excellent optical characteristic unprecedented by the previous arts.

This embodiment has described the case where light distribution control with respect to the direction quasi-perpendicular (vertical direction) to the longitudinal direction of the discharge tube 2 is set in such a way as to obtain a quasi-identical light distribution to be controlled by the cylindrical lens surface 4a and a plurality of pairs of reflecting surface 4c, 4e, 4g, 4c', 4e' and 4g' placed on the side of the entrance surface of the optical member 4. However, light distribution control is not limited to this embodiment, but different light distributions may also be used in the case where the light source has a size of a certain value or greater.

That is, the irradiation angle of a cylindrical lens surface close to the light source tends to spread considerably when the light source is quite large. On the other hand, when the reflecting surface is located farthest from the light source, the degree of condensing does not deteriorate even if the size of the light source increases to a certain degree, providing a distribution not quite different from the initially set irradiation angle distribution.

Thus, the cylindrical lens surface whose control surface is close to the light source is set so that the distribution of luminous flux emitted from the center of the light source becomes narrower than a predetermined desired light distribution.

Likewise, it is desirable to set a light distribution after reflection for each reflecting surface according to the position from the center of the light source one by one instead of setting an coincidental light distribution uniformly.

That is, it is desirable to preset a reflecting surface close to the light source so that the angle distribution of luminous flux from the center of the light source becomes narrower and preset a reflecting surface away from the light source so that the angle distribution of luminous flux from the center of the light source has a desired light distribution characteristic in the case where this lighting optical system is applied to a light source having a certain finite size which is negligible.

Furthermore, this embodiment has described the case where each surface configuration on the entrance surface and each surface configuration on the exit surface of the optical member 4 are symmetric with respect to the optical axis, but this embodiment is not limited to such a symmetric shape.

In this embodiment, the optical member 4 is constructed of three layers of reflecting surfaces on both sides of the optical axis, but the optical member 4 need not always be constructed of the same number of layers of reflecting surfaces. For example, two layers of reflecting surfaces are provided on the upper side and three layers of reflecting surfaces are provided on the lower side. The two layers in the upper and lower sides form a pair in this case, too.

Likewise, with respect to the prism array 4h formed in the central area on the exit surface of the optical member 4, it is also possible to use prisms having different angle settings for the right and left sides to provide variations in the light distribution characteristic in right and left directions. Moreover, with respect to the Fresnel lens sections 4i and 4i' in the peripheral section, it is also possible to provide variations in the degree of condensing to provide variations in the overall light distribution characteristic.

Figure 7:
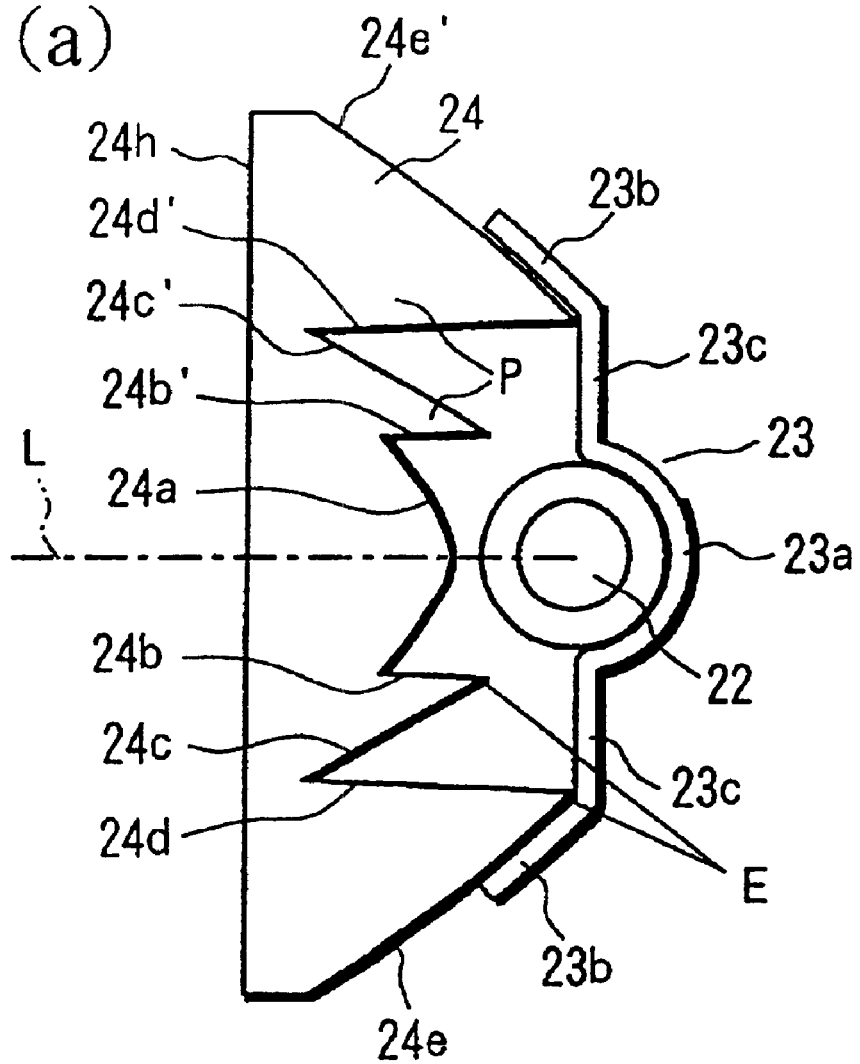
FIG. 7 is a longitudinal sectional view of a lighting apparatus, which is another embodiment of the present invention in the radial direction of a discharge tube.
Figure 7:
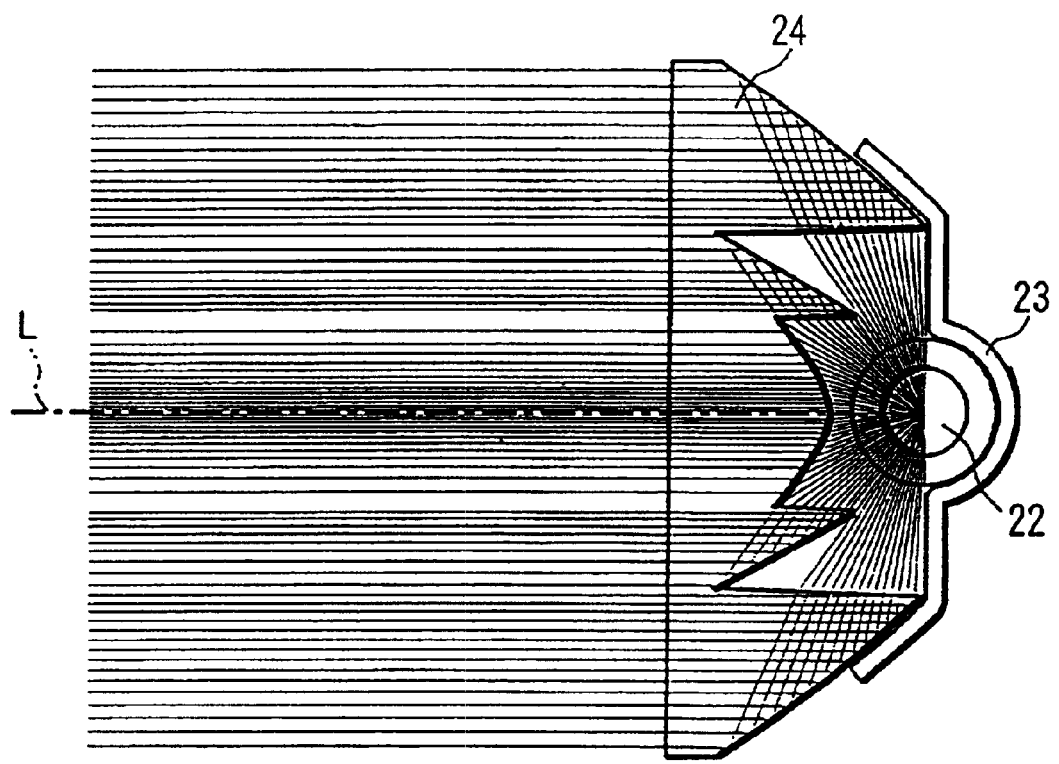
Figure 8:
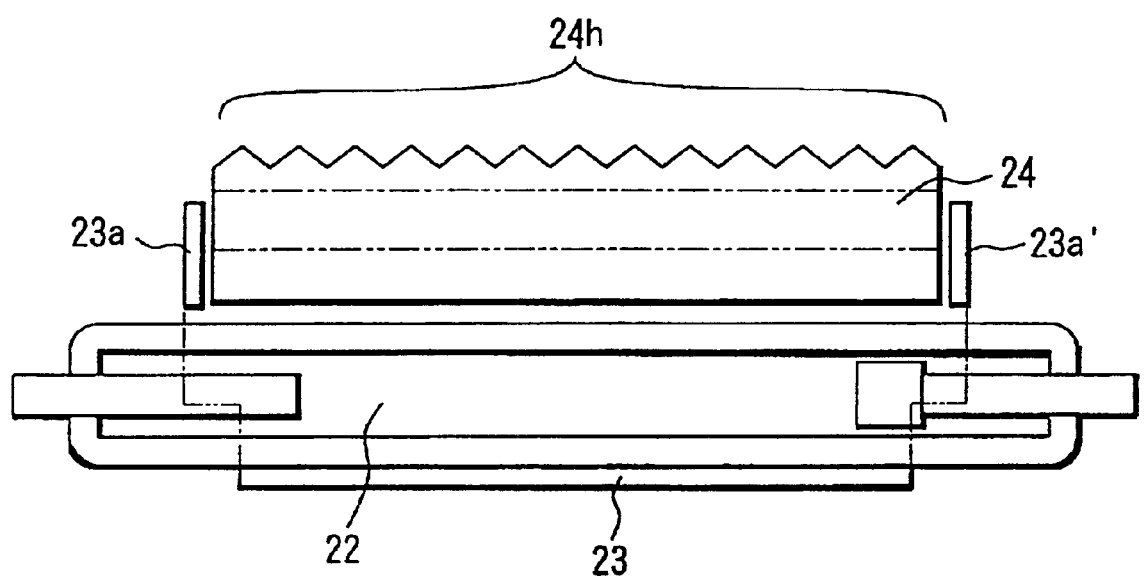
FIG. 8 is a sectional view of the lighting apparatus according to the embodiment shown in FIG. 7 in the axial direction of the discharge tube.
Figure 9:
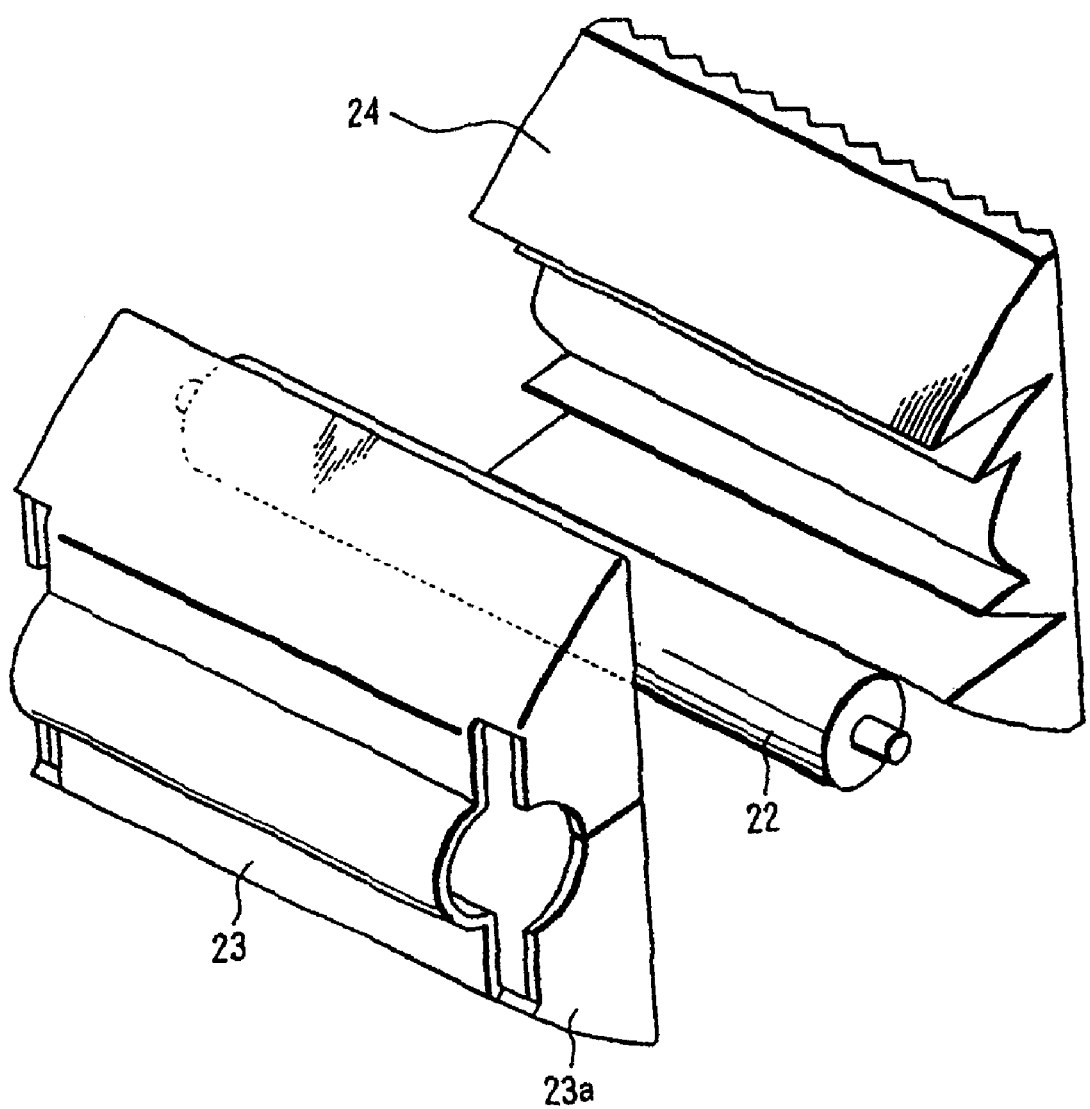
FIG. 9 is an exploded perspective view of the main optical system viewed from the back of the lighting apparatus according to the embodiment shown in FIG. 7.

FIG. 7 to FIG. 9 show the lighting apparatus, which is another embodiment of the present invention. FIG. 7(a) is a sectional view of main members of the optical system of the above-described lighting apparatus cut with a plane including the radial direction of the discharge tube and FIG. 7(B) in which the vertical direction (direction perpendicular to the optical axis) on this plane is the direction perpendicular to the longitudinal direction of the discharge tube (light source) adds a traced drawing of light beams from the center of the light source to the sectional view in FIG. 7(a). Furthermore, FIG. 8 is a sectional view of the optical system of the above-described lighting apparatus cut with a plane passing through the axis of the discharge tube in the longitudinal direction and FIG. 9 is a perspective view showing the above-described lighting apparatus.

In these figures, reference numeral 22 denotes a discharge tube (xenon tube) and reference numeral 23 denotes a reflector. This reflector 23 has almost the same function as that of the above-described embodiment. However, as shown in FIG. 8 and FIG. 9, both sides 23a and 23a' of the reflector 23 have shapes extending straight forward in parallel to the optical axis L.

Reference numeral 24 denotes a prism-like one-piece optical member and on the plane of the light incident from the discharge tube 22, there is a plurality of prism section pairs P made up of refracting surfaces 24b, 24d, 24b' and 24d' having refracting power in the direction quasi-perpendicular to the longitudinal direction of the discharge tube 22 and reflecting surfaces 24c, 24e, 24c' and 24e' that almost satisfy a total reflection condition for the light incident from these refracting surfaces arranged in the above-described quasi-perpendicular direction on both sides of the optical axis L.

Furthermore, as shown in FIG. 8, on the side of the exit surface of the optical member 24, there is a prism array 24h having refracting power in the longitudinal direction of the discharge tube 22. As the material of the optical member 24, a high transmittance optical resin material such as acrylic resin or glass material is suitable as in the case of the first embodiment.

The lighting apparatus according to this embodiment is intended to make the overall shape of the lighting optical system extremely thin, narrow the irradiation range of illumination light most and reduce the width of the opening in the longitudinal direction of the discharge tube 22 to realize miniaturization. The method of determining this optimal shape will be explained using FIG. 7 and FIG. 8 below.

FIG. 7 shows a longitudinal sectional view of the above-described lighting apparatus cut in the radial direction of the discharge tube 22 and shows a basic concept for narrowing the light distribution characteristic in the vertical direction to a small irradiation angle range.

FIG. 7(b) shows the same section as that of FIG. 7(a) with only a light beam tracing lines added.

In the same figure, the inner and outer diameters of the glass tube as the discharge tube 22 are shown. In the same way as for the above-described embodiment, the luminous flux emitted from the center of the discharge tube 22 is regarded as the representative luminous flux and the figures only show luminous flux emitted from the center of the discharge tube 22. As an actual light distribution characteristic, the light distribution characteristic as a whole changes in a slightly spreading direction due to luminous flux emitted from the periphery of the discharge tube 22 in addition to the representative luminous flux as shown in the figures, but this luminous flux has almost an identical tendency of light distribution characteristic, and therefore the following explanations will be based on this representative luminous flux.

First, the shapes of the optical system of the above-described lighting apparatus will be explained one by one. With respect to this section, the shape of the back of the reflector 23 in the direction of the irradiation optical axis L is semi-cylindrical (hereinafter referred to as "semi-cylindrical section 23a") almost concentric with the discharge tube 22 for the same reason described in the above-described embodiment and includes curved surface sections 23b and 23b' covering the back of the outermost reflecting surfaces 24e and 24e' in the vertical direction of the optical member 24 and the flat surface sections 23c and 23c' connecting these curved surface sections 23b and 23b' and semi-cylindrical section 23a.

Then, the shape of the optical member 24 will be explained. In order to construct an optical system with the thinnest shape in the direction of the optical axis and the narrowest irradiation angle, that is, an optical system with the highest condensing performance, this embodiment determines the shape of each section of the optical member 24 as follows.

First, as shown in FIG. 7(a), the optical member 24 is constructed of a plurality of reflecting surfaces having total reflex action on most of light incident from each refracting surface as in the case of the above-described embodiment. However, it is different from the optical member 4 of the above-described embodiment in that reflecting surfaces 24c, 24e, 24c' and 24e' are formed two layers each in such a way as to be symmetrical with respect to the optical axis L in the vertical direction. The boundary edge E between the refracting surface and reflecting surface in the outermost prism section P in the vertical direction is located at almost the same position as the center of the discharge tube 22 in the direction of the optical axis L.

Here, the number of split reflecting surfaces (number of layers) is reduced because each reflecting surface needs to be non-spherical to obtain a precise light distribution and taking into account the fact that providing a plurality of such complicated non-spherical shapes is likely to further complicate the configuration of die manufacturing.

Thus, forming at least two layers of reflecting surface on both sides of the optical axis in the optical member will make the optical member, and therefore the lighting apparatus thinner.

The optical member 24 consists of the following sections, which will be explained below. First, a cylindrical lens surface 24a is formed in the central area through which the irradiation optical axis L passes and prism sections P including first refracting surfaces 24b and 24b' and first reflecting surfaces 24c and 24c' are formed symmetrically with respect to the vertical direction on both sides of the optical axis L outside the cylindrical lens surface 24a.

Outside these prism sections P, other prism sections P including second refracting surfaces 24d and 24d', and second reflecting surfaces 24e and 24e' are formed symmetrically with respect to the vertical direction on both sides of the optical axis L. Furthermore, a prism array 24h made up of a plurality of prisms is formed on the exit surface.

An optical action of the optical member 24 having such a shape will be explained using the light traced drawing in FIG. 7(b).

First, the luminous flux toward the vicinity of the irradiation optical axis L passes through the cylindrical lens surface 24a giving positive refracting power formed on the entrance surface of the optical member 24, is changed to a luminous flux parallel to the optical axis with respect to this section and then goes out of the exit surface (prism array 24h).

Then, the luminous flux component emitted from the center of the discharge tube 22 upward or downward at a relatively large angle is refracted through the first refracting surfaces 24b and 24b' made up of flat surfaces, enters into the prism section P, and most of the luminous flux is totally reflected by the first reflecting surfaces 24c and 24c' made up of a predetermined curved surface and changed to a luminous flux parallel to the optical axis L with respect to this section and then goes out of the exit surface (prism array 24h).

Furthermore, the luminous flux component emitted from the center of the discharge tube 22 upward or downward at a greater irradiation angle is refracted through the second diffraction surfaces 24d and 24d' made up of flat surfaces, entered into the prism section P, and most of the luminous flux is totally reflected by the second reflecting surfaces 24e and 24e' made up of predetermined curved surfaces, changed to a luminous flux parallel to the optical axis L with respect to this section and then goes out of the exit surface (prism array 24h).

Thus, the luminous flux emitted from the center of the discharge tube 22 is split into luminous flux components of a total of five areas by an optical action of the cylindrical surface 24a and the four refracting surfaces and reflecting surfaces and luminous flux of all areas is changed to luminous flux parallel to the optical axis with respect to this section. This provides a light distribution with a narrow irradiation range and high condensing performance.

Thus, segmentizing the reflecting surfaces provided for the optical member 24 into smaller portions than the conventional arts makes it possible to further reduce the thickness of the optical member 24 as in the case of the above-described embodiment. Furthermore, since the edge E, which is a boundary between the refracting surface and reflecting surface, is placed away from the center of the discharge tube 22, it is possible to prevent deterioration of the optical characteristic of the optical resin material due to the influence of radiant heat from the light source.

Then, the shape of the lighting apparatus in the longitudinal direction of the discharge tube 22 according to this embodiment will be explained using FIG. 8.

FIG. 8 is a sectional view of the lighting apparatus cut with a plane including the center axis of the discharge tube 22. As shown in the figure, the exit surface of the optical member 24 is constructed of a prism array 24h made up of a plurality of prisms having two slopes of the same angle. The condensing effect using this prism array 24h is almost the same as that of the above-described embodiment.

This embodiment, in this sectional view, is characterized in that both sides 23a and 23a' of the reflector 23 extend forward in quasi-parallel to the optical axis L and that the entire exit surface of the optical member 24 is constructed of the prism array 24h.

This is a configuration intended to convert luminous flux incident on the entire prism surface on the exit surface of the optical member 24 to luminous flux having a uniform angle component independent of locations.

That is, this configuration is intended not only to prevent luminous flux from going out of a large opening which exists on the side of the optical member 24 by allowing the sides 23a and 23a' of the reflector 23 to extend forward in quasi-parallel to the optical axis but also to prevent light incident on the prism array 24h of the optical member 24 from having directivity and make all luminous flux enter the prism array 24h placed on the front of the optical member 24 under the same condition by returning the reflected luminous flux to the discharge tube 22 side at the same angle as the angle of incidence.

Thus, it is possible to provide a thin-shaped lighting optical system with unprecedentedly high directivity by performing condensing control using the prism array 24h on the side of the exit surface of the optical member 24 for the longitudinal direction of the discharge tube 22 and performing efficient condensing control through refractions by the cylindrical lens surface 24a provided on the discharge tube 22 side and reflections by a plurality of pairs of reflecting surfaces 24c, 24e, 24c' and 24e' for the direction quasi-perpendicular to the longitudinal direction (vertical direction) of the discharge tube 22.

As shown in FIG. 7(b), this embodiment performs control so that luminous flux emitted from the vicinity of the central area of the discharge tube 22 becomes parallel to the optical axis L, but in the case where the light source is a point light source, it is possible to provide a lighting optical system with an extremely narrow irradiation range as shown in the figure. However, since the light-emitting section of the discharge tube 22 actually exists as a limited light-emitting area equivalent to the inner diameter of the discharge tube 22, this embodiment provides a light distribution characteristic such that luminous flux spreads within a certain angle range centered on the vicinity of the irradiation optical axis rather than spreading within an extremely narrow irradiation angle range as shown in the figure.

An actual measurement shows a light quantity half the central light quantity and irradiation angle spreading about 15° with respect to the sectional direction shown in the figure.

FIGS. 10(a) and 10(b) show a lighting apparatus, which is another embodiment of the present invention. This embodiment is an example of modification to the first embodiment and FIG. 10(a) is a longitudinal sectional view of main members of the optical system of the above-described lighting apparatus and FIG. 10(b) adds a traced lines of light from the center of the light source to the sectional view of FIG. 10(a).

Since the shape of the remaining area other than this section is almost the same as the shape of the first embodiment, detailed drawings thereof will be omitted.

This embodiment is obtained by deforming the shape of the three reflecting surfaces in the upper and lower sides of the optical member of the first embodiment in order to reduce the size of the lighting apparatus in the vertical direction explained in the first embodiment.

In FIG. 10(a), the shape of the optical member 4 of the first embodiment is indicated by two-dot dashed line and the shape of the optical member 34 of this embodiment is indicated by solid line.

According to this embodiment, the size $L_1$ of the optical member 34 in the vertical direction is smaller than the size $L_0$ of the optical member 4 in the vertical direction of the first embodiment by approximately 20%. Furthermore, the irradiation angle and light distribution characteristic of the illuminating light are almost the same as those of the first embodiment.

Figure 10:
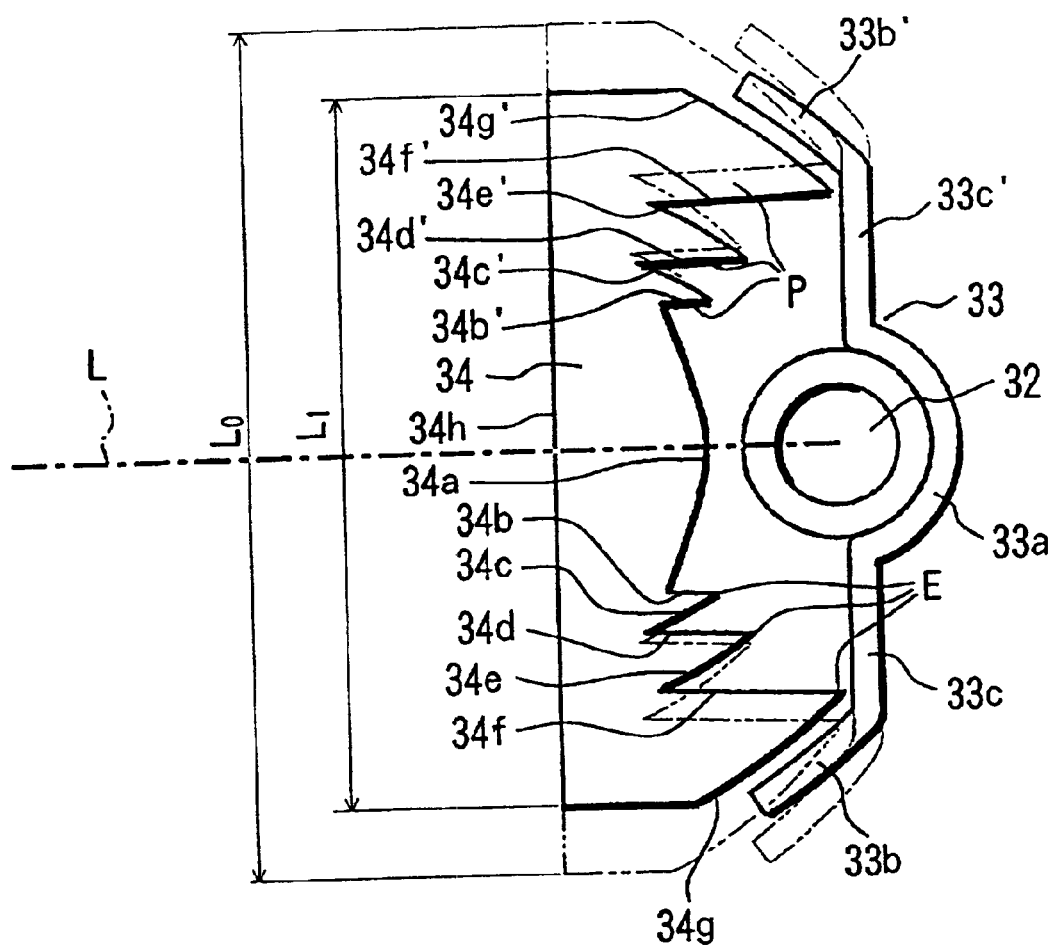
FIG. 10 is a longitudinal sectional view of a lighting apparatus, which is another embodiment of the present invention in the radial direction of a discharge tube.
Figure 10:
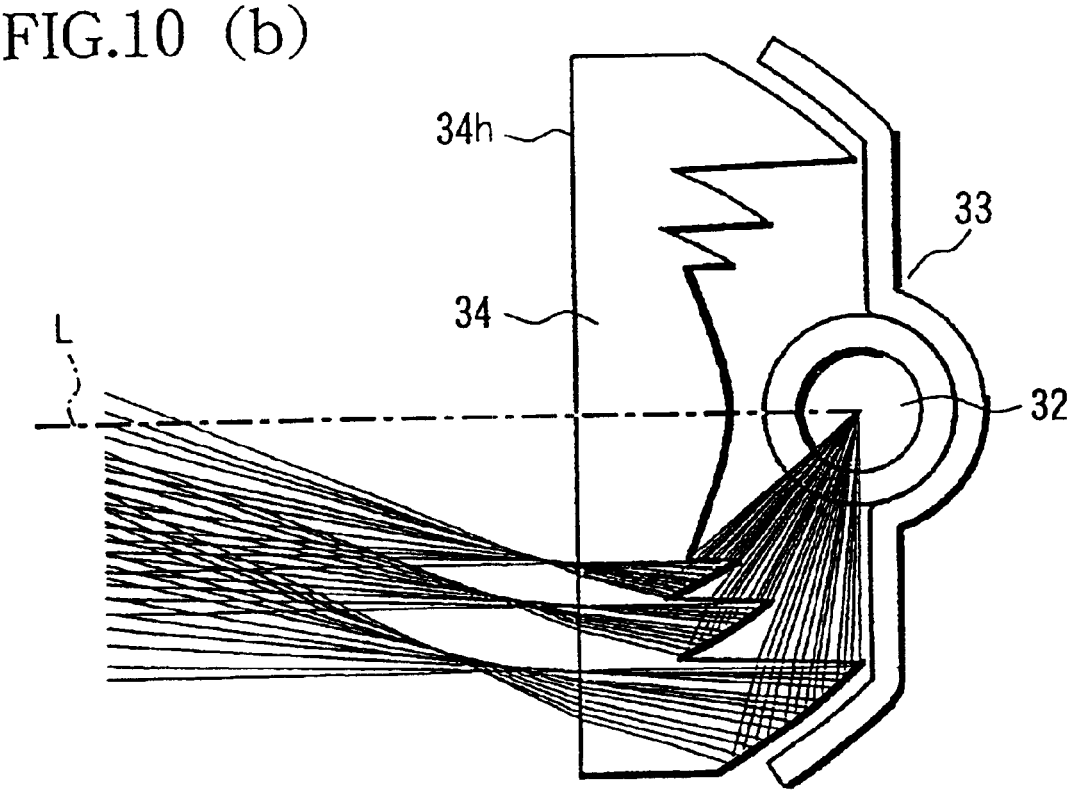

In FIG. 10, reference numeral 32 denotes a discharge tube, reference numeral 33 denotes a reflector and reference numeral 34 denotes an optical member, and these are functionally almost equivalent to those of the first embodiment. However, the shape of the optical member 34 on the discharge tube 32 side and the shape of each reflecting surface in particular are the features of this embodiment and this embodiment intends miniaturization by optimizing these shapes.

In the same figure, the inner and outer diameters of the glass tube of the discharge tube 32 are indicated. As in the case of the above-described two embodiments, luminous flux emitted from the center of the discharge tube 32 is assumed to be representative luminous flux for simplicity of explanation and only luminous flux emitted from the center of the discharge tube 32 is shown in the figure. As an actual light distribution characteristic, the light distribution characteristic changes in the direction in which the light distribution as a whole slightly spreads due to luminous flux emitted from the peripheral sections of the discharge tube 32 in addition to the representative luminous flux shown in the figure, but the light distribution characteristic has almost the same tendency, and therefore this embodiment will be explained according to this representative luminous flux below.

First, the shape of the lighting optical system of the above-described lighting apparatus will be explained sequentially. With respect to the section of the reflector 33 shown in FIG. 10, the shape of the back of reflector 33 in the direction of the irradiation optical axis L is assumed to be semi-cylindrical (hereinafter referred to as "semi-cylindrical section 33a") almost concentric with the discharge tube 32 for the same reason as for the above-described two embodiments and the reflector 33 is further provided with curved surface sections 33b and 33b' covering the back of the reflecting surfaces 34g and 34g' of the outermost prism section P in the vertical direction of the optical member 34, flat surface sections 33c and 33c' connecting the above-described two curved surfaces 33b and 33b' and semi-cylindrical section 33a.

Next, the shape of the optical member 34 will be explained. To reduce the size of the optical member 34 in the vertical direction and obtain a uniform light distribution characteristic for the required irradiation range such as that obtained from the first embodiment, this embodiment optimizes the shape of each section as follows.

First, as shown in FIGS. 10(a) and 10(b), the optical member 34 also has three layers of reflecting surfaces 34c, 34e, 34g, 34c', 34e' and 34g' in the same way as the first embodiment, whereas a light distribution of luminous flux reflected by their respective reflecting surfaces is different from that of the first embodiment.

That is, this embodiment provides an angle characteristic in such a way that, of the luminous flux reflected by the respective reflecting surfaces, the luminous flux component closest to the optical axis is changed to a member almost parallel to the optical axis and the angle at which the luminous flux intersects the optical axis L increases gradually as the light incident on the reflecting surface goes away from the optical axis L.

In other words, each reflecting surface is shaped in such a way as to have a uniform irradiation distribution within the range corresponding to only half the area of one side from the optical axis.

Then, each reflecting surface is placed symmetrically with respect to the optical axis to obtain a uniform light distribution characteristic as the required irradiation range as a whole. This shape will be explained more specifically below.

Each section of the optical member 34 is shaped as will be explained below. First, a cylindrical lens surface 34a is formed in the central area through which the irradiation optical axis L passes and prism sections P including first refracting surfaces 34b and 34b' and first reflecting surfaces 34c and 34c' are formed in the upper and lower sides centered on the optical axis L symmetrically in the vertical direction outside the cylindrical lens surface 34a.

Outside these prism sections P, other prism sections P including second refracting surfaces 34d and 34d', and second reflecting surface 34e and 34e' are formed in the upper and lower sides centered on the optical axis L symmetrically in the vertical direction.

Outside these prism sections P, still other prism sections P including third refracting surfaces 34f and 34f', and third reflecting surface 34g and 34g' are formed in the upper and lower sides centered on the optical axis L symmetrically in the vertical direction. Furthermore, a prism array is formed on the exit surface 34h.

An optical action of the optical member 34 configured as shown above will be explained using a light traced drawing in FIG. 10B.

First, a luminous flux directed to the vicinity of the irradiation optical axis is changed to a luminous flux with a light distribution characteristic, which is uniform within the required irradiation range with respect to this section by the cylindrical lens surface 34a formed on the entrance surface of the optical member 34 that gives positive refracting power, and then goes out of the exit surface 34h. Since this luminous flux is completely the same as that of the first embodiment, this luminous flux is omitted in FIG. 10(b).

Then, luminous flux components emitted from the center of the discharge tube 32 upward and downward at relatively large angles are refracted through the first refracting surfaces 34b and 34b' made up of flat surfaces, entered into the prism sections P and then most of luminous flux is totally reflected by the first reflecting surfaces 34c and 34c' made up of predetermined curved surfaces and are changed from luminous flux components parallel to the optical axis L in such a way that the angle at which the luminous flux components intersects the optical axis L increases gradually (resulting in a distribution of a certain angle on the upper side and lower side in the figure). Then, the luminous flux goes out of the exit surface 34h. Combining the irradiation ranges of the upper and lower luminous flux components makes it possible to obtain a uniform light distribution characteristic as a whole.

Furthermore, luminous flux components emitted from the center of the discharge tube 32 upward and downward at larger angles are refracted through the second refracting surfaces 34d and 34d' made up of flat surfaces, entered into the prism sections P and then most of luminous flux is totally reflected by the second reflecting surfaces 34e and 34e' made up of predetermined curved surfaces and changed from luminous flux components parallel to the optical axis L to members directed downward and upward in the figure, and therefore it is possible to obtain luminous flux within an irradiation range almost equivalent to the light distribution by the above-described first reflecting surfaces 34c and 34c'. Then, combining the luminous flux components in these two areas makes it possible to obtain a uniform light distribution.

On the other hand, the luminous flux components emitted from the center of the discharge tube 32 upward and downward at the largest angle are refracted through the third refracting surfaces 34f and 34f' made up of flat surfaces, entered into the prism sections P and then most of luminous flux is totally reflected by the third reflecting surfaces 34g and 34g' made up of predetermined curved surfaces and changed from luminous flux components parallel to the optical axis L to members directed downward and upward in the figure, therefore it is possible to obtain luminous flux within an irradiation range almost equivalent to the light distribution by the above-described first reflecting surfaces 34c and 34c'. Then, combining the luminous flux components in these two areas makes it possible to obtain a uniform light distribution.

Thus, luminous flux emitted from the center of the discharge tube 32 is divided into luminous flux components in a total of four areas by an optical action of the cylindrical surface 34a and three pairs of refracting surfaces and reflecting surfaces and these four luminous flux components are overlapped with one another with a same light distribution with respect to the section shown in FIG. 10, making it possible to construct a lighting optical system with a uniform light distribution as a whole.

Thus, segmentizing the reflecting surfaces of the optical member 34 into smaller portions than the conventional arts makes it possible to reduce the thickness of the optical member 34 as in the case of the first and second embodiments. Furthermore, since the edge E, which is a boundary between the refracting surface and reflecting surface, is placed away from the center of the discharge tube 32, it is possible to prevent the optical resin material from being affected by radiant heat from the light source and thereby reduce adverse influences on the optical characteristic.

Furthermore, as an effect specific to this embodiment, it is possible to reduce the width (height) of the opening in the vertical direction and drastically reduce the size of the opening of this type of lighting optical system in the vertical direction by limiting the light distribution to be controlled by the respective reflecting surfaces of the optical member 34 to the upper half or lower half.

Figure 11:
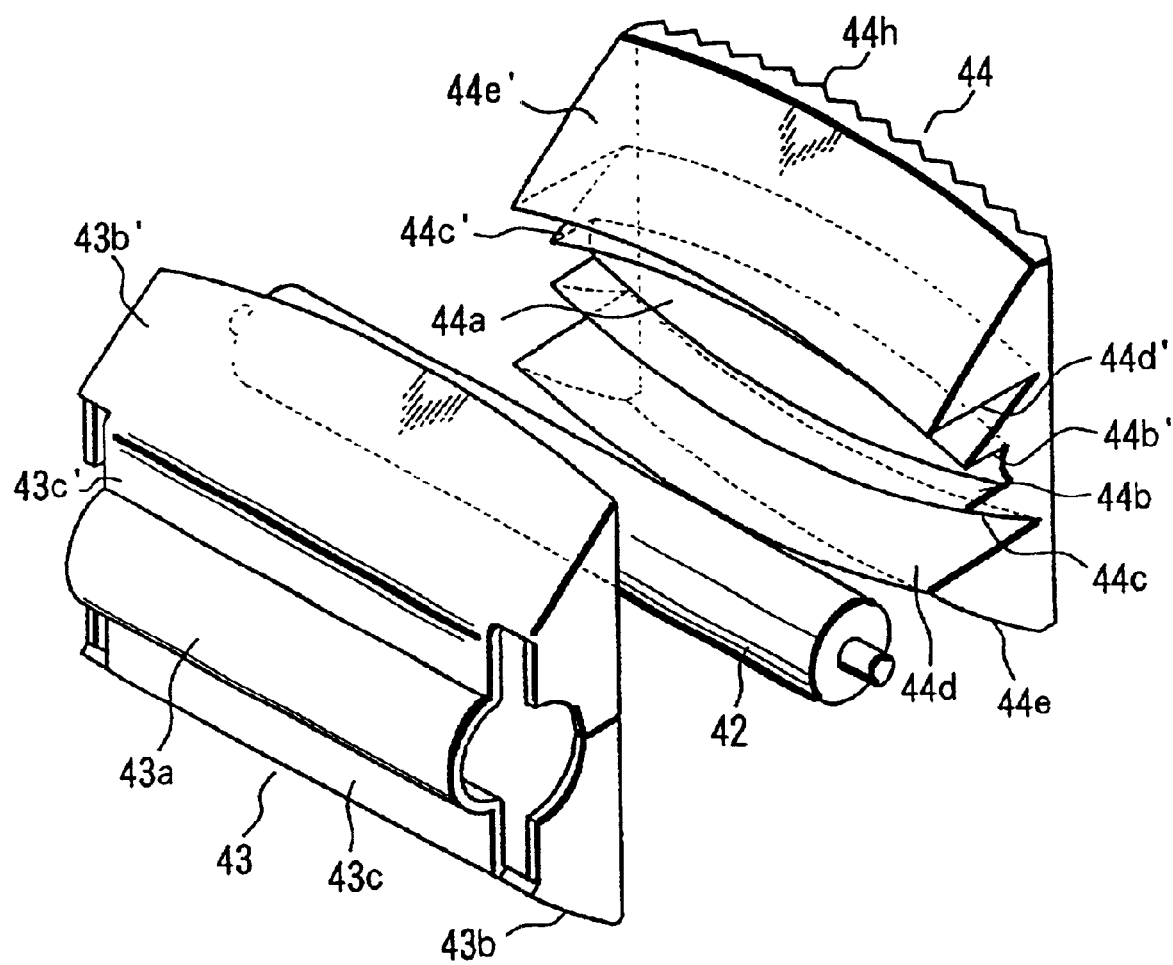
FIG. 11 is an exploded perspective view of a main optical system viewed from the back of a lighting apparatus, which is another embodiment of the present invention.
Figure 12:
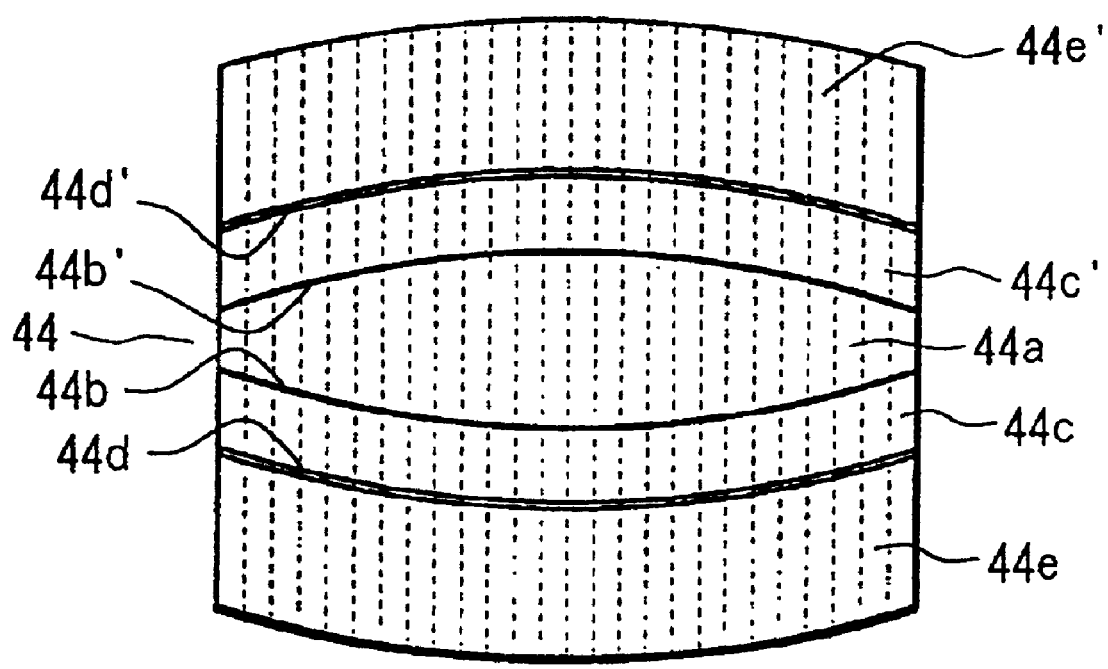
FIG. 12 is a rear view of the optical member used for the lighting apparatus of the embodiment shown in FIG. 11.

FIG. 11 and FIG. 12 show a configuration of a lighting apparatus, which is another embodiment of the present invention. This is an example of modification to the above-described second embodiment. FIG. 11 is a perspective view of main members of the optical system of the lighting apparatus and FIG. 12 is a rear view of the optical member alone. Since the light traced lines and light distribution characteristic, etc. are almost the same as those in the second embodiment, detailed explanations thereof will be omitted.

This embodiment is a three-dimensional modification of the shape on the entrance surface side of the optical member of the lighting apparatus explained in the second embodiment and mainly intended to improve the light distribution characteristic toward four corners on the surface of an object.

In FIG. 11 and FIG. 12, reference numeral 42 denotes a discharge tube, 43 denotes a reflector and 44 denotes an optical member. The functions of these members are almost equivalent to those of the second embodiment, but this embodiment is especially characterized by the shape of each surface of the optical member 44 on the discharge tube 42 side.

In the same figure, the shape of the back of the reflector 43 in the direction of the irradiation optical axis is semi-cylindrical (hereinafter referred to as "semi-cylindrical section 43a") almost concentric with the discharge tube 42 and the reflector 43 is further provided with toric surfaces 43b and 43b' covering the back of the outermost reflecting surfaces 44e and 44e' of the optical member 44 in the vertical direction and flat surface sections 43c and 43c' connecting the above-described two toric surfaces and semi-cylindrical section 43a.

On the other hand, as in the case of the second embodiment, the optical member 44 includes a lens surface 44a having positive refracting power in the direction perpendicular to the optical axis (vertical direction) in the central area on the entrance surface side and two layers of prism section each having a refracting surface and reflecting surface in the peripheral sections on the entrance surface side are formed on both the upper and lower sides.

However, this embodiment is different from the second embodiment in that the central lens surface 44a and reflecting surfaces 44c, 44c', 44e and 44e' are constructed of three-dimensional curved surfaces.

More specifically, the toric lens surface 44a is formed in the central area through which the irradiation optical axis L passes as a refracting surface and conical first refracting surfaces 44b and 44b' and toric-surfaced first reflecting surfaces 44c and 44c' making up the prism sections are formed symmetrically in the vertical direction outside the toric lens surface 44a.

Outside these surfaces, the prism sections made up of conical second refracting surfaces 44d and 44d', and toric-surfaced second reflecting surfaces 44e and 44e' are formed symmetrically in the vertical direction. On the exit surface, a prism array 44h is formed.

A condensing operation and effects resulting from shaping the optical member 44 in this way will be explained.

First, with respect to the refracting surface 44a in the center, the section of the central area in the vertical direction is almost equivalent to that in FIG. 7(b) shown in the second embodiment, but the shape changes gradually toward the peripheral sections, the vertical width also changes and refracting power of each section also changes gradually.

This makes it possible to make the light distribution characteristic of the system as a whole uniform and prevent variations in light distribution which is curved on the irradiated surface of an object, which are likely to occur on the boundary edge between the refracting surface and reflecting surface of the prism sections P.

Furthermore, using a toric-surfaced configuration not only for the above-described central area but also for the reflecting surface 44c, 44c', 44e and 44e' in the peripheral sections, on which sectional shapes in the horizontal and vertical directions change gradually according to their respective positions makes it possible to provide light distribution characteristic uniform toward all four corners in the irradiation range.

Thus, with respect to luminous flux emitted from the center of the discharge tube 42, it is possible to construct a lighting optical system with a narrow irradiation angle range and a highly condensed light distribution as a whole through an action of each reflecting surface made up of the toric surface 44a and a pair of toric surfaces.

Furthermore, segmenting the reflecting surfaces of the optical member 44 into smaller portions than the conventional arts makes it possible to reduce the thickness of the optical member 44 as in the case of the above-described embodiments. Moreover, since the boundary edge between the refracting surface and reflecting surface goes away from the center of the light source, it is possible to prevent the optical resin material from being affected by radiant heat from the light source and reduce adverse influences on the optical characteristic.

Furthermore, using a toric-surfaced configuration for the refracting surfaces in the central area and each reflecting surface, this embodiment has a specific effect of making it possible to easily construct a lighting optical system with a uniform light distribution characteristic toward four corners in the irradiation range without any additional special optical system.

As described above, the above-described embodiments include a plurality of prism sections with refracting surfaces and reflecting surfaces having total reflex action arranged in the direction quasi-perpendicular to the longitudinal direction of the light source, making it possible to drastically reduce the thickness of the optical member, and therefore reduce the thickness of the overall lighting apparatus. Moreover, use of a condensing action through reflections makes it possible to efficiently use light from the light source and implement a lighting apparatus, which is small in size yet with excellent optical characteristics. Thus, this embodiment can provide a lighting apparatus best suited to mounting on a small image pickup apparatus such as a card type camera in particular.

Especially, since light is controlled by refraction and total reflection by the optical member, there is light quantity loss and it is possible to control all light inside the prism and significantly reduce the size of the entire lighting apparatus.

Furthermore, determining the shape of reflecting surfaces of the optical member appropriately makes it easier to obtain an almost uniform light distribution on the irradiation area.

By the way, it is also possible to control a light distribution of a direct light component from the light source passing near the optical axis and a light distribution of a reflected light component forming a certain angle with respect to the optical axis separately using a single optical member by forming a lens section having positive refracting power in the central area in the direction quasi-perpendicular to the longitudinal direction of the light source on the plane of incidence of the optical member and forming the above-described plurality of prism sections in the peripheral section.

Then, by determining the shape of each surface of the plurality of prism sections so that the irradiation range of light emitted from the optical member through these prism sections virtually matches (overlaps) the irradiation range of light emitted through the lens section, it is possible to obtain an almost uniform light distribution characteristic on the irradiation area of illuminating light.

Figure 13:
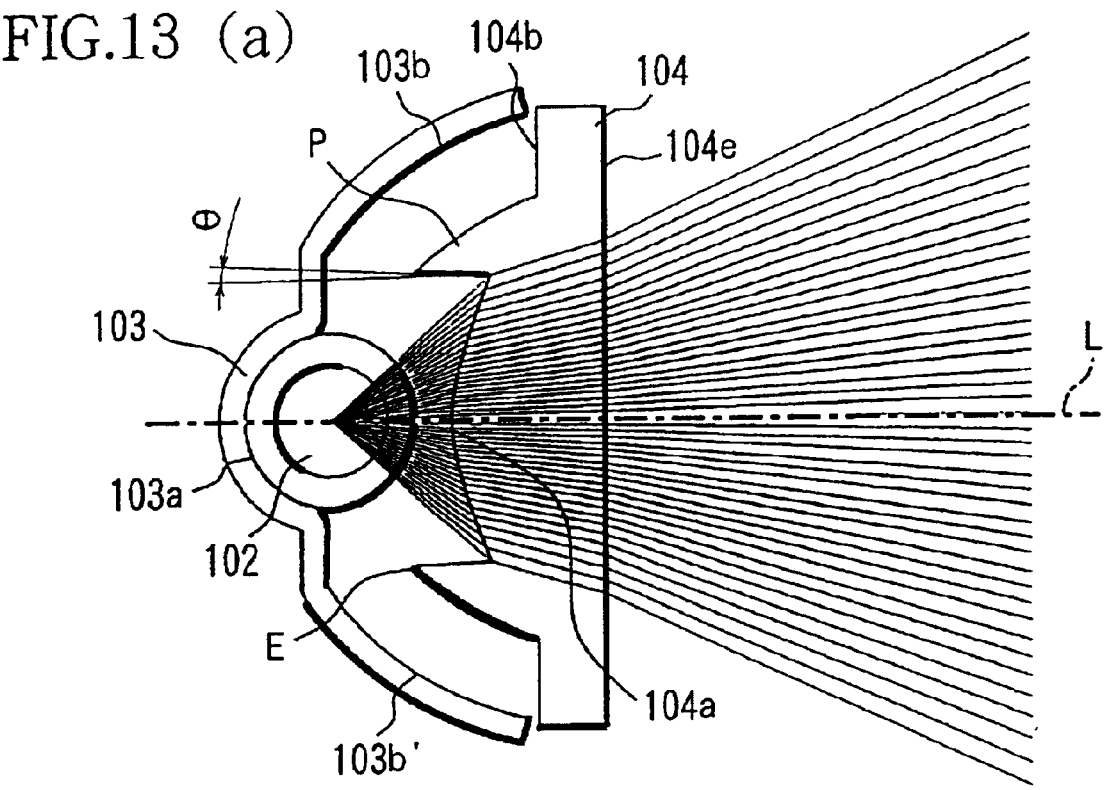
FIG. 13 is a longitudinal sectional view of a lighting apparatus, which is another embodiment of the present invention on a plane including a radial direction of a discharge tube.
Figure 13:
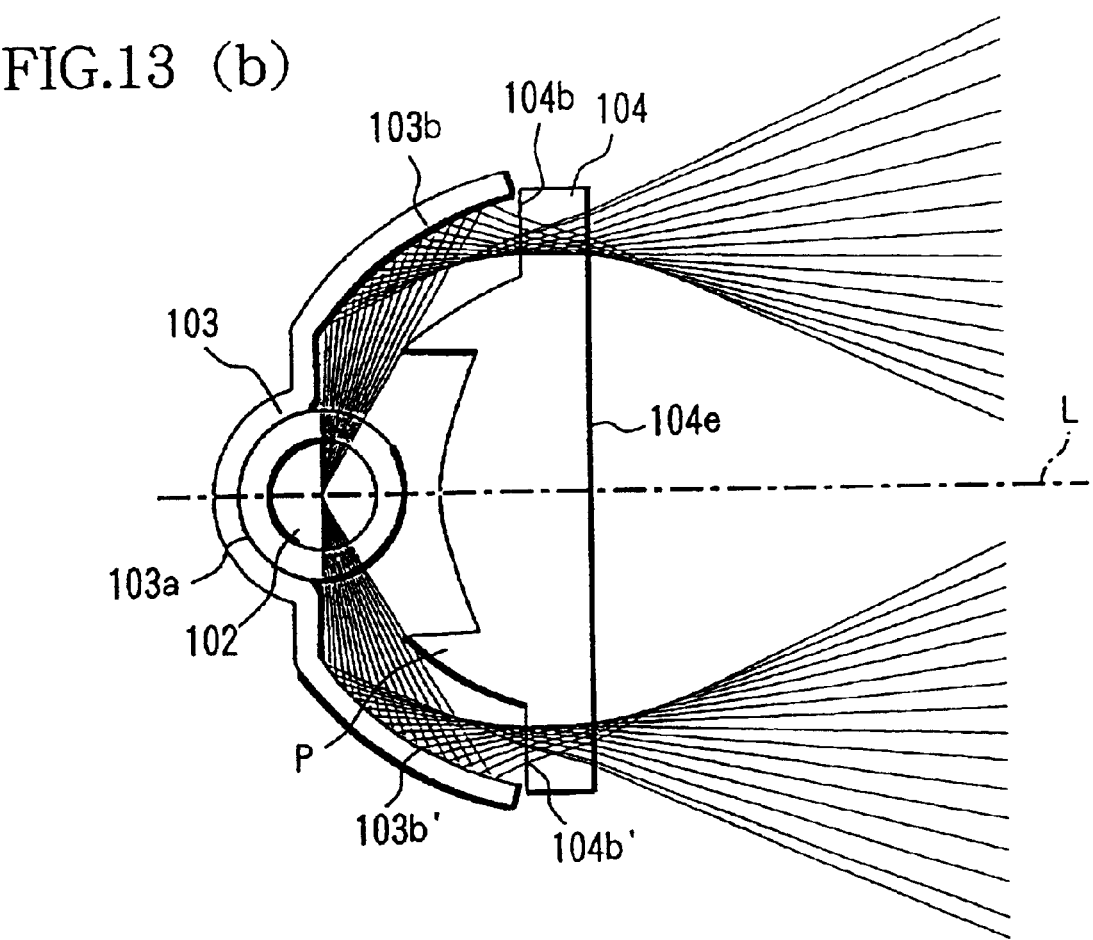
Figure 14:
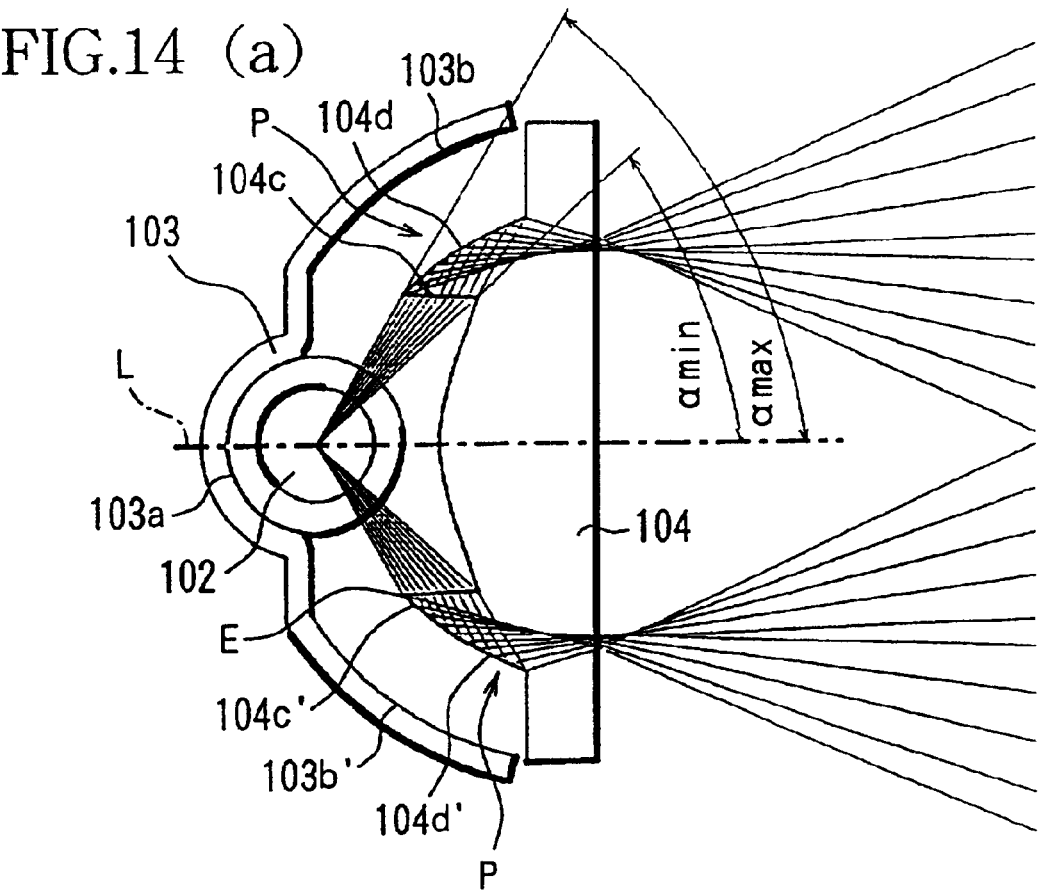
FIG. 14 is a longitudinal sectional view of the lighting apparatus according the embodiment shown in FIG. 13 on a plane including the radial direction of the discharge tube.
Figure 14:
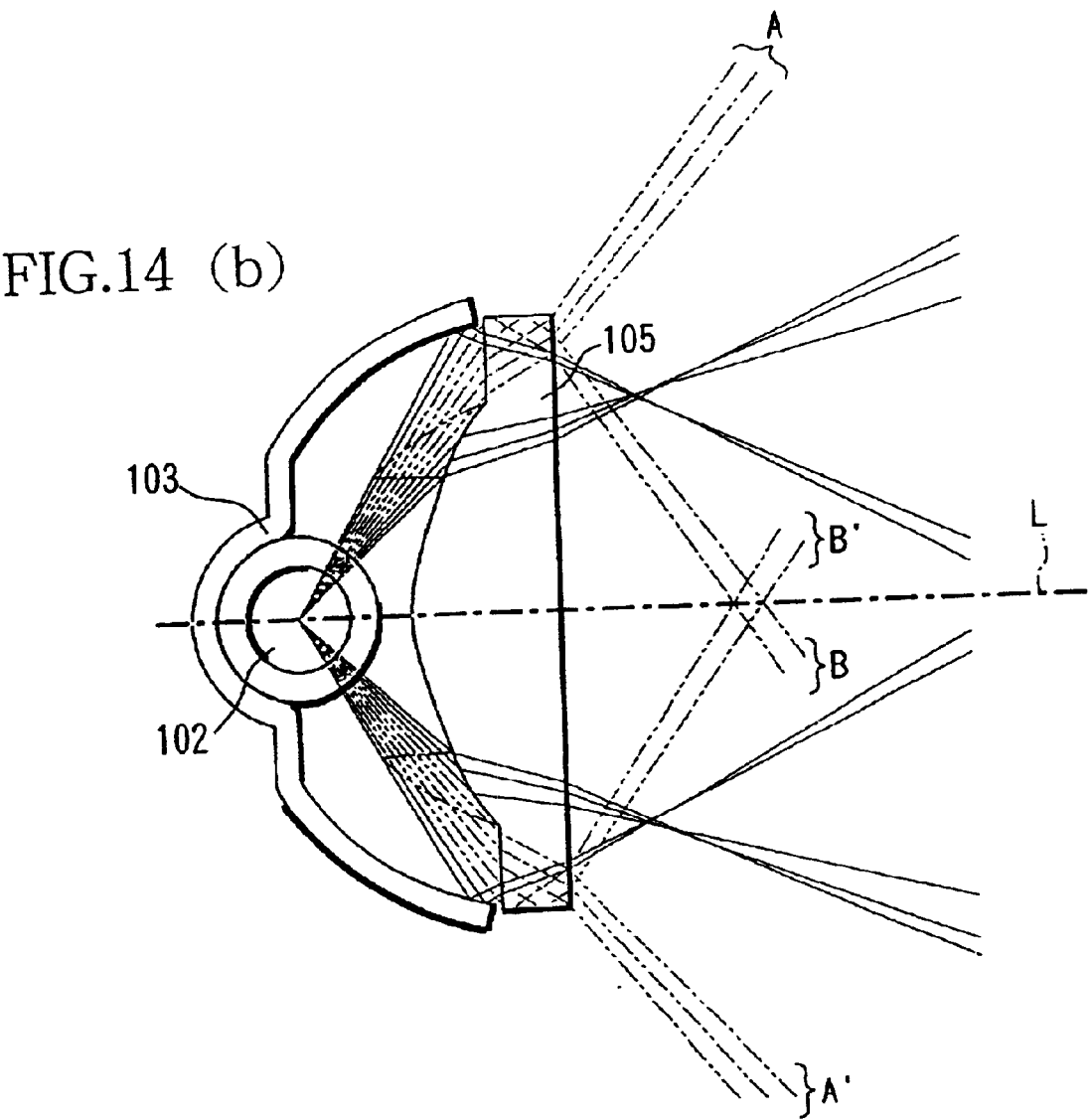
Figure 15:
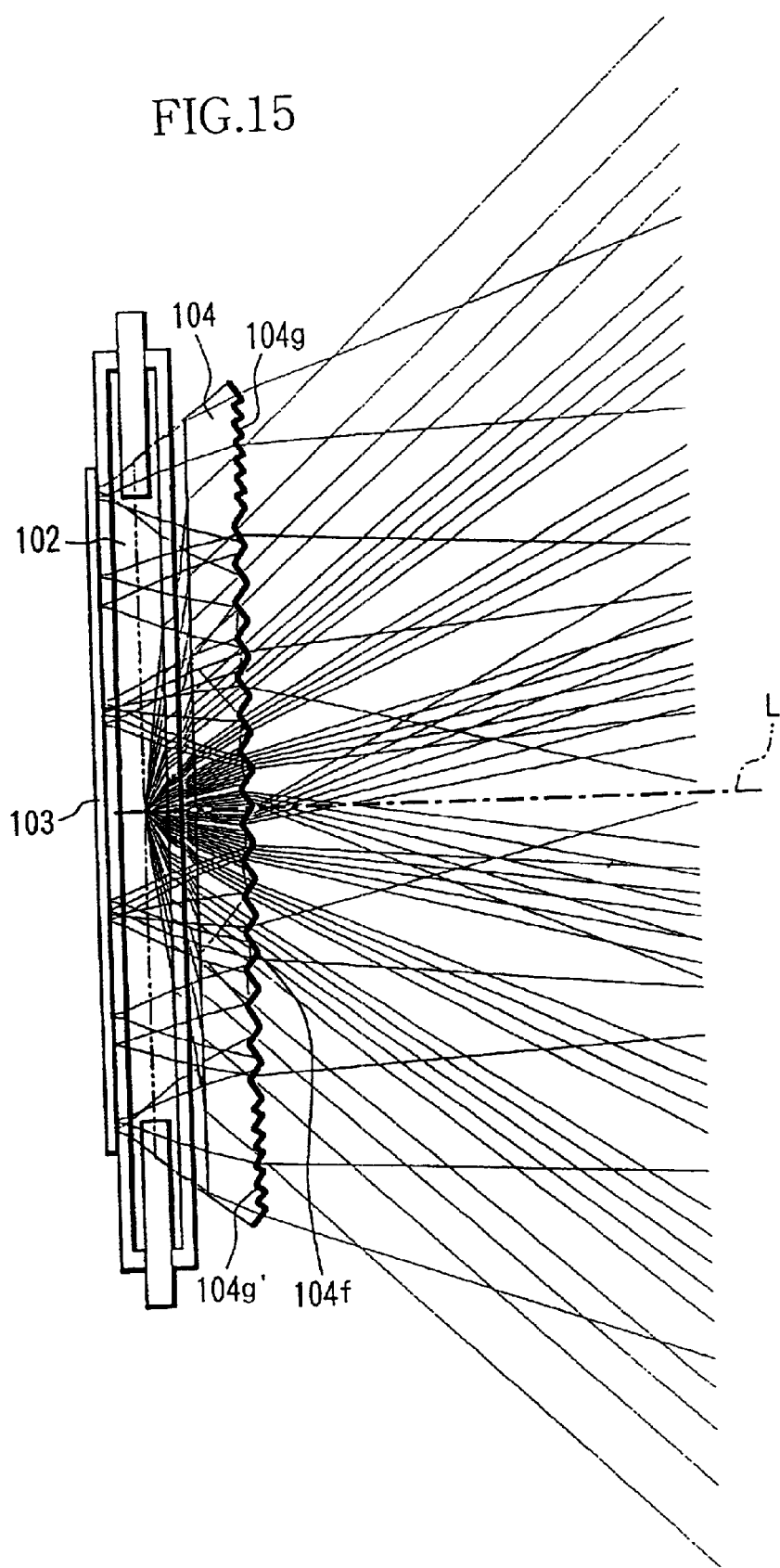
FIG. 15 is a sectional view of the lighting apparatus according the embodiment shown in FIG. 13 in the longitudinal direction of the discharge tube.
Figure 16:
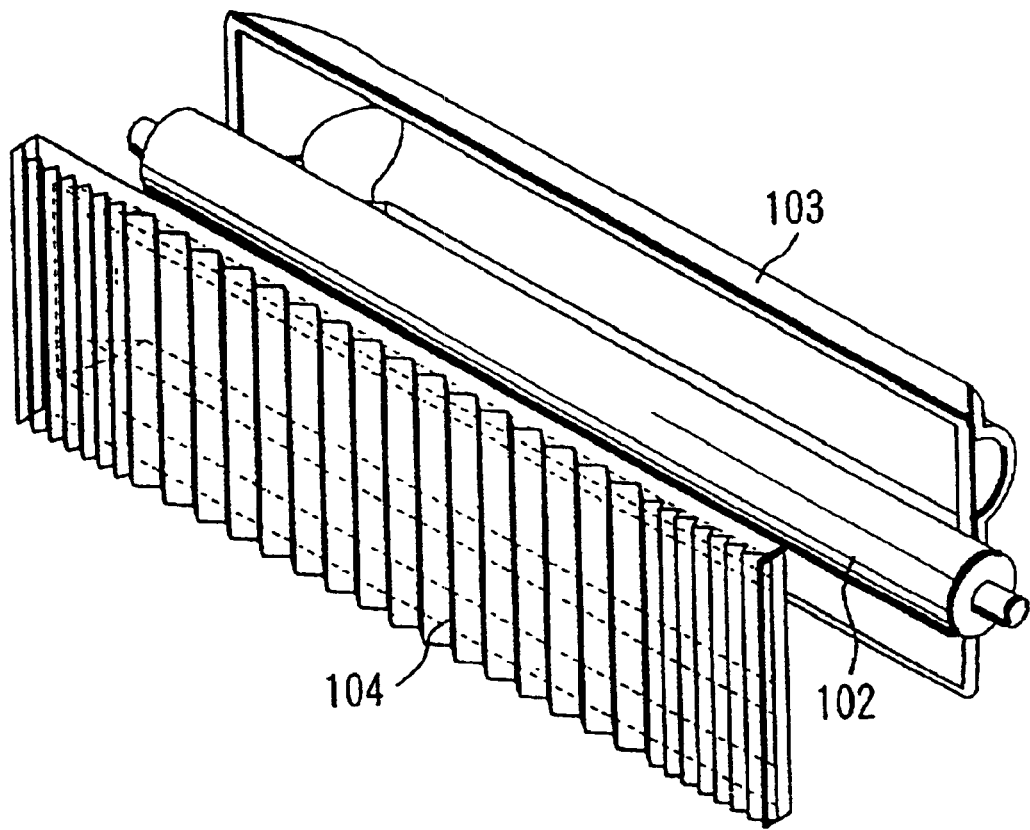
FIG. 16 is an exploded perspective view of the lighting apparatus according the embodiment shown in FIG. 13.
Figure 17:
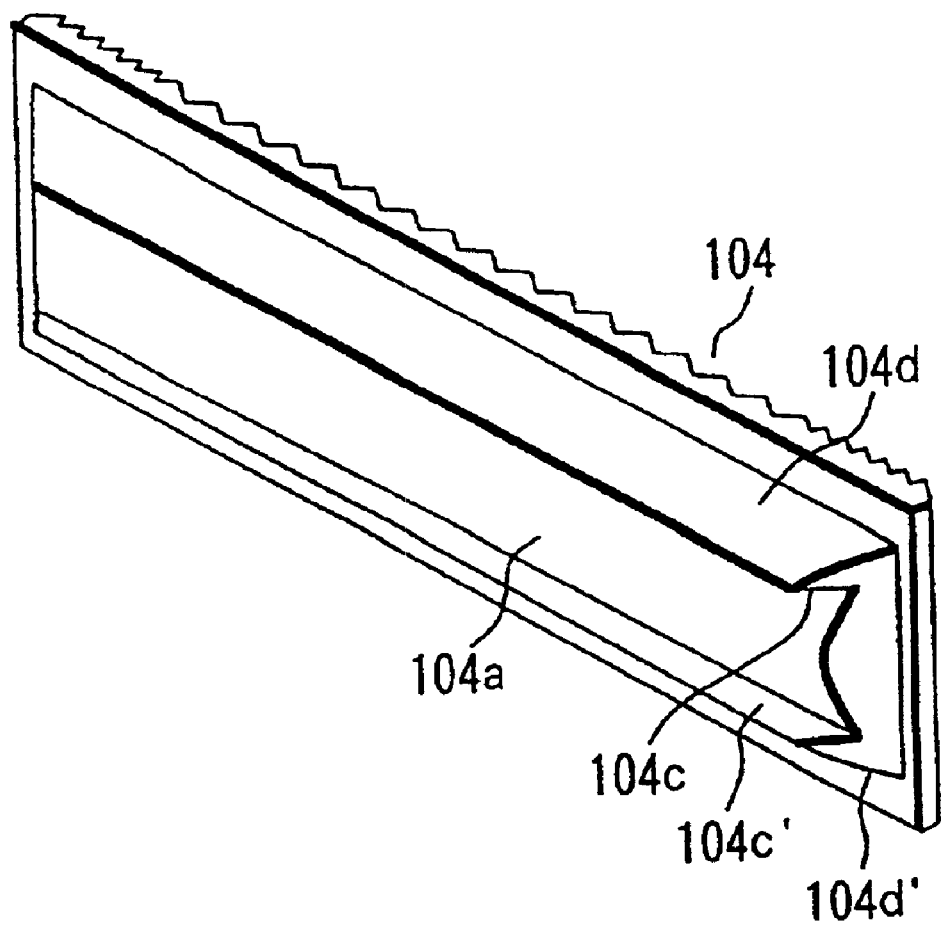
FIG. 17 is a perspective view of the lighting apparatus according the embodiment shown in FIG. 13 viewed from the back.
Figure 18:
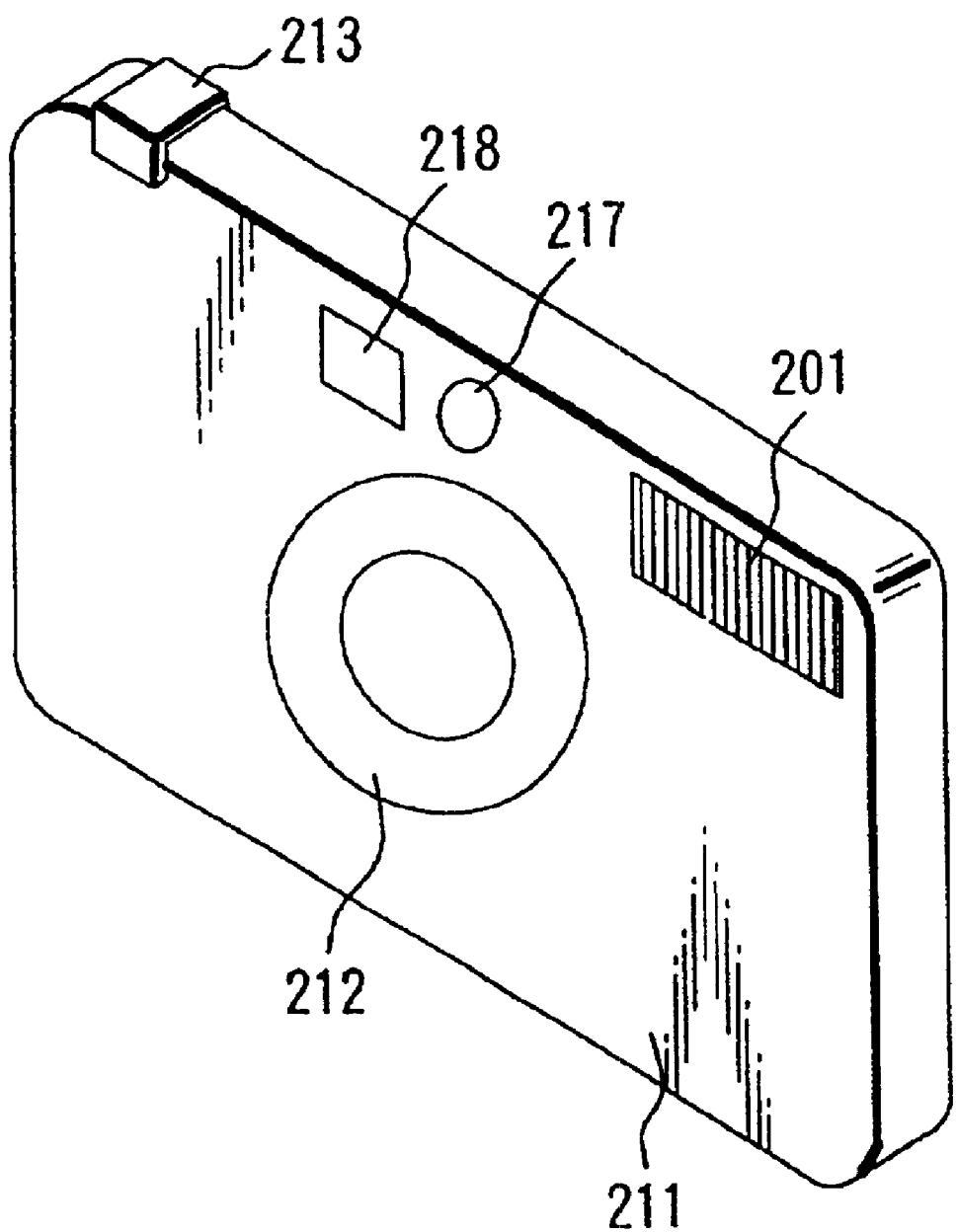
FIG. 18 is a perspective view of a camera equipped with the lighting apparatus according the embodiment shown in FIG. 13.

FIG. 13 to FIG. 17 show a lighting apparatus, which is another embodiment of the present invention, and especially this embodiment shows an apparatus that emits electronic flash incorporated in a camera. FIG. 13 is a sectional view of the optical system of the above-described lighting apparatus cut with a plane including the radial direction of the discharge tube (the plane perpendicular to the longitudinal direction of the discharge tube), FIG. 14 illustrates a comparison between the case of the above-described lighting apparatus and the case without the features of the above-described lighting apparatus, FIG. 15 is a sectional view of the optical system of the above-described lighting apparatus cut with a plane including the center axis of the discharge tube, FIG. 16 is an exploded perspective view of the optical system of the above-described lighting apparatus and FIG. 17 is a perspective view viewed from the back of the optical member used for the above-described lighting apparatus. FIG. 18 shows a camera equipped with the above-described lighting apparatus.

FIG. 13 to FIG. 15 also show traced lines of representative light beams emitted from the center of the light source and especially FIG. 13 and FIG. 14 show different luminous flux components emitted from the center of the light source on the same section according to the different positions of incidence on the optical member.

First, FIG. 18(a) shows a so-called compact camera incorporating the lighting apparatus of this embodiment and FIG. 18(b) shows a so-called card size camera incorporating the lighting apparatus of this embodiment.

In these figures, reference numeral 211 denotes the body of the camera and 212 denotes a lens barrel of a picture-taking lens placed in almost the center of the front side of the camera body 211. Reference numeral 201 is the lighting apparatus of this embodiment placed at the top right of the camera body 211.

Reference numeral 213 denotes a shutter release button, 217 denotes an inspection window of a photometer to measure brightness of external light and 218 denotes an inspection window of a finder.

Furthermore, reference numeral 214 denotes an operation member to zoom the picture-taking lens and depressing this operation member frontward allows an image to zoom in and depressing this operation member backward allows an image to zoom out. Reference numeral 215 denotes a mode setting button to switch between various modes of the camera and 216 denotes a liquid crystal display window to inform the user of the operation of the camera. The camera in which the lighting apparatus of the present invention is incorporated is not limited to the camera shown in FIG. 18, but can also be incorporated in other cameras (single-lens reflex camera and video camera, etc.).

Then, the members that determine optical characteristics of the lighting apparatus of this embodiment will be explained in detail using FIG. 13 to FIG. 17.

In these figures, reference numeral 102 denotes a cylindrical light-emitting discharge tube (xenon tube). Reference numeral 103 denotes a reflector (reflection member, first reflector) that reflects forward the luminous flux component directed backward and upward/downward in the direction of the irradiation optical axis L of the luminous flux emitted from the light-emitting discharge tube 102. This reflector has a high-reflectance inner surface made of a metallic material such as radiant aluminum or a resin material having an inner surface on which a high-reflectance metal-evaporated surface is formed.

Reference numeral 104 is an optical member made up of a one-piece transparent body. The central area through which the irradiation optical axis L passes on the entrance surface side of the optical member 104, a cylindrical lens surface 104a is formed which has positive refracting power in the direction quasi-perpendicular to the longitudinal direction of this light-emitting discharge tube 102. In upper and lower peripheral sections 104b and 104b', a parallel flat surface is formed. Furthermore, between the cylindrical lens surface 104a and the upper and lower peripheral sections 104b and 104b', is formed a pair of prism sections (reflecting sections) P made up of refracting surfaces (entrance surface) 104c and 104c' and reflecting surfaces 104d and 104d' respectively.

To make it easier to understand the shape of this optical member 104, FIG. 17 shows a perspective view viewed from the back of the optical member 104. As the material for the above-described optical member 104, high transmittance optical resin material such as acrylic resin or glass material is suitable.

When the camera operating mode of the camera and lighting apparatus in the above-described configuration is set, for example, to a "electronic flash auto mode", after the user presses the shutter release button 213, a central processing unit (not shown) decides whether or not allow the lighting apparatus 201 to emit light according to the brightness of external light measure by the photometer (not shown) and sensitivity of a film loaded or the characteristic of an image pickup device such as a CCD or CMOS.

When the central processing unit decides that "the lighting apparatus should be instructed to emit light" in a situation of taking pictures, the central processing unit outputs a light-emitting signal and a light-emitting control circuit (not shown) instructs the light-emitting discharge tube 2 to emit light through a trigger lead wire attached to the reflector 203.

Of the luminous flux emitted from the light-emitting discharge tube 202, the luminous flux emitted backward in the direction of irradiation optical axis L and upward/downward is reflected by the reflector 203 and entered into the optical member 204 positioned in front side, while the luminous flux emitted forward in the direction of irradiation optical axis L is directly entered into the optical member 204, and this luminous flux is changed to luminous flux with a predetermined light distribution characteristic by the optical member 204 and then irradiated onto an object.

Then, an optimal method of setting the optical system of the lighting apparatus according to this embodiment which is thin-shaped and capable of irradiating illuminating light uniformly and efficiently within a required irradiation range will be explained using FIG. 13 to FIG. 15 below.

FIG. 13 and FIG. 14 show a longitudinal sectional view of the lighting apparatus according to this embodiment cut with the plane including the radial direction of the light-emitting discharge tube and show a basic concept for optimizing the light distribution characteristic in the vertical direction. FIGS. 13(a) and 13(b) and FIGS. 14(a) and 14(b) show light traced lines on the same section in different cases and reference numerals in the figures correspond to those in FIG. 15 to FIG. 17.

In the same figures, inner and outer diameters of the glass tube of this light-emitting discharge tube 102 are indicated. As an actual light-emitting phenomenon of the light-emitting discharge tube of this type of the lighting apparatus, light is often emitted from the full inner diameter to improve the efficiency and it is reasonable to consider that light is emitted virtually uniformly from light-emitting points across the full inner diameter of the discharge tube. However, for simplicity of explanation, suppose the luminous flux emitted from the center of the discharge tube 102, that is the light source, is the representative luminous flux and the figures only show this representative luminous flux. As an actual light distribution characteristic, the light distribution characteristic as a whole changes in a direction in which luminous flux spreads slightly due to luminous flux emitted from the periphery of the light-emitting discharge tube 102 in addition to the representative luminous flux as shown in the figures, but this luminous flux has almost an identical tendency of light distribution characteristic, and therefore the following explanations will be based on this representative luminous flux.

The shape of the back of the reflector 103 facing the center of the light source in the direction of the irradiation optical axis L is semi-cylindrical (hereinafter referred to as "semi-cylindrical section 103a") almost concentric with the light-emitting discharge tube 102. This is a shape, which is effective to return the light reflected by the reflector 103 to the vicinity of the center of the light source again and has the effect of preventing adverse influence from refractions of the glass part of the light-emitting discharge tube 102.

Furthermore, such a configuration makes it possible to handle the reflected light by the reflector 103 as the outgoing light almost equivalent to the direct light from the light source, and thereby reduce the overall size of the optical system that follows this.

Furthermore, the reason that the reflector 103 has a semi-cylindrical shape is that having a size smaller than this will require the size of the optical member 104 to be increased to condense luminous flux in the vertical direction, while having a size larger than this will increase luminous flux trapped inside the reflector 103, resulting in deterioration of efficiency.

On the other hand, the upper and lower peripheral sections 103b and 103b' of the reflector 103 are formed in such a way as to cover the front space between the light-emitting discharge tube 102 and optical member 104 and formed to have a curved surface so that the luminous flux reflected by these peripheral sections has a certain uniform light distribution characteristic.

Then, the shape of the optical member 104 that gives the greatest influence on the light distribution characteristic of this lighting apparatus will be explained. This embodiment adopts the following configuration, which is thinnest in the direction of the optical axis, to obtain a uniform light distribution within the required irradiation range.

First, as shown in FIG. 13(a), in the central area on the entrance surface of the optical member 104 a cylindrical lens surface 104a having positive refracting power within the plane perpendicular to the irradiation optical axis L is formed. In this way, the luminous flux passing near the irradiation optical axis L out of the luminous flux emitted from the light-emitting discharge tube 102 is changed to luminous flux having a uniform light distribution within a predetermined angle range and then goes out of the plane 104e of the optical member 104.

Here, to have a uniform light distribution characteristic, the cylindrical lens surface 104a of the optical member 104 is constructed to have a continuous non-spherical shape so that a proportional relationship is established between the angle of outgoing light from the center of the discharge tube 102 and the angle of outgoing light that has passed through the optical member 104, and luminous flux is condensed at a certain rate.

Then, as described in FIG. 13(b), of the luminous flux emitted from the center of the discharge tube 102, the luminous flux components which form a large angle with the optical axis and which directly enter into the peripheral sections 103b and 103b' of the reflector 103 will be explained. Here, the peripheral sections 103b and 103b' of the reflector 103 are shaped so that after reflection the above-described members have almost the same irradiation angle range and uniform distribution as those in FIG. 13(a).

The luminous flux reflected by the peripheral sections 103b and 103b' of the reflector 103 enters from the peripheral sections 104b and 104b' of the optical member 104 into the optical member 104 and goes out of the exit surface 104e. However, the peripheral sections 104b and 104b' of the optical member 104 have no power in the direction perpendicular to the irradiation optical axis L (vertical direction) and luminous flux passing through this area is irradiated with the same light distribution characteristic adjusted by the peripheral sections 103b and 103b' of the reflector 103.

Thus, the peripheral sections 103b and 103b' of the reflector 103 have the function of uniformly condensing the luminous flux directly entering from the discharge tube 102 within a certain angle range and leading the reflected luminous flux to the narrow passing areas of the peripheral sections 104b and 104b' of the optical member 104 as well. As a result, it is possible to obtain a uniform light distribution with respect to the required irradiation range as in the case of FIG. 13(a). Furthermore, the peripheral sections 103b and 103b' of the reflector 103 and cylindrical lens surface 104a form light paths completely different from each other to perform condensing (irradiation) control.

Then, the light path through the prism sections, which is the most characteristic configuration of this embodiment, will be explained using FIG. 14(a). To make the explanation easier to understand, an example where no prism section is provided will be shown in FIG. 14(b).

First, as shown in FIG. 14(b), when the optical system of this section is constructed of only the refraction area of the cylindrical lens surface 104a shown in FIG. 13(a) above and the reflection area of the reflector 103 shown in FIG. 13(b), passing luminous flux whose irradiation is uncontrollable by these areas is produced unavoidably within the required irradiation range.

That is, this luminous flux is indicated by two-dot dashed lines A, A' and B, B' in FIG. 14(b) and realizing an efficient condensing action in this configuration will require the sizes of the reflector 103 and optical member 104 to be increased considerably.

An example of such a large sized optical system is an optical system which has a semi-ellipsoidal reflector whose approximate focal point coincides with the center of the light source and in which the irradiation angle distribution of the light reflected by the reflector matches the distribution of direct light limited by the aperture of the reflector.

In this case, however, such a system cannot be constructed unless the depth of the optical system in the direction of the optical axis is considerably large.

On the contrary, as shown in FIG. 14(a), when prism sections P are provided between the cylindrical lens surface 104a on the entrance surface and the peripheral sections 104b and 104b' of the optical member 104, the luminous flux incident on the refracting surface 104c and 104c' made up of flat surfaces (luminous flux passing as indicated by two-dot dashed lines A, A' and B, B' in FIG. 14(b) is refracted through the refracting surface 104c and 104c', entered into the prism sections, almost totally reflected by the reflecting surfaces 104d and 104d' made up of predetermined curved surfaces and changed to luminous flux having a light distribution characteristic almost equivalent to the irradiation angle distributions shown in FIGS. 13(a) and 13(b) above.

Here, as shown in the figure, the angle range of the luminous flux incident on the refracting surfaces 104c and 104c' is considerably narrow compared to the angle range of the luminous flux shown in FIGS. 13(a) and 13(b). For this reason, in order to fit the irradiation angle range of the luminous flux incident on the reflecting surfaces 104c and 104c' into the irradiation angle range shown in FIGS. 13(a) and 13(b), it is necessary to determine the shape of the reflecting surfaces 104c and 104c' in such a way that the irradiation angle range of the reflected light spreads considerably at a certain rate.

Based on this concept, this embodiment optimizes the shapes of the reflecting surfaces 104d and 104d' to non-spherical shapes so that the irradiation angle range of luminous flux incident on the refracting surfaces 104c and 104c' virtually matches (overlaps) the cylindrical lens surface 104a shown in FIGS. 13(a) and 13(b) and the irradiation angle range of the reflector 103.

Thus, all luminous flux emitted from the center of the discharge tube 102 is changed to luminous flux having a uniform light distribution in the direction perpendicular to the longitudinal direction (vertical direction) of the discharge tube 102 by respective optical actions of the cylindrical lens surface 104a shown in FIG. 13(a), the peripheral sections 103b and 103b' of the reflector 103 shown in FIG. 13(b) and the prism sections (refracting surfaces 104c and 104c' and reflecting surface 104d and 104d') P shown in FIG. 14(a), and these three types and a total of five layers of irradiation angle ranges are overlapped, which provides an efficient way to obtain a uniform light distribution characteristic as a whole.

On the other hand, as described above, the luminous flux emitted backward from the center of the discharge tube 102 is reflected by the semi-cylindrical section 103a of the reflector 103, passes through the center of the discharge tube 102 again and then goes out in the irradiation optical axis L. The behavior of the light beams thereafter is the same as that explained in FIG. 13(a), FIG. 13(b) and FIG. 14(a).

Here, an optimal distribution ratio between the cylindrical lens surface 104a of the optical member 104, reflector 103 and the prism section P of the optical member 104 will be explained using FIG. 14(a).

In this embodiment, it is preferable that the area of the cylindrical lens surface 104a shown in FIG. 13(a) and the reflection area by the reflector 103 shown in FIG. 13(b) form a basic condensing optical system and the minimum area connecting these areas be constructed of a reflection optical system (hereinafter referred to as "total reflection area") using a total reflex action by the prism sections P whose light path is shown in FIG. 14(a).

For the total reflection area of these prism sections P, it is preferable that an angle $\alpha$ formed by the straight line connecting the center of the discharge tube 102 and the ends of the total reflection area of the prism sections P with the irradiation optical axis L be within the following angle range:

$$20° \leq \alpha \leq 70° \qquad (1)$$

Here, if the angle $\alpha$ is smaller than 20° which is the lower limit in Formula (1), totally reflection of most incident luminous flux by the reflecting surface 104d and 104d' of the reflection optical system itself becomes difficult. That is, if the angle $\alpha$ is smaller than 20°, the angle of the prism sections P become considerably acute, requiring a shape which is deep in the thickness direction. This will make it difficult not only to construct but also to manufacture a thin-shaped optical system, which is a main subject of this embodiment.

On the other hand, when the angle $\alpha$ is greater than 70° which is the upper limit in formula (1), the condensing area by the reflector 103 decreases and the fact that the reflection area has been divided into the reflection area by the reflector 103 and the reflection area by the prism sections P itself becomes meaningless. That is, although it is possible to divide the light path through the optical system proposed this time and realize a uniform light distribution control within the required irradiation angle range through independent control by the reflector 103, the light path in this area is not used effectively. Furthermore, when the angle α is greater than the upper limit 70°, the aperture of the optical system in the vertical direction increases, in which case the thickness can be reduced but the increase of the aperture in the vertical direction will result in an increase of the overall size of the optical system, which is not preferable.

As an ideal mode, it is preferable to narrow this total reflection area to a necessary minimum and organize the system in such a way as to reduce light quantity loss and such a configuration makes it possible to minimize the thickness direction, make the shape simple and make the system easy to process.

In view of the above-described situation, this embodiment sets this total reflection area within a 20° range from 40° to 60° for optimization.

Then, optimal shapes for the refracting surfaces 104c and 104c' which will lead luminous flux to the reflecting surfaces 104d and 104d' of the prism sections P shown in FIG. 14(b) will be explained.

As is apparent from FIG. 14(a), luminous flux emitted from the center of the discharge tube 102 is largely refracted through refracting surfaces 104c and 104c', led in the direction away from the irradiation optical axis L and reach the reflecting surfaces 104d and 104d'. The ideal shapes of these refracting surfaces 104c and 104c' are the ones that will allow the largest possible part of luminous flux emitted from the discharge tube 102 is led to the reflecting surfaces 104d and 104d' and for this purpose, it is effective to adopt a configuration that luminous flux is refracted abruptly through the refracting surfaces 104c and 104c'.

This will also lead to shortening of the reflecting surfaces 104d and 104d' and a reduction of the size of the optical system in the thickness direction.

As a specific shape, it is preferable that the gradient of the refracting surfaces 104c and 104c', which are flat surfaces, with respect to the irradiation optical axis L be 0°. However, it is difficult to realize a flat surface with a gradient of 0° for reasons related to the processing accuracy due to the problem of moldability of the optical member 104. Therefore, this embodiment constructs these refracting surfaces 104c and 104c' as flat surfaces whose gradient θ with respect to the optical axis L is 4° or less also taking into account processing requirements. It is also possible to construct these refracting surfaces 104c and 104c' with curved surfaces, which are easier to process.

On the other hand, this embodiment is expected to have the unprecedented characteristic effects specific to this embodiment by segmenting the optical control area into smaller portions and overlapping ranges of irradiation from different control areas with one another.

First, the reflecting surfaces are constructed of discrete surfaces made of materials of different types instead of surfaces continuously arranged in the direction of the irradiation optical axis as in the case of conventional arts and those reflecting surfaces are placed overlapping with one another in the direction quasi-perpendicular to the irradiation optical axis L.

Such a configuration makes it possible to significantly reduce the thickness of the lighting optical system in the depth direction, which is the most outstanding feature of this embodiment. That is, as will be explained using FIG. 13(a), 13(b) and FIG. 14(a), reflecting surfaces 104d and 104d' are placed as the first reflection layers and the peripheral sections 103b and 103b' of the reflector 103, which are the second reflection layers, are placed outside the reflecting surfaces 104d and 104d' at positions in the direction of the optical axis L overlapping with them, thus making it possible to reduce the overall length of the reflecting surfaces in the direction of the optical axis L.

Second, it is possible to significantly reduce the thickness of the optical member 104 itself. That is, the configuration essential to the optical member 104 only includes the cylindrical lens surface 104a having positive refracting power near the irradiation optical axis L and the prism sections P to separate luminous flux directly incident from the discharge tube 102 and luminous flux reflected by the reflector 103, and it is possible to reduce the thickness of the peripheral sections 104b and 104b' which are the outermost areas. They are simple in shape, yet they can function sufficiently, which makes it possible to significantly reduce the overall thickness of the optical member 104.

This makes it possible not only to improve moldability of the optical member 104 but also to minimize a reduction of light quantity when light passes through resin material. It further contributes to a reduction of weight of the image pickup apparatus and other optical equipment to be mounted with this lighting apparatus. Moreover, the shape of the outermost surface is extremely simple and is constructed of surfaces with fewer optical restrictions, and therefore it is easy to maintain the optical member 104, and even when mounted on various optical apparatuses, there is no need to adopt any special support structure, providing a configuration quite easy to handle.

Third, adopting a plurality of reflection layers can prevent problems with a conventional light guide type electronic flash, that is, the problem that when an optical member made of a resin optical material is placed near the light source, heat produced from the light source deforms the optical member, making it impossible to obtain the original optical characteristic depending on the light-emitting condition. That is, providing a plurality of layers of reflecting surfaces in this way makes it possible to place the edge E, which is a boundary between the refracting surface and reflecting surface of the optical member, which is most vulnerable to heat, away from the light source and also expand the space around the light-emitting discharge tube 102, and therefore it is possible to minimize influences on resin materials (optical member 104) of radiant heat and convection heat produced during continuous light emissions and prevent deterioration of the optical characteristic.

Thus, this embodiment can construct a small, thin shape and extremely efficient lighting optical system with little light quantity loss due to irradiation to the outside of the required irradiation range using a fewer members such as the reflector 103 and optical member 104.

Next, a condensing action of this embodiment in the longitudinal direction of the discharge tube will be explained using FIG. 15.

FIG. 15 shows a sectional view when the optical system is cut with a plane including the center axis of the light-emitting discharge tube 102 and also shows a traced lines of light from the center in the longitudinal direction and from the center in the radial direction of the discharge tube 102 together.

As shown in the figure, the side of the optical member 104 from which luminous flux goes out is constructed of a prism section 104f formed in the central area in the longitudinal direction of the discharge tube 102 with both slopes having the same angle and Fresnel lens sections 104g and 104g' formed in the peripheral sections. In this embodiment, apex angle of the prism section 104f in the central area is fixed to 105°.

The prism section 104f in the central area of the optical member 104 formed in such the angle setting has the effect of allowing a luminous flux component with a relatively large angle of incidence (member whose angle in the prism section after incidence is 30° to 40°) to go out of the plane with the same angle of refraction on the entrance surface, that is, the effect of allowing this luminous flux to go out of the exit surface with little influence of refraction on the exit surface as well as the effect of condensing the incident luminous flux to luminous flux within a certain irradiation angle range.

This embodiment has described the case where the apex angle of this prism section 104f is fixed to 105°, but this embodiment is not limited to this angle and setting it to a smaller angle, for example, 90° makes it possible to narrow the irradiation angle range after the luminous flux goes out of the optical member 104. On the other hand, widening the apex angle, for example, to 120° makes it possible to widen the irradiation angle range after luminous flux goes out of the optical member 104.

On the other hand, as also shown in FIG. 15, part of luminous flux incident on the prism section 104f is almost totally reflected by the prism surface and is returned to the discharge tube 102 side again. This luminous flux is reflected by the reflector 103, entered into the optical member 104 again, changed to a predetermined angle component by the prism section 104f or Fresnel lens sections 104g and 104g' and then irradiated onto an object.

Thus, most of luminous flux emitted from the center of the discharge tube 102 is changed to luminous flux with a certain angle distribution and goes out of the optical member 104. The light distribution of illuminating light in this case is only dependent on the angle setting of the apex angle of the prism section 104f and not affected by the pitch, etc. of the prism section 104f. Thus, it is possible to perform condensing control in an extremely shallow area without the need for the depth in the direction of the optical axis L, and thereby drastically reduce the size of the overall optical system.

Furthermore, as shown in the figure, Fresnel lens sections 104g and 104g' are formed in the peripheral sections on the exit surface side of the optical member 104. Though the optical member 104 is constructed in a thin shape, the area peripheral to the optical member 104 is an area where luminous flux has certain directivity and forming a Fresnel lens section in this part makes it possible to perform condensing action relatively efficiently.

FIG. 15 shows no outstanding condensing action, but this is because only luminous flux emitted from the center of the discharge tube 102 is shown and with respect to the luminous flux emitted from the periphery of the terminals at both ends of the discharge tube 102, considerable part of luminous flux is changed to a member concentrating near the irradiation optical axis L.

Thus, adjusting the shape of the exit surface of the optical member 104 allows even quite a thin-shaped optical system close to the discharge tube 102 to efficiently condense irradiation luminous flux within a certain angle range.

Moreover, the light distribution in the longitudinal direction (horizontal direction) of the discharge tube 102 is controlled by a condensing action of the prism section 104f on the outgoing light side of the optical member 104 and Fresnel lens sections 104g and 104g' and the light distribution in the direction perpendicular to the longitudinal direction (vertical direction) of the discharge tube 102 is controlled by an efficient condensing action of the cylindrical lens surface 104a on the entrance surface side of the optical member 104, prism section P and reflector 103. This provides an unprecedentedly thin-shaped lighting optical system with an excellent optical characteristic.

This embodiment has described the case where the light distribution in the direction perpendicular to the longitudinal direction of the discharge tube 102 is controlled by dividing light distribution into areas of three types and five layers by the cylindrical lens surface 104a provided on the entrance surface side of the optical member 104, prism section P and reflector 103 so that the irradiation angle ranges of the respective areas overlap (match) with one other. However, the present invention is not limited to this mode.

That is, when the light source has a size exceeding a certain value, there may also be cases where it is preferable to differentiate the irradiation angle ranges. For example, the irradiation angle of the cylindrical lens surface close to the light source has a tendency to spread considerably when the light source is large. On the other hand, the degree of condensing of a luminous flux component under the control of the reflector farthest from the light source is not reduced even if the light source is relatively large, and the luminous flux component has a distribution not much deviated from the initially set irradiation angle distribution.

From this, it is preferable to set the cylindrical lens surface placed close to the light source so that the irradiation angle range of luminous flux emitted from the center of the light source is narrower than a preset desired irradiation angle range. Likewise, with respect to the reflector and prism section, it is preferable to set the irradiation angle ranges one by one after reflections according to the positions from the center of the light source instead of setting a common irradiation angle range uniformly.

That is, it is preferable to preset an area near the light source so that the angle range of outgoing luminous flux from the center of the light source becomes narrower and set the prism section away from the light source so that the light distribution characteristic from the center of the light source becomes a desired light distribution characteristic, when the lighting optical system similar to this embodiment is applied to a light source having a finite size which is not negligible.

Furthermore, instead of overlapping all irradiation angle ranges with one another, it is also possible to determine an irradiation angle range for each area so that when combined, a uniform distribution is obtained as a whole.

Furthermore, this embodiment has described the case where the configuration of each entrance surface of the optical member 104 and the configuration of each exit surface are symmetrical with respect to the optical axis L. However, this embodiment is not limited to such a symmetric shape.

For example, the prism sections P on the entrance surface side of the optical member 104 are placed symmetrically with respect to the optical axis L, but the prism sections P need not be placed in such symmetric positions and can be placed asymmetrically. This is true not only for the prism sections P but also for the shape of the reflector 103 and the shape of the cylindrical lens surface 104a in the central area.

Furthermore, with respect to the prism section 104f formed in the center in the longitudinal direction of the discharge tube 102 on the exit surface side, it is also possible to use prisms with different angle settings for the right and left sides so as to provide variations in the light distribution characteristic between the rightward and leftward directions. Or with respect to the Fresnel lens sections 104g and 104g' it is also possible to provide variations in the degree of condensing and variations in the overall light distribution characteristic.

Furthermore, this embodiment has described the case where the shapes of the peripheral sections 103b and 103b' of the reflector 103 are non-spherical so that luminous flux emitted from the center of the light source have a uniform distribution on the irradiation surface, but the shape of the reflector 103 is not limited to such a shape. For example, the shape can also be semi-ellipsoidal whose focal position coincides with the center of the light source.

Thus, by constructing the peripheral sections of the reflector 103 with the semi-ellipsoidal surface and placing another focal position of the semi-ellipsoidal surface near the exit surface of the optical member 104, it is possible to allow luminous flux controlled by the reflector 103 to converge within a narrow range and reduce the aperture of the lighting optical system in the vertical direction to a minimum size.

Furthermore, this embodiment has described the case where the shape of the cylindrical lens surface 104a formed in the central area of the optical member 104 is non-spherical, but the cylindrical lens surface 104a is not always limited to the non-spherical shape and can also be cylindrical. The cylindrical lens surface 104a can also be toric lens surface taking into account the condensing performance of the discharge tube 102 in the longitudinal direction.

Figure 19:
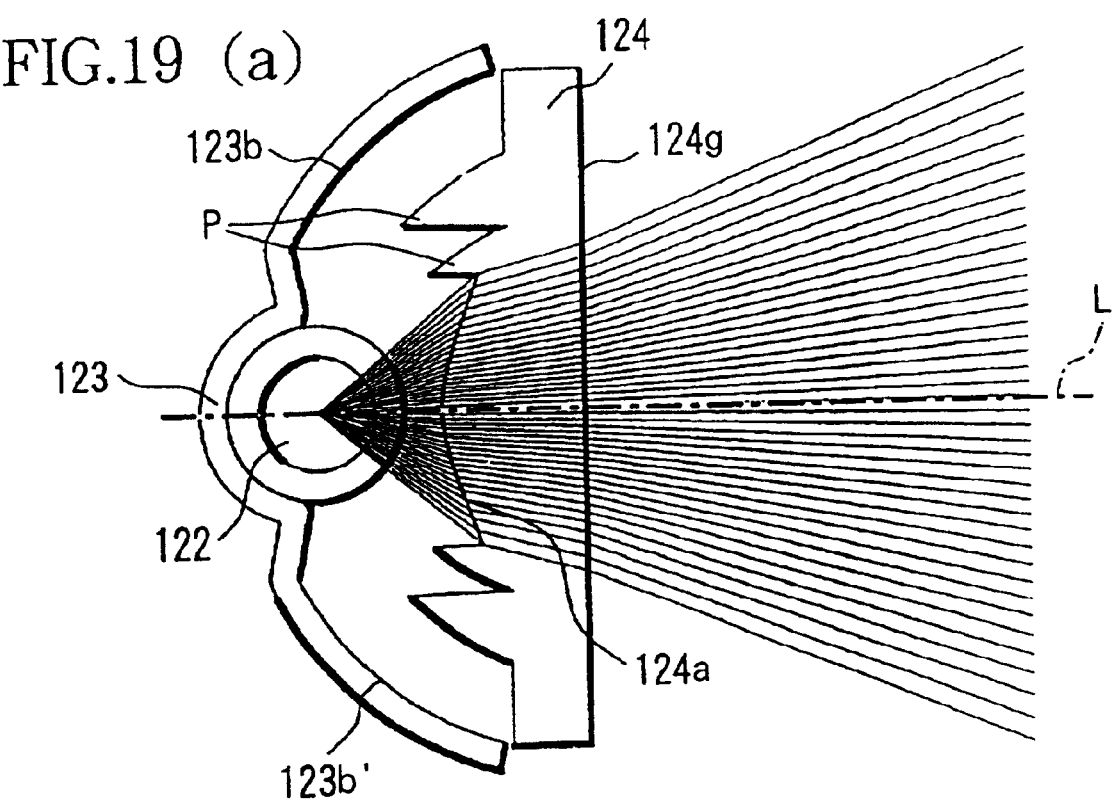
FIG. 19 is a longitudinal sectional view of a lighting apparatus, which is another embodiment of the present invention in the radial direction of a discharge tube.
Figure 19:
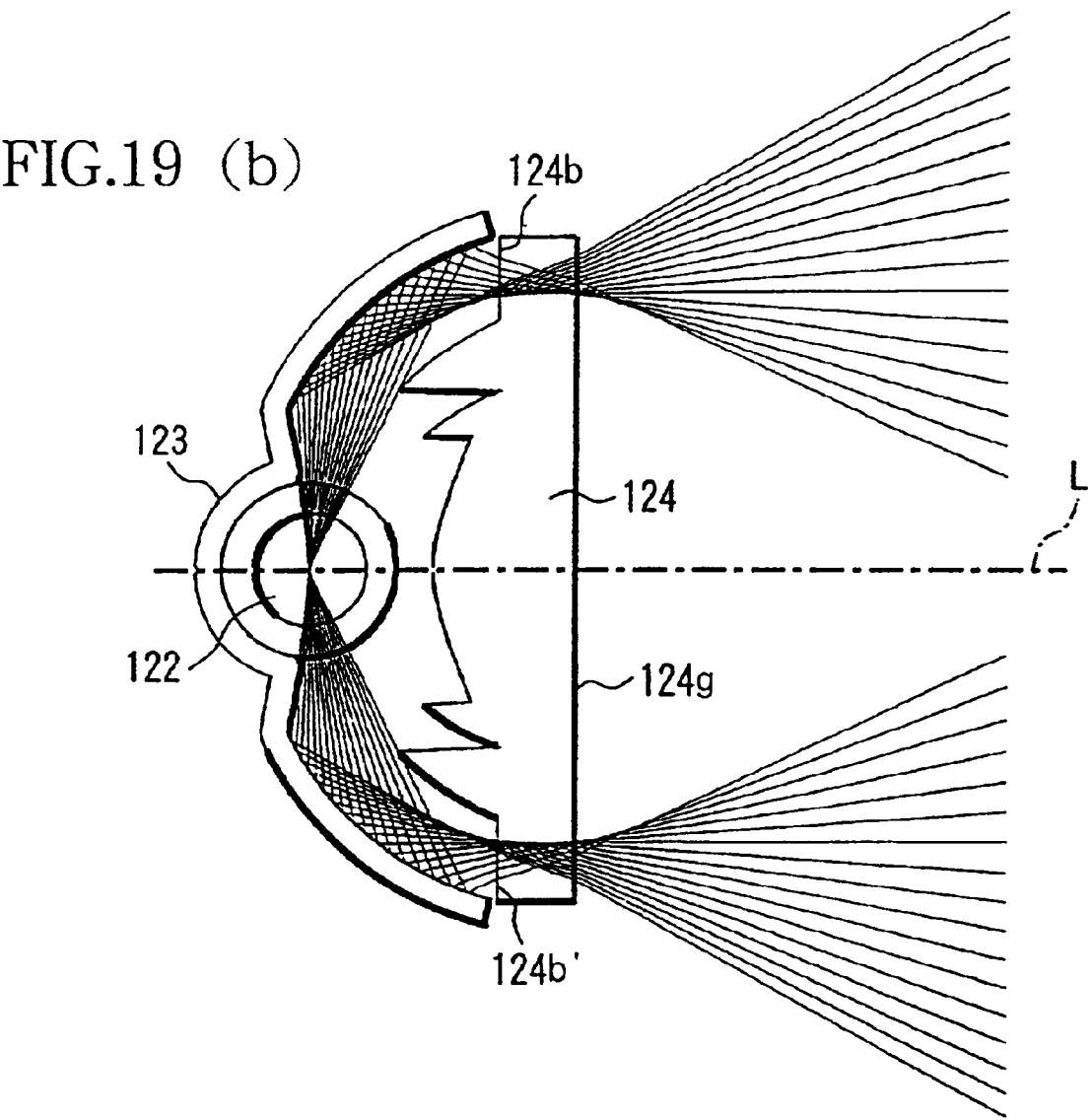
Figure 20:
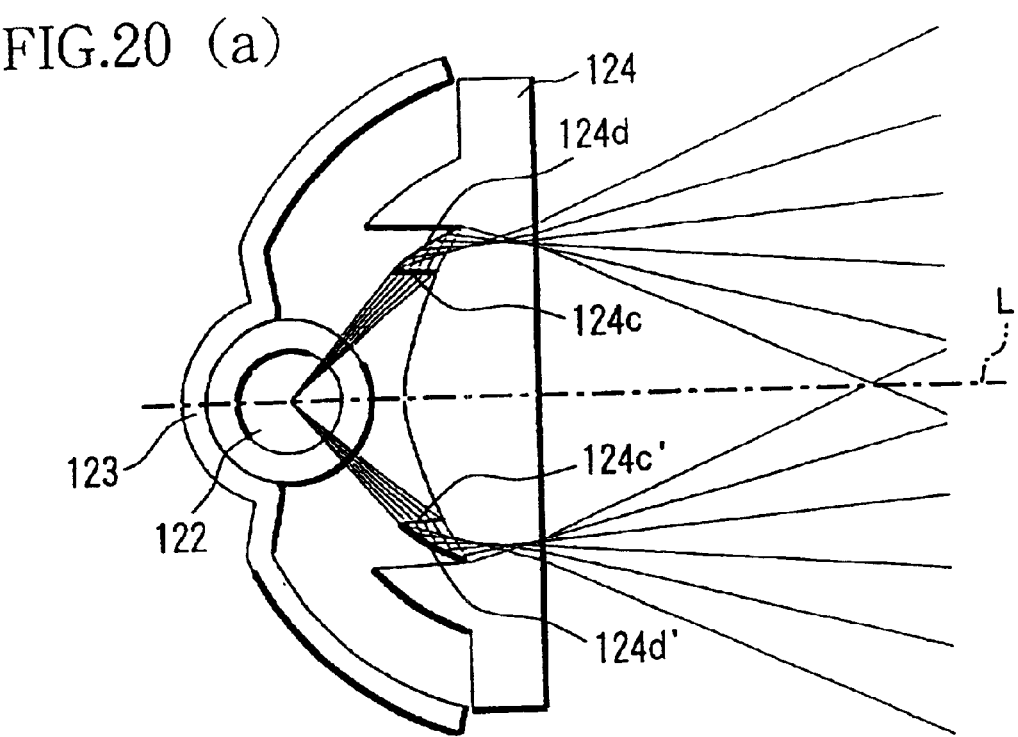
FIG. 20 is a longitudinal sectional view of the lighting apparatus according to the embodiment shown in FIG. 19 in the radial direction of the discharge tube.
Figure 20:
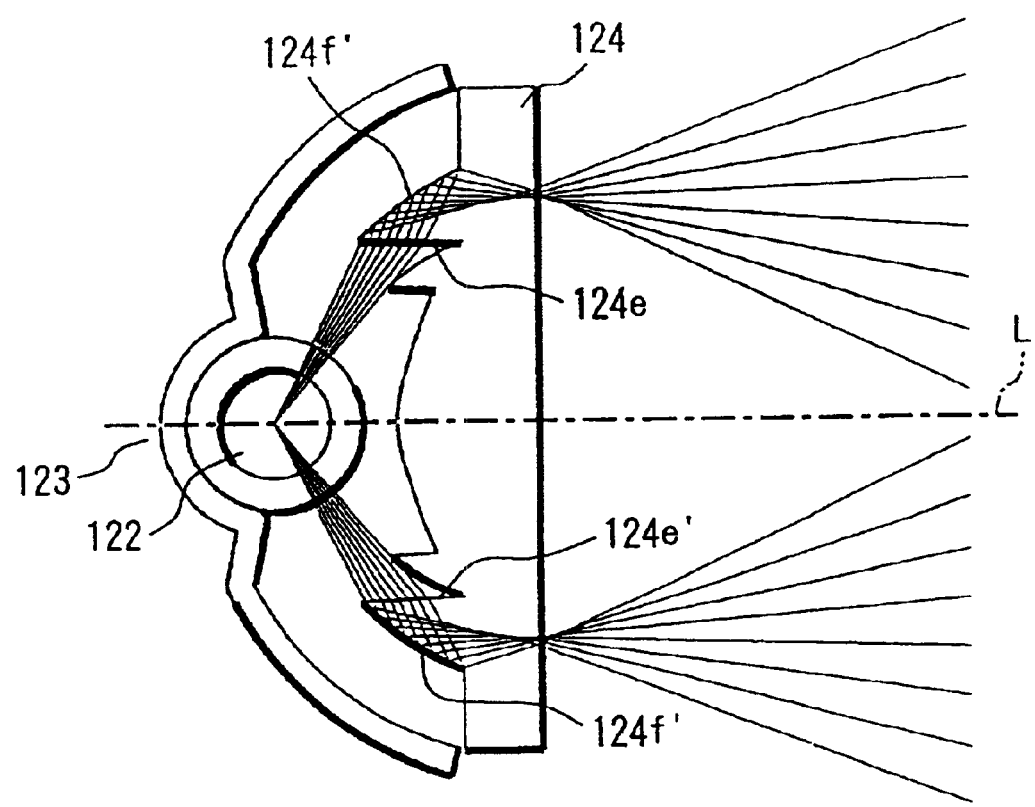

FIG. 19 and FIG. 20 show a lighting apparatus, which is another embodiment of the present invention and especially this embodiment shows an apparatus incorporated in the camera that emits electronic flash light. FIG. 19 and FIG. 20 are longitudinal sectional views of the optical system of the above-described lighting apparatus cut with a plane including the radial direction of the discharge tube and also show traced drawings of representative light emitted from the center of the light source. Furthermore, FIG. 19 and FIG. 20 show luminous flux emitted from the center of the light source on the same section according to the position of light incident on the optical member.

In the same figure, reference numeral 122 denotes a light-emitting discharge tube (xenon tube) and 123 denotes a reflector. The reflector 123 has almost the same shape as the reflector 103 in the above-described embodiment (described in FIG. 13 to FIG. 18) and the back of the reflector 123 facing the center of the light source in the direction of irradiation optical axis L is formed semi-cylindrical (hereinafter referred to as "semi-cylindrical section 123a") almost concentric with the light-emitting discharge tube 122. Furthermore, the peripheral sections 123b and 123b' of the reflector 123 are formed so as to cover the front space between the light-emitting discharge tube 122 and optical member 124 and the peripheral sections 123b and 123b' are constructed of quasi-ellipsoidal curved surfaces of second order so that the luminous flux reflected by the peripheral sections concentrates on the upper and lower peripheral sections 123b and 123b' of the optical member 124.

However, as is apparent from the illustrated shape, the ratio of the semi-cylindrical section 123a to the peripheral sections 123b and 123b' is different from the above-described embodiment. That is, the semi-cylindrical section 123a of the reflector 123 is not just half the size of a cylinder but is shaped so as to cover an area (area of approximately 160° in the shown configuration) slightly narrower than the semi-cylinder and the peripheral sections 123b and 123b' are deformed to make up for this lack of coverage.

The reason that the semi-cylindrical section 123a is small is that luminous flux reflected by this semi-cylindrical section 123a is basically a member that reenters the glass tube of the light-emitting discharge tube 122 and this shape of the semi-cylindrical section 123a is intended to prevent adverse influences produced in this case.

The adverse influences here refer to that luminous flux reenters or goes out of the discharge tube 122 through a glass tube and a loss member is produced in this case which is caused by surface reflections, about four times on average in a direction which is different from the originally intended direction, reducing the amount of luminous flux which can be utilized effectively. In order to minimize this loss member, this embodiment extends the peripheral sections 123b and 123b', directly increases the member led by the optical member 124 of the light reflected by the reflector 123 without the intermediary of the discharge tube 122 and thereby excludes stray light caused by surface reflection as much as possible and provides a highly efficient optical system.

Reference numeral 124 is an optical member made up of a one-piece transparent body. In the central area though which the irradiation optical axis L passes on the entrance surface side of this optical member 124, a cylindrical lens surface 124a having positive refracting power in the direction perpendicular to the longitudinal direction of the light-emitting discharge tube 122 is formed and parallel flat surfaces are formed in the upper and lower peripheral sections 124b and 124b', and furthermore two pairs of prism sections (reflecting sections) P having refracting surfaces 124c and 124c', and reflecting surfaces 124d and 124d' are formed between the cylindrical lens surface 124a and the upper and lower peripheral sections 124b and 124b'.

The most characteristic configuration of this embodiment is that two pairs of prism sections P are formed in the optical member 124.

As described above, even if the reflecting surfaces (peripheral sections 124b, 124b') formed on the front side of is extended, this is a configuration without increasing the thickness of the lighting optical system in the direction of the optical axis L, that is, the configuration effective to keep the thickness of the lighting optical system almost the same as the lighting optical system explained in the above-described embodiment. That is, if the irradiation range that can be controlled by the above-described front reflecting surfaces is simply widened in this condition, the aperture in the vertical direction of the reflector 123 is widened and at the same time the thickness in the direction of the optical axis L is also increased. To avoid this situation, the angle range of luminous flux controlled by the prism section of the optical member 124 is widened to absorb this. As the configuration that widens the range of control by the prism section and avoids an increase of the thickness in the direction of the optical axis L, this embodiment adopts a method of forming a plurality of layers of prism sections in the optical member 124.

The detailed shape of the optical system will be explained using light beam traced drawings shown in FIG. 19 and FIG. 20.

In the same figure, the inner and outer diameters of the glass tube are shown as the discharge tube 122. As in the case of the above-described embodiment, for simplicity of explanation, luminous flux emitted from the center of the light source is regarded as representative luminous flux and these figures only show this representative luminous flux. The actual light distribution characteristic as a whole slightly changes in the direction in which light distribution characteristic spreads as a whole due to luminous flux emitted from the peripheral sections of the light-emitting discharge tube in addition to the representative luminous flux shown in the figure, but since the tendency of the light distribution characteristic is almost the same, this case will be explained according to this representative luminous flux below.

As shown in FIG. 19(*a*), in the central area on the entrance surface side of the optical member 124, a cylindrical lens surface 124*a* having positive refracting power within the plane perpendicular to the irradiation optical axis L is formed. In this way, luminous flux passing near the irradiation optical axis L out of the luminous flux emitted from the discharge tube 122 is changed to luminous flux having a uniform light distribution within a predetermined angle range and goes out of the exit surface 124*g* of the optical member 124.

Here, in order to provide a uniform light distribution characteristic, the cylindrical lens surface 124*a* of the optical member 124 is constructed to have a continuous non-spherical shape so that a proportionality relation is established between the angle of outgoing light from the center of the discharge tube 122 and the angle of outgoing light after luminous flux passes through the optical member 124 and so that luminous flux is condensed at a certain rate.

Next, as shown in FIG. 19(*b*), a luminous flux component emitted from the center of the discharge tube 122, which forms a large angle with the optical axis and which directly enters the peripheral sections 123*b* and 123*b*' of the reflector 123 will be explained. Here, the peripheral sections 123*b* and 123*b*' of the reflector 123 are shaped so as to have almost the same irradiation angle range as that in FIG. 19(*a*) and uniform distribution after the above-described member is reflected.

The luminous flux reflected by the peripheral sections 123*b* and 123*b*' of the reflector 123 enters from the peripheral sections 124*b* and 124*b*' of the optical member 124 to the optical member 124 and goes out of the exit surface 124*g*. However, the peripheral sections 124*b* and 124*b*' of the optical member 124 have no power in the direction perpendicular to the irradiation optical axis L (vertical direction) and the luminous flux passing through this section is irradiated with the same light distribution characteristic adjusted by the peripheral sections 123*b* and 123*b*' of the reflector 123.

Thus, the peripheral sections 123*b* and 123*b*' of the reflector 123 have the functions of not only uniformly condensing luminous flux which directly enters from the discharge tube 122 within a certain angle range but also leading the reflected luminous flux to a narrow passing area of the peripheral sections 124*b* and 124*b*' of the optical member 124, that is, the function of changing the direction. As a result, it is possible to obtain a uniform light distribution for the required irradiation range as in the case of FIG. 19(*a*). Furthermore, the peripheral sections 123*b* and 123*b*' of the reflector 123 and the cylindrical lens surface 124*a* can perform condensing (irradiation) control forming completely different light paths independent of each other.

Then, light paths through the prism sections, which is the major characteristic of this embodiment shown in FIGS. 20(*a*) and 20(*b*) will be explained.

As shown in FIG. 20(*a*), of the upper and lower prism sections provided between the cylindrical lens surface 124*a* on the entrance surface of the optical member 124 and the peripheral sections 124*b* and 124*b*', luminous flux incident on the refracting surfaces 124*c* and 124*c*' made up of flat surfaces of the prism sections P, which are inside with respect to the optical axis is refracted through the refracting surfaces 124*c* and 124*c*', enters into the prism sections, almost totally reflected by the reflecting surfaces 124*d* and 124*d*' made up of predetermined curved surfaces and changed to luminous flux having a light distribution characteristic almost equivalent to the irradiation angle distribution in above-described FIGS. 19(*a*) and 19(*b*).

Here, as shown in the figure, the angle range of luminous flux incident on the refracting surfaces 124*c* and 124*c*' is considerably narrower than the angle range of luminous flux shown in FIGS. 19(*a*) and 19(*b*). Thus, in order to fit the irradiation angle range of luminous flux incident on the refracting surfaces 124*c* and 124*c*' into the irradiation angle range shown in FIGS. 19(*a*) and 19(*b*), it is necessary to adjust the shapes of the reflecting surfaces 124*d* and 124*d*' so that the irradiation angle range of the reflection luminous flux is significantly spread at a certain rate.

Based on this concept, this embodiment uses optimized non-spherical shapes as the shapes of the reflecting surfaces 124*d* and 124*d*' so that the irradiation angle range of luminous flux incident on the refracting surfaces 124*c* and 124*c*' almost matches (overlaps) the irradiation angle range of the cylindrical lens surface 124*a* and reflector 123 shown in the FIGS. 19(*a*) and 19(*b*).

Furthermore, as shown in FIG. 20(*b*), of the upper and lower prism sections P, luminous flux incident on the refracting surfaces 124*e* and 124*e*' made up of flat surfaces of the outer prism sections P is refracted through the refracting surfaces 124*e* and 124*e*', enters into the prism sections P, almost totally reflected by reflecting surfaces 124*f* and 124*f*' made up of predetermined curved surfaces and changed to luminous flux having a light distribution characteristic almost equivalent to the irradiation angle distribution in above-described FIGS. 19(*a*) and 19(*b*).

Thus, all luminous flux emitted from the center of the discharge tube 122 is changed to luminous flux with a uniform light distribution on the section quasi-perpendicular to the longitudinal direction of the discharge tube 122 by optical actions of the cylindrical lens surface 124*a* shown in FIG. 19(*a*), the peripheral sections 123*b* and 123*b*' of the reflector 123 shown in FIG. 19(*b*), and the upper and lower prism sections (refracting surfaces 124*c* and 124*c*', 124*e*, 124*e*' and reflecting surfaces 124*d* and 124*d*', 124*f*, 124*f*') P shown in FIGS. 20(*a*) and 20(*b*), and by overlapping irradiation angle ranges of these four types and a total of 7 layers with one another, it is possible to efficiently obtain a uniform light distribution characteristic as a whole.

On the other hand, as described above, luminous flux emitted from the center of the discharge tube 122 backward is reflected by the semi-cylindrical section 123*a* of the reflector 123, passes through the center of the discharge tube 122 again and then goes out forward in the direction of the irradiation optical axis L. The behavior of the luminous flux thereafter is the same as that shown in FIG. 19 and FIG. 20.

The shape of the discharge tube 122 in the longitudinal direction according to this embodiment is the same as that of the above-described embodiment.

According to this embodiment described above, as in the case of the lighting apparatus of the above-described embodiment, it is possible to construct a small, thin-shaped and extremely highly efficient lighting optical system with low light quantity loss due to irradiation to the outside the required irradiation range using only a small number of members such as the reflector 123 and optical member 124.

Moreover, this embodiment allows the peripheral sections 123*b* and 123*b*' of the reflector 123 to wrap around the discharge tube 122 to the back of the discharge tube 122 and forms two layers of prism sections P of the optical member 124 on both the upper and lower sides, and can thereby construct a lighting optical system utilizing light-emitting energy from the discharge tube 122 more effectively without increasing the overall size of the lighting optical system compared to the above-described embodiment.

Figure 21:
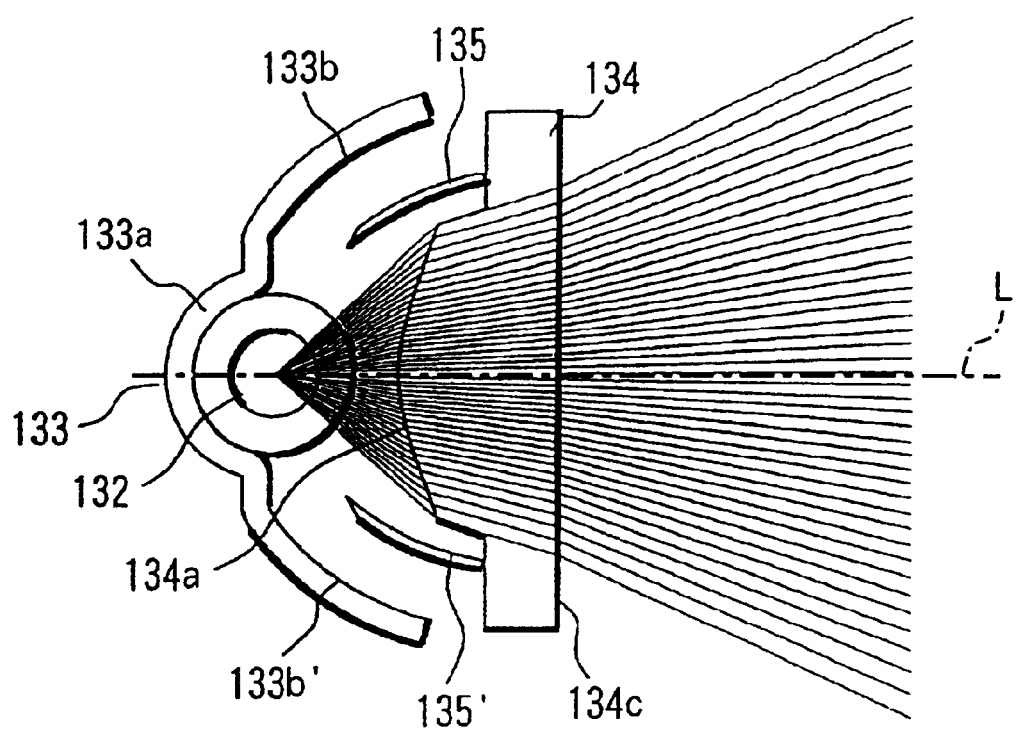
FIG. 21 is a longitudinal sectional view of a lighting apparatus, which is another embodiment of the present invention in the radial direction of a discharge tube.
Figure 21:
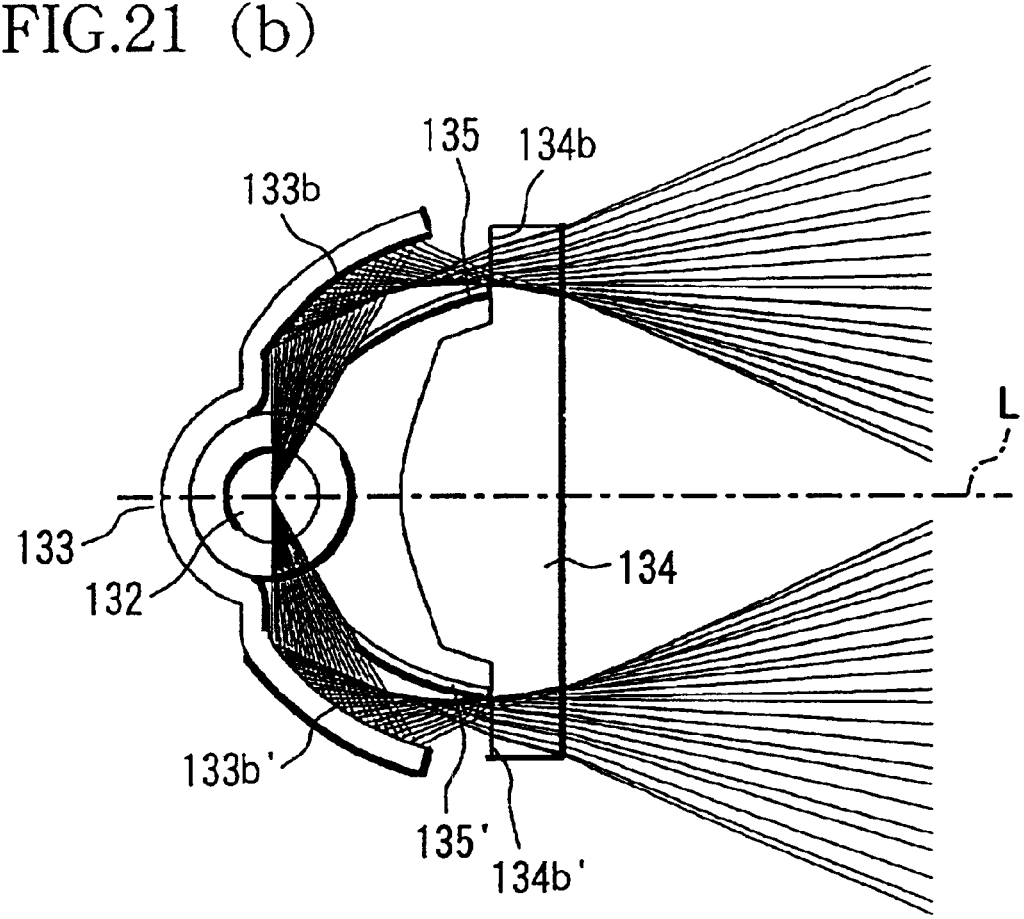
Figure 22:
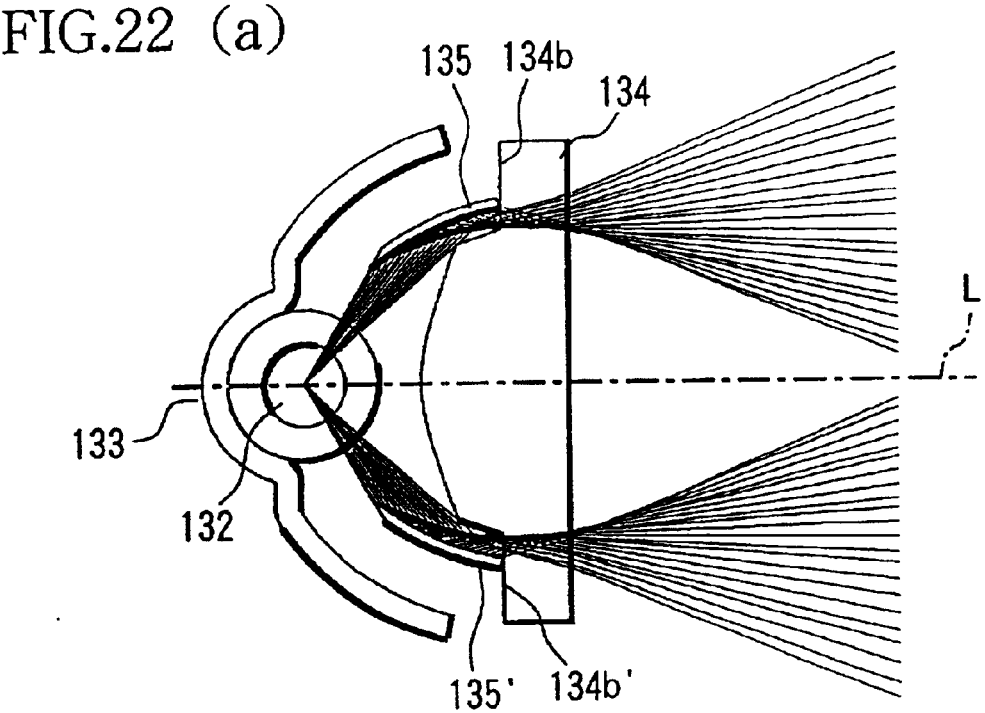
FIG. 22 is a longitudinal sectional view of the lighting apparatus according to the embodiment shown in FIG. 21 in the radial direction of the discharge tube.
Figure 22:
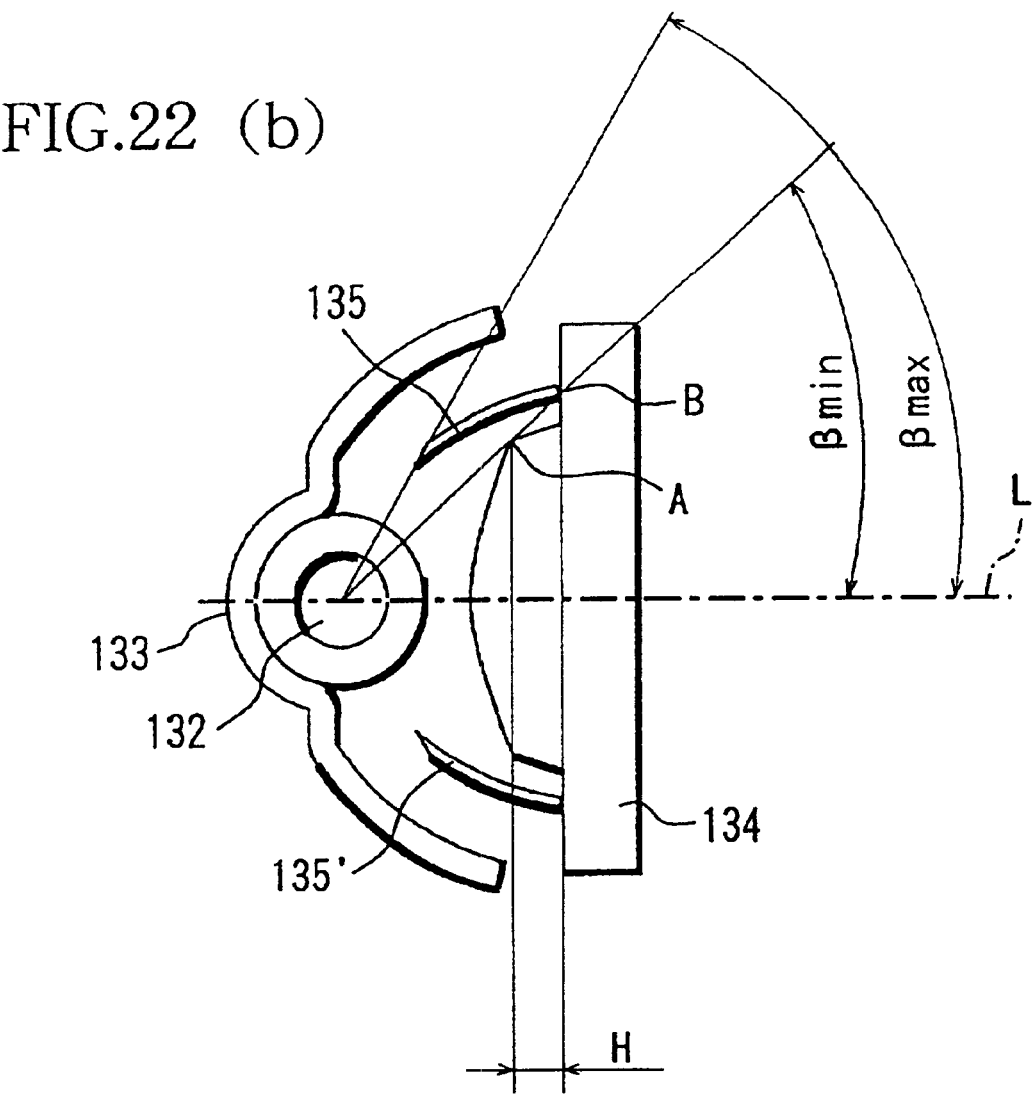
Figure 23:
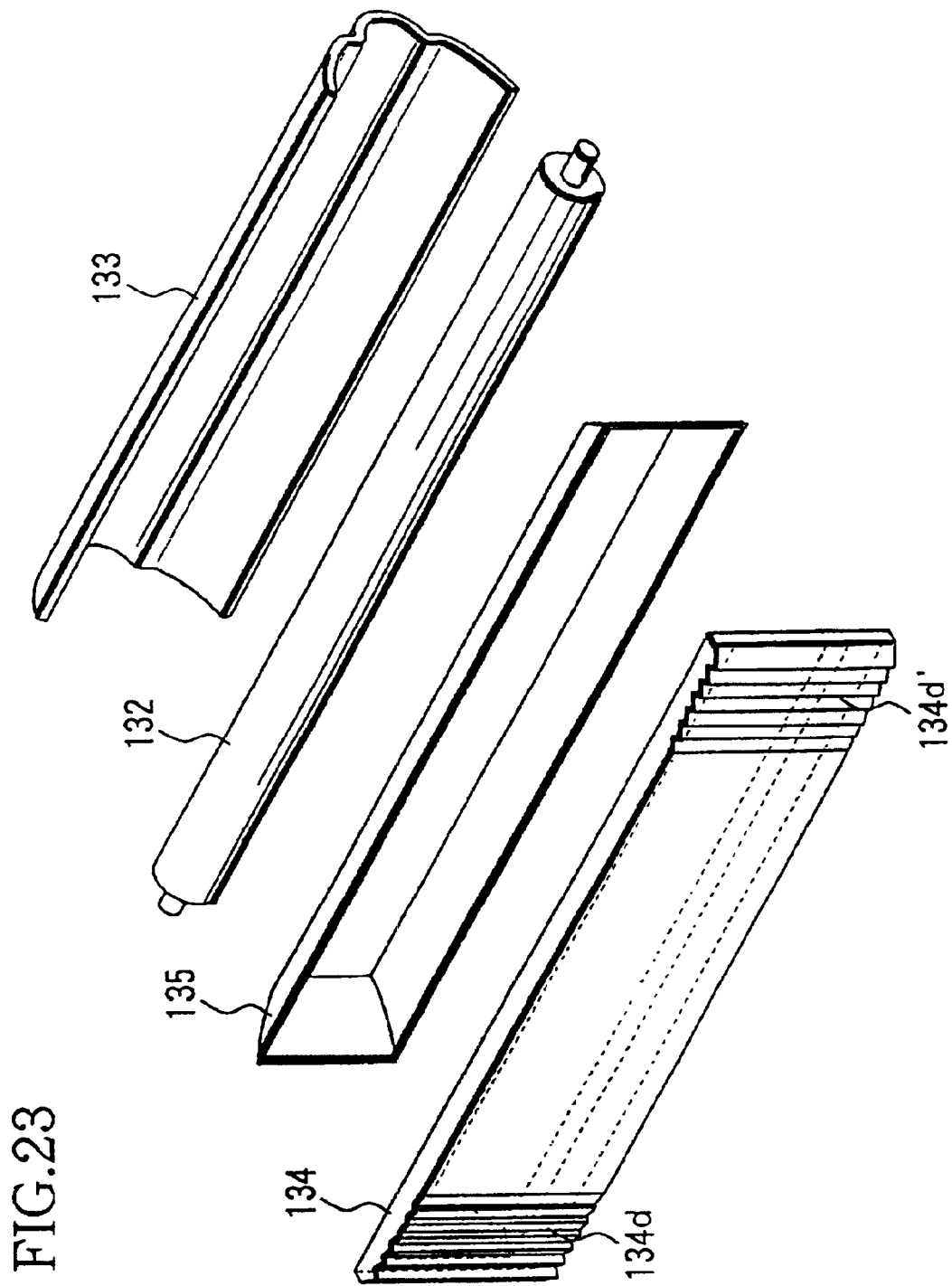
FIG. 23 is an exploded perspective view of the lighting apparatus according to the embodiment shown in FIG. 21.

FIG. 21 to FIG. 23 show a lighting apparatus, which is another embodiment of the present invention, especially an apparatus incorporated in a camera in this embodiment that emits electronic flash light. FIG. 21 and FIG. 22 show longitudinal sectional views of the optical system of the above-described lighting apparatus cut with a plane including the radial direction of the discharge tube and FIG. 21(*a*) and 21(*b*) and FIG. 22(*a*) also show traced lines of representative light emitted from the center of the light source. FIG. 21(*a*) and 21(*b*) and FIG. 21(*a*) also show different luminous flux components emitted from the center of the light source on the same section according to the positions of luminous flux components incident on the optical member. FIG. 23 is an exploded perspective view of the optical system of the above-described lighting apparatus.

In these figures, reference numeral 132 denotes a light-emitting discharge tube (xenon tube) and 133 denotes a reflector (first reflection member). This reflector 133 has almost the same shape as the reflector of the above-described embodiment (described in FIG. 19 and FIG. 20).

Furthermore, reference numeral 134 denotes an optical member made up of a one-piece transparent body. In the central area through which the irradiation optical axis L passes on the entrance surface side of this optical member 134, a cylindrical lens surface 134*a* having positive refracting power in the direction perpendicular to the longitudinal direction (vertical direction) of the discharge tube 132 is formed, and parallel flat surfaces are formed in the upper and lower peripheral sections 134*b* and 134*b'*. A high transmittance optical resin material such as acrylic resin or glass material is suitable as the material of this optical member 134.

Furthermore, reference numerals 135 and 135' denote reflectors (second reflection members) placed in an area between the cylindrical lens surface 134*a*. And the peripheral sections 134*b* and 134*b'* of the optical member 134 and their sections perpendicular to the longitudinal direction of the discharge tube 132 are constructed of curved surfaces. Furthermore, at least the inner sides of these reflectors 135 and 135' are made of a high reflectance material and these reflectors 135 and 135' are much thinner than the reflector 133.

Then, an optimal method of setting the optical system of the lighting apparatus in this embodiment which is of a thin-shaped, capable of uniformly and efficiently irradiating illuminating light within the required irradiation range, simplifying the shape of the optical member 134 as much as possible to make it easier to process will be explained using FIG. 21 and FIG. 22.

FIG. 21 and FIG. 22 are sectional views of the lighting apparatus of this embodiment cut in the radial direction of the discharge tube and show a basic concept for narrowing the light distribution characteristic in the vertical direction within a narrow irradiation angle. FIG. 21(*a*), 21(*b*) and FIG. 22(*a*) show traced light beams on the same section in different cases and reference numerals in the figures correspond to the members in FIG. 23.

In these figures, the inner and outer diameters of the glass tube are shown as the discharge tube 132. As in the case of the above-described embodiment, for simplicity of explanation, luminous flux emitted from the center of the light source, that is, the discharge tube 132 is regarded as the representative luminous flux and this representative luminous flux will be used in the following explanations.

The back of the reflector 133 facing the center of the discharge tube 132 in the direction of the irradiation optical axis L is semi-cylindrical (hereinafter referred to as "semi-cylindrical section 133*a*") almost concentric with the discharge tube 132. This is a shape effective for returning light reflected by the reflector 133 to the vicinity of the center of the light source again and has the effect of reducing adverse influences of refraction by the glass section of the light-emitting discharge tube 132.

On the other hand, the upper and lower peripheral sections 133*b* and 133*b'* of the reflector 133 have curved surfaces so that the reflected luminous flux has a certain uniform light distribution characteristic.

Furthermore, as will be explained below, by determining the shapes of the optical member 134 and reflector 135, it is possible to obtain a light distribution, which is thin in the direction of the optical axis L and uniform within the required irradiation range.

First, as shown in FIG. 21(*a*), luminous flux emitted from the discharge tube 132 toward the vicinity of the irradiation optical axis L is changed to luminous flux having a uniform light distribution within a predetermined angle range by the cylindrical lens surface 134*a* and then goes out of the exit surface 134*c* of the optical member 134.

Here, to provide a uniform light distribution characteristic, the cylindrical lens surface 134*a* of the optical member 134 is designed to have a continuous non-spherical shape so that the angle of luminous flux emitted from the center of the discharge tube 132 and the angle of luminous flux going out after passing through the optical member 134 have a proportional relation to condense the outgoing luminous flux at a certain rate.

Then, as shown in FIG. 21(*b*), of the luminous flux emitted from the center of the discharge tube 132, the luminous flux component forming a large angle with the optical axis L and directly entering the peripheral sections 133*b* and 133*b'* of the reflector 133 will be explained. The peripheral sections 133*b* and 133*b'* of the reflector 133 are shaped so that the above-described member is reflected by the peripheral sections 133*b* and 133*b'* and then spreads uniformly within almost the same irradiation angle range as that in FIG. 21(*a*).

The luminous flux reflected by the peripheral sections 133*b* and 133*b'* of the reflector 133 enters into the optical member 134 from the peripheral sections 134*b* and 134*b'* of the optical member 134 and goes out of the exit surface 134*c*. However, the peripheral sections 134*b* and 134*b'* of the optical member 134 have no power in the direction perpendicular to the longitudinal direction (vertical direction) of the discharge tube 132 and luminous flux passing through these areas is irradiated with the same light distribution characteristic adjusted by the peripheral sections 133*b* and 133*b'* of the reflector 133.

Thus, the peripheral sections 133*b* and 133*b'* of the reflector 133 have the function of condensing the direct light from the discharge tube 132 within a certain angle range uniformly and the function of changing the direction, that is, leading the reflected luminous flux to the narrow passing area of the peripheral sections 134*b* and 134*b'* of the optical member 134. As a result, it is possible to obtain a uniform light distribution within the required irradiation range as in the case of FIG. 21(*a*). Furthermore, the peripheral sections 134*b* and 134*b'* of the reflector 134 and the cylindrical lens surface 134*a* can perform condensing (irradiation) control forming completely different light paths which are independent of each other.

Then, light paths through the reflector 135, which is the major characteristic of this embodiment will be explained using FIG. 22(a).

As shown in the figure, reflectors 135 and 135' control luminous flux passing through the boundary between the above-described two light paths. These reflectors 135 and 135' are placed inside the reflector 133 and positioned and kept by a support (not shown) so that the aperture is formed at a certain distance from the cylindrical lens section 134a of the optical member 134 toward the periphery.

Moreover, as shown in the figure, the reflectors 135 and 135' are made up of curved surfaces which are concave toward the irradiation optical axis L with respect to this section and luminous flux emitted from the center of the discharge tube 132 entering these reflector 135 and 135' follows the light path of being changed to have a certain angle distribution, entering the peripheral sections 134b and 134b' of the optical member 134 and going out of the exit surface 134c. As a result, the luminous flux is changed to luminous flux having the light distribution characteristic almost equivalent to the irradiation angle distribution in FIGS. 21(a) and 21(b).

Here, as shown in the figure, the irradiation angle range of luminous flux incident on the reflectors 135 and 135' is much narrower than the irradiation angle range of the luminous flux shown in FIGS. 21(a) and 21(a), but by optimizing the shapes of the reflectors 135 and 135' to widen the angle range at a certain rate, it is possible to almost match the irradiation angle range with the irradiation angle range of the cylindrical lens surface 123a and reflector 133 shown in FIGS. 21(a) and 21(b).

Thus, all luminous flux emitted from the center of the discharge tube 132 is changed to luminous flux having a uniform light distribution by optical actions of the cylindrical lens surface 134a shown in FIG. 21(a), the peripheral sections 133b and 133b' of the reflector 133 shown in FIG. 21(b) and reflectors 135 and 135' shown in FIG. 22(a) in the direction perpendicular to the longitudinal direction (vertical direction) of the discharge tube 132 and overlapping irradiation angle ranges of these three types and a total of five layers with one another makes it possible to efficiently obtain uniform light distribution characteristic as a whole.

On the other hand, luminous flux emitted from the center of the discharge tube 132 backward is reflected by the semi-cylindrical section 133a of the reflector 133, passed through the center of the discharge tube 132 again and emitted forward in the direction of irradiation optical axis L. The behavior of light beams from then on is the same as that in FIG. 21(a), 21(b) and FIG. 22(a).

Here, an optimal area distribution ratio between the cylindrical lens surface 134a of the optical member 134, the reflector 133 and the reflectors 135 and 135' will be explained using FIG. 22(b).

In this embodiment, it is preferable that the area of the cylindrical lens surface 134a shown in FIG. 21(a) and the reflection area of the reflector 133 shown in FIG. 21(b) form a basic condensing optical system and that the minimum area bridging between these areas be constructed of the reflecting/condensing optical system using a reflection action by the reflectors 135 and 135' whose light path is shown in FIG. 22(a).

For the reflecting/condensing areas of these reflectors 135 and 135', it is preferable that an angle β between a straight line connecting the center of the discharge tube 132 and each end of the reflecting/condensing area of the reflectors 135 and 135' and the irradiation optical axis L be within the following angle range:

$$35° \leq \beta \leq 70° \tag{2}$$

Here, when the angle β is smaller than the lower limit 35° of Formula (2), a distance H between points A and B increases where the point at which the straight line connecting the center of the discharge tube 132 and the end point A of the cylindrical lens surface 134a intersects with the plane of incidence of the peripheral sections 134b and 134b' of the optical member 134 is B, which makes it impossible to sufficiently reduce the thickness of the lighting optical system, which is the object of this embodiment. On the other hand, when the angle β is greater than the upper limit 70°, the condensing area of the reflector 133 decreases, rendering meaningless the fact that the system has been divided into the reflector 133 and reflectors 135 and 135'.

An ideal mode is to reduce the condensing areas of these reflectors 135 and 135' to a necessary minimum and organize those areas into a mode with little light quantity loss. Such a configuration makes it possible to reduce the length in the thickness direction to a minimum, simplify the shape and therefore make the system easy to process.

In view of such a situation, this embodiment sets this reflecting/condensing area within an approximately 18° range from 42° to 60° for optimization. This range is narrower than the total reflection area in the embodiment shown in FIG. 13 to FIG. 17, for the following reason:

That is, before reaching the reflecting surface of the prism section, luminous flux in the above-described embodiment is bent in the direction away from the optical axis through the refracting surface and then reflected by the reflecting surface and subjected to condensing control. This makes it possible to suppress the distance of the part corresponding to the distance between A and B above to a relatively small level. On the contrary, this embodiment has no refracting surface before luminous flux reaches the reflectors 135 and 135', and therefore the distance H between A and B above tends to increase, which narrows the angle range controllable by the reflectors 135 and 135'.

A first effect specific to the lighting apparatus of this embodiment is that the reflecting surfaces are constructed of discrete surfaces of different materials instead of continuous reflecting surfaces placed in the direction of the irradiation optical axis as in the case of conventional arts and that a plurality of reflecting layers is placed so as to overlap with one another in the direction perpendicular to the irradiation optical axis.

Such a configuration makes it possible to significantly reduce the thickness of the lighting optical system in the depth direction, which is the major feature of this embodiment.

Second, it is possible to significantly reduce the thickness of the optical member 134 itself. That is, the configuration essential to the optical member 134 is only the cylindrical lens surface 134a having positive refracting power in the central area and the peripheral sections 134b and 134b' can have a thin-shaped configuration and the peripheral sections 134b and 134b' with a simple flat shape can function sufficiently, which makes it possible to significantly reduce the overall thickness of the optical member 134.

This makes it possible not only to improve moldability of the optical member 134 but also to minimize a reduction of light quantity when luminous flux passes through a resin material. This also contributes to a weight reduction of the image pickup apparatus incorporating this lighting apparatus and other optical equipment. Moreover, since the outermost surface has an extremely simple shape and is constructed of a surface with few optical restrictions, it is easy to support the optical member 134 and even when the lighting apparatus is mounted in various optical apparatuses, no special supporting structure is required, which provides a lighting apparatus easy to handle.

Thirdly, constructing a plurality of reflecting layers with metallic reflecting surfaces can prevent a problem of a conventional light guide type electronic flash, that is, a problem that when an optical member made of a resin optical material is placed close to a light source, the optical member is generally deformed by heat produced by the light source making it impossible to obtain the original optical characteristic depending on the light-emitting condition. That is, by constructing the reflecting surface close to the light source with a metallic reflecting material, it is possible to prevent deformation of the metallic reflecting material caused by heat generated from the light source itself, thereby obtain a stable optical characteristic, and further widen the space around the light-emitting discharge tube and thereby minimize the influence of radiant heat and convection heat produced during continuous light emission on the optical member as the resin material.

Thus, this embodiment makes it possible to construct a small, thin-shaped, extremely efficient lighting optical system with little light quantity loss caused by irradiation to the outside of the required irradiation range.

Then, the condensing action of the lighting apparatus according to this embodiment in the longitudinal direction of the discharge tube (rightward/leftward direction) will be explained briefly using FIG. 23.

As shown in FIG. 23, condensing luminous flux in the longitudinal direction of the discharge tube is conducted by the Fresnel lens sections 134*d* and 134*d*' formed on the exit surface side of the optical member 134. These Fresnel lens sections 134*d* and 134*d*' are only formed in the right and left peripheral sections in the longitudinal direction as shown in the figure and not in the central area. This is because the effective light-emitting section of the discharge tube 132, which is the light source, is long in the rightward/leftward directions and even forming the Fresnel lenses in the central area cannot always condense luminous flux efficiently.

On the other hand, for the peripheral sections in the longitudinal direction where the Fresnel lens sections 134*d* and 134*d*' are formed, it is possible to limit the direction of luminous flux emitted from the discharge tube 132 to a certain degree and forming the Fresnel lenses in these positions makes it possible to condense luminous flux relatively efficiently.

This embodiment has described the case where all the luminous flux controlled in areas of three types and five layers of the cylindrical lens surface 134*a* provided on the entrance surface side of the optical member 134, the peripheral sections 133*b* and 133*b*' of the reflector 133 and reflectors 135 and 135' in the direction (vertical direction) perpendicular to the longitudinal direction of the discharge tube have light distributions overlapping (matching) with one another, but the setting of this embodiment is not the only one, and it is also possible to allow the respective sections to have different light distribution characteristics or have asymmetric light distribution characteristics in the vertical direction or have different degrees of condensing.

Furthermore, this embodiment has described the case where the optical member 134 is provided with the cylindrical lens surface 134*a*, but the shape of the lens is not limited to such a cylindrical lens and it is also possible to use a toric lens having refracting power also in the longitudinal direction of the discharge tube or a Fresnel lens having equivalent refraction effects.

As described above, according to the embodiments shown in FIG. 13 to FIG. 23, of the luminous flux emitted from the light source in various directions, it is possible to control irradiation of the luminous flux, which cannot be controlled within the required irradiation range by the lens surface of the optical member or the reflection member or the first reflection member, within the above-described required irradiation range by the reflecting section of the optical member or the second reflection member, and it is thereby possible to improve the efficiency of the lighting apparatus by increasing the effective energy irradiated within the required irradiation range.

Moreover, since a plurality of reflection layers with the reflection member or the first reflection member and reflecting side of the optical member or the second reflection member is constructed in the direction (vertical direction) perpendicular to the irradiation optical axis, it is possible to reduce the thickness of the lighting apparatus compared to the case where one reflection layer is extended in the direction of the optical axis. Therefore, this lighting apparatus can be mounted on an ultra-thin card type camera or card type electronic flash.

Furthermore, the shape of the optical member can be simplified and slimmed like a simple panel, and therefore even if an optical resin material is used as the material of the optical member, this lighting apparatus is expected to realize sufficient cost reduction such as reducing the molding time or reducing the cost of the die, etc.

Furthermore, it is possible to freely determine the shapes of the positive refraction section of the optical member, reflection member or the first reflection member and the reflecting section of the reflection member or the second reflection member, and this lighting apparatus can thereby control the light distributions of this luminous flux independently of each other and meticulously. Therefore, it is possible to easily obtain a desired light distribution within the required irradiation range and, for example, easily make the light distribution uniform.

Figure 24:
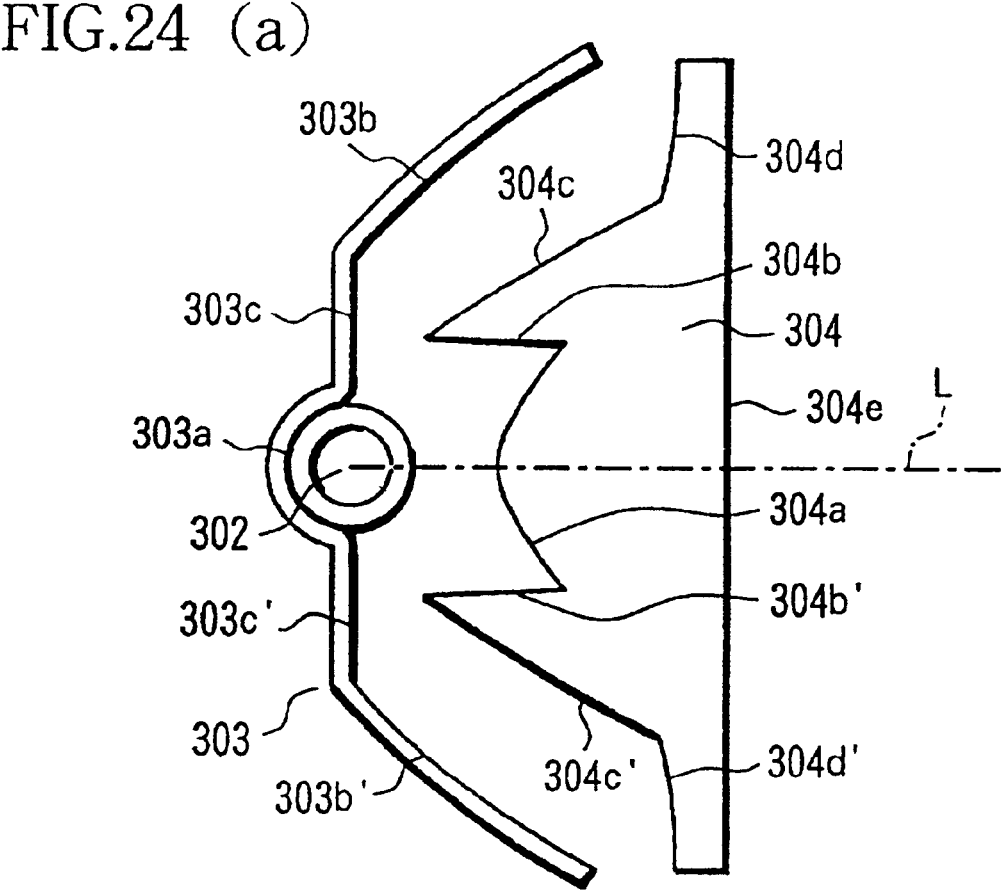
FIG. 24 is a sectional view of a lighting apparatus (in a condensed state), which is another embodiment of the present invention in the radial direction of a discharge tube.
Figure 24:
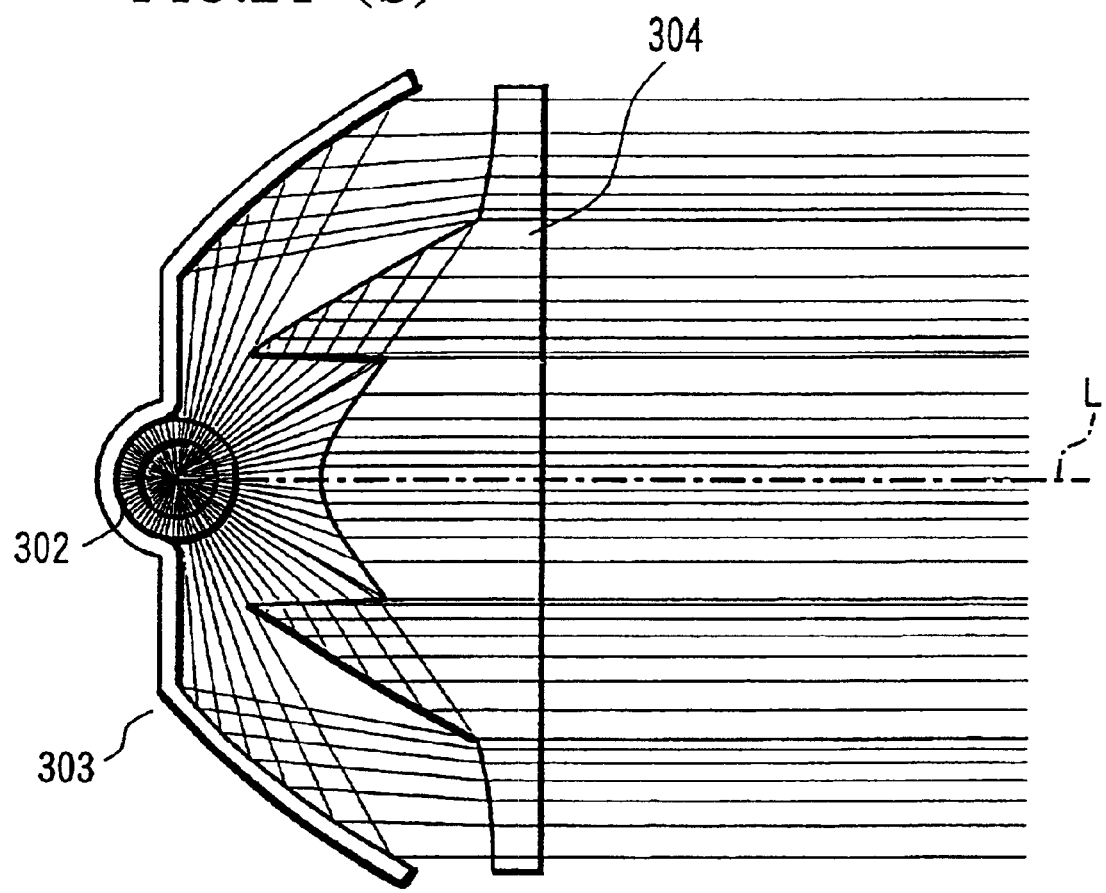
Figure 25:
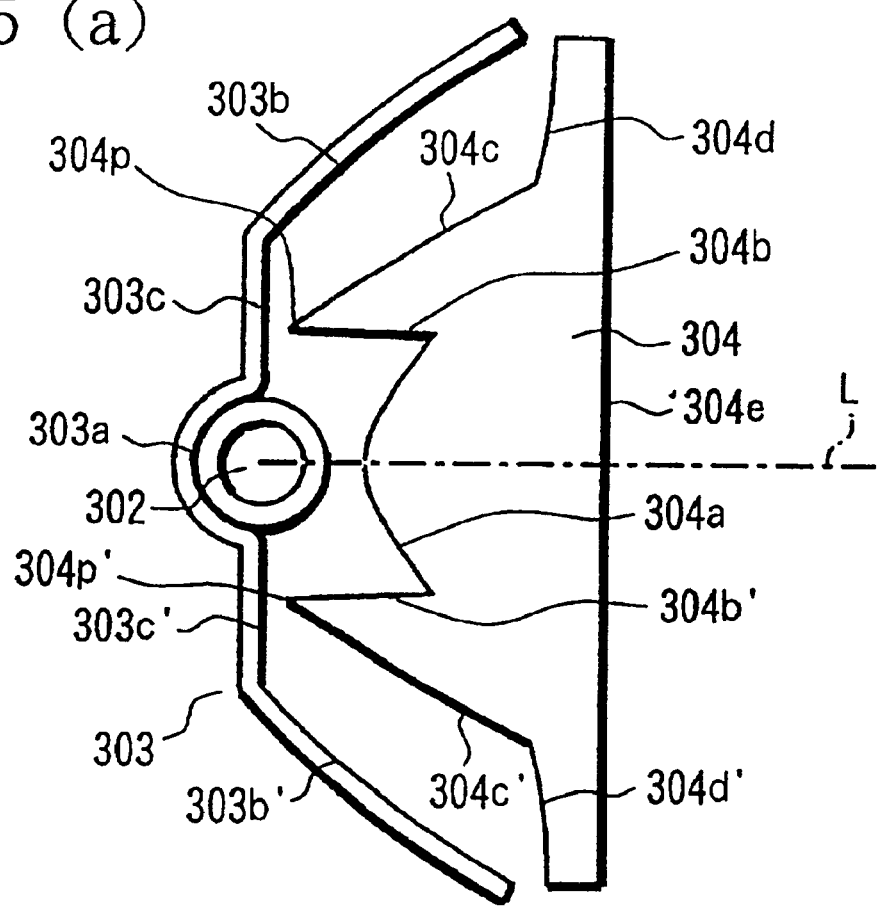
FIG. 25 is a sectional view of the lighting apparatus (in a diffused state) in FIG. 24 in the radial direction of the discharge tube and a traced drawing of representative light beams.
Figure 25:
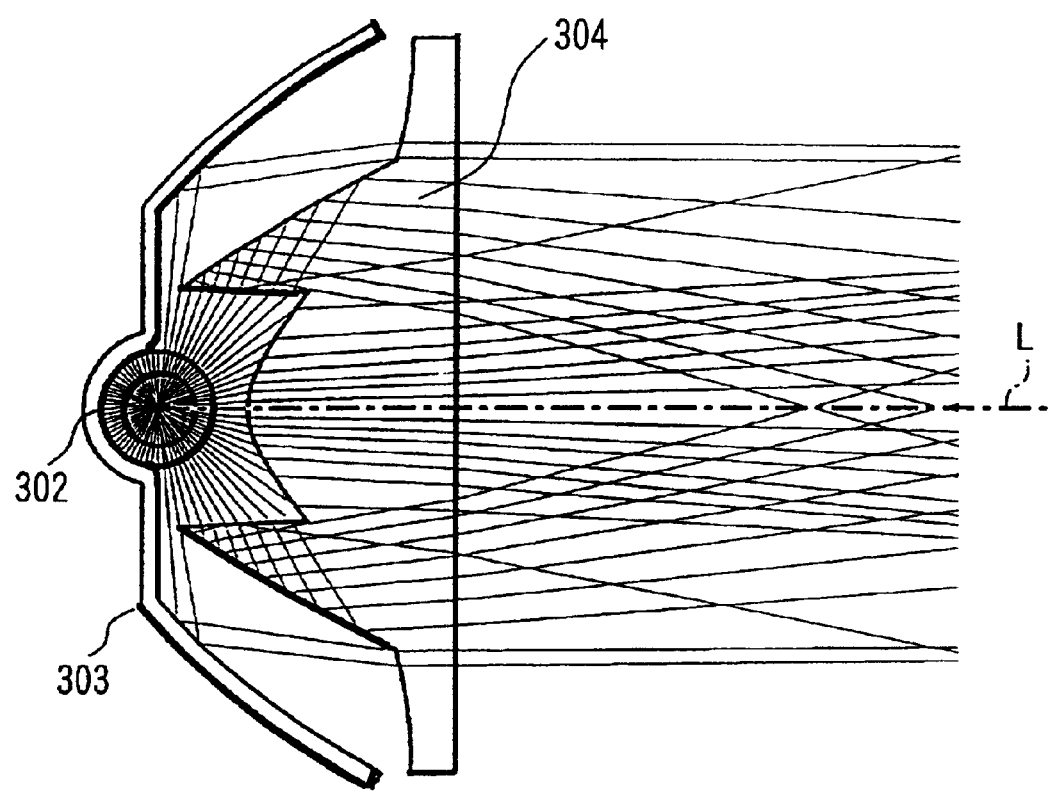

FIG. 24 to FIG. 27 show a configuration of an optical system of a lighting apparatus, which is another embodiment of the present invention. FIG. 24 and FIG. 25 are sectional views of the above-described optical system with the plane including the radial direction of the discharge tube. FIG. 24 shows a case where the irradiation angle range is small and FIG. 25 shows a case where the irradiation angle range is wide.

Figure 26:
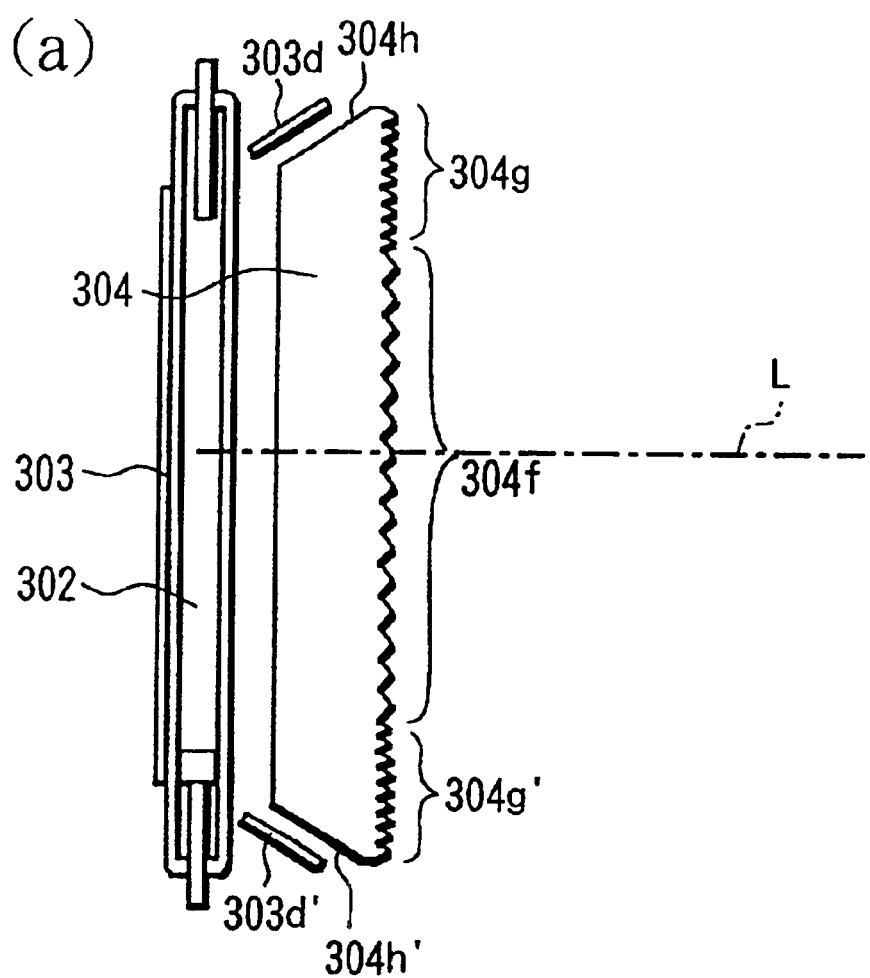
FIG. 26 is a sectional view of the lighting apparatus in FIG. 24 cut with a plane including the center axis of the discharge tube.
Figure 26:
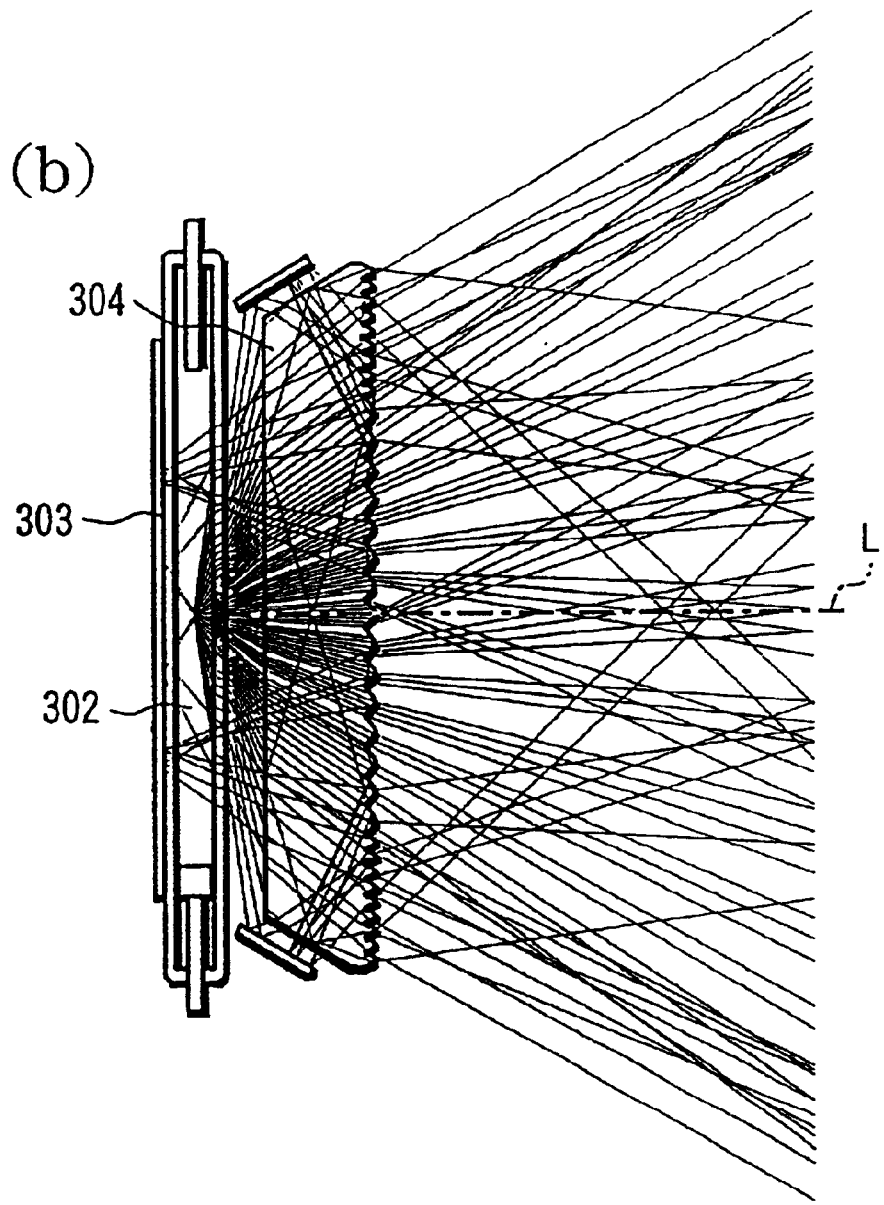
Figure 27:
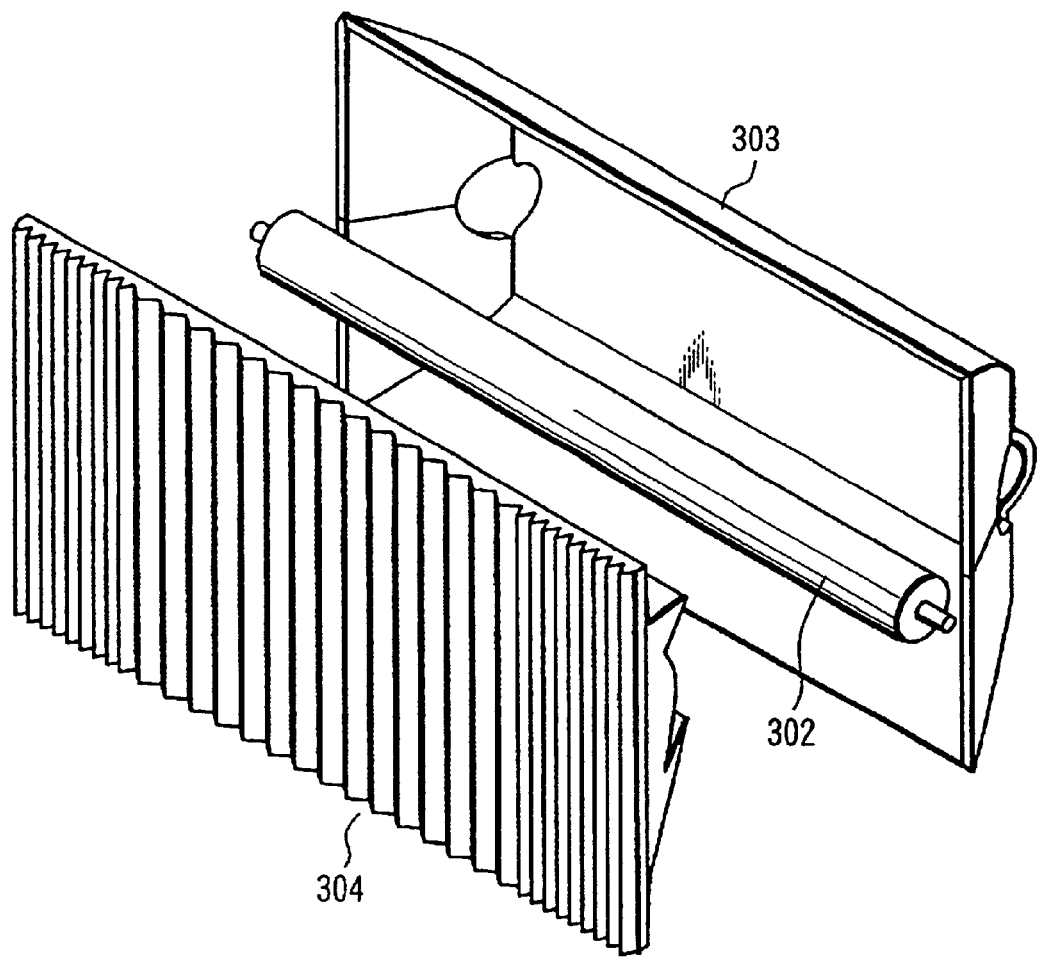
FIG. 27 is an exploded perspective view of the optical system of the lighting apparatus in FIG. 24.

FIG. 26 is a sectional view of the above-described optical system cut with a plane including the center axis of the discharge tube and FIG. 27 is an exploded perspective view of the above-described optical system. FIG. 24(*b*) to FIG. 26(*b*) show traced lines of representative light emitted from the center of the discharge tube, which is the light source, together.

Figure 28:
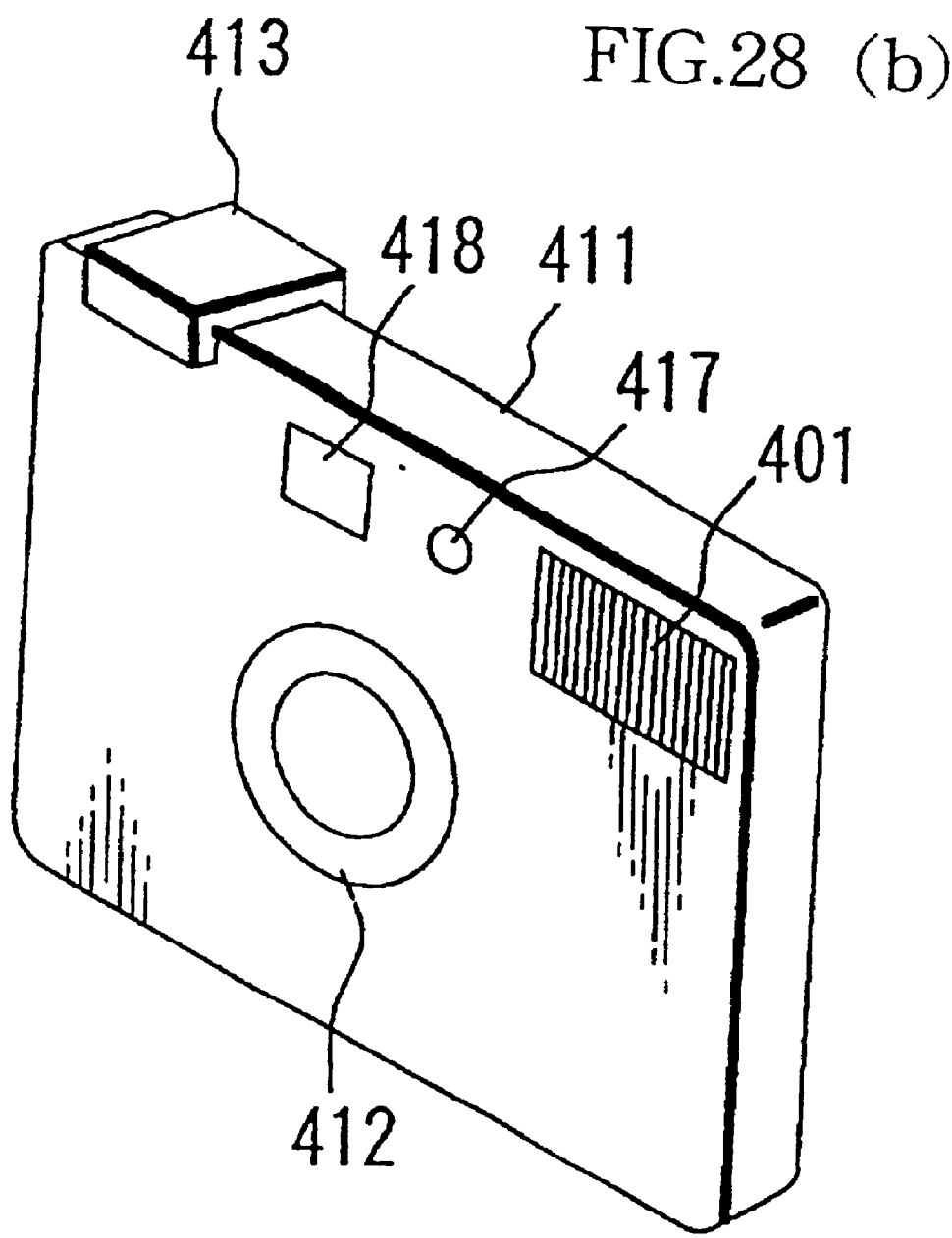
FIG. 28 is a perspective view of (a) compact camera and (b) card size camera equipped with the lighting apparatus in FIG. 24.

Furthermore, FIG. 28 also shows a compact camera (a) and card type camera (b) incorporating the above-described lighting apparatus.

As shown in FIGS. 28(*a*) and 28(*b*), the above-described lighting apparatus is placed at the top of a camera body 411. In these figures, reference numeral 401 denotes a lighting apparatus, 412 denotes a picture-taking lens and 413 denotes a shutter release button.

In FIG. 28(*a*), reference numeral 414 denotes an operation member to zoom the picture-taking lens 412 and depressing this operation member frontward allows an image to zoom in and depressing this operation member backward allows an image to zoom out.

In FIGS. 28(a) and 28(b), reference numeral 415 denotes a mode setting button to switch between various modes of the camera, reference numeral 416 denotes a liquid crystal display window to inform the user of the operation of the camera, and 417 denotes a light receiving window of a photometer to measure the brightness of external light and 418 denotes an inspection window of a finder.

Then, the members that determine an optical characteristic of the lighting apparatus will be explained in detail using FIG. 24 to FIG. 27.

In these figures, reference numeral 302 denotes a discharge tube (xenon tube), which is a cylindrical light source. Reference numeral 303 denotes a reflector that reflects luminous flux emitted from the discharge tube 302 in the irradiation direction (forward) of illuminating light and is made of a metallic material such as radiant aluminum whose inner surface is formed of a high-reflectance surface or a resin material having an inner surface on which a high-reflectance metal-evaporated surface is formed.

Reference numeral 304 denotes a prism-like one-piece optical member. On the entrance surface of this optical member 304, a pair of prism sections are formed. The prism sections made up of refracting surfaces 304b, 304b' having refracting power in the direction perpendicular (vertical direction) to the longitudinal direction of the discharge tube 302 and reflecting surfaces 304c, 304c' that almost satisfy a total reflection condition for the light incident from these refracting surfaces 304b, 304b' in the upper and lower sides centered on the optical axis L. Furthermore, as shown in FIG. 26, on the side of the exit surface of the optical member 304, a prism array 304f having refracting power in the longitudinal direction (horizontal direction) of the discharge tube 302 is formed. As the material of this optical member 304, a high transmittance optical resin material such as acrylic resin or glass material is suitable.

In the above-described configuration, in the case where the camera is set, for example, to "electronic flash auto mode", after the shutter release button 313 is pressed by the user, a control circuit (not shown) decides whether light should be emitted from the lighting apparatus 301 or not based on the brightness of external light measured by a photometer (not shown), sensitivity of the film loaded or the characteristic of an image pickup element such as a CCD or CMOS.

When the control circuit decides that "light should be emitted from the lighting apparatus", the control circuit outputs a light-emitting signal and allows the discharge tube 302 to emit light through a trigger lead wire attached to the reflector 303.

Of the luminous flux emitted from the discharge tube 302, the luminous flux component emitted backward or sideward (see FIG. 26) in the direction of the irradiation optical axis L enters the optical member 304 placed in front of the discharge tube 302 through the reflector 303 and the luminous flux component emitted forward in the direction of the irradiation optical axis directly enters the optical member 304 and then both luminous flux components are changed to luminous flux having a predetermined light distribution characteristic through the optical member 304 and then irradiated onto an object.

Hereafter, a setting of an optimal shape in the above-described lighting apparatus to keep the light distribution characteristic uniform within the required irradiation range while extremely slimming the shape of the lighting optical system in particular will be explained using FIG. 24 to FIG. 26 more specifically.

First, a basic concept of changes of the irradiation angle in the vertical direction, which is the radial direction of the discharge tube (direction perpendicular to the longitudinal direction), will be explained using FIGS. 24 and 25. FIGS. 24(a) and 24(b) show a state corresponding to the narrowest irradiation angle range and FIGS. 25(a) and 25(b) show a state corresponding to the widest irradiation angle range.

(a) and (b) in each figure show the same sectional view and (b) is obtained by adding traced light beams to the sectional view of (a). Reference numerals in the figures correspond to the members in FIG. 26 and FIG. 27.

In these figures, the inner and outer diameters of the glass tube are shown as the discharge tube 302. In an actual light-emitting phenomenon of this type of discharge tube, light is often emitted from the full inner diameter to improve the efficiency and it is reasonable to consider that light is emitted virtually uniformly from light-emitting points across the full inner diameter of the discharge tube. However, for simplicity of explanation, suppose the luminous flux emitted from the center of the light source is representative luminous flux and the figures only show luminous flux emitted from the center of the light source. As an actual light distribution characteristic, the light distribution characteristic as a whole changes in a direction in which luminous flux spreads slightly due to luminous flux emitted from the periphery of the discharge tube in addition to the representative luminous flux as shown in the figures, but this luminous flux has almost an identical tendency of light distribution characteristic, and therefore the following explanations will be based on this representative luminous flux.

First, the characteristic shapes of the optical system of the above-described lighting apparatus will be explained one by one. The shape of the part of the reflector 303 that covers the back of the discharge tube 302 is semi-cylindrical (hereinafter referred to as "semi-cylindrical section 303a") almost concentric with the discharge tube 302. This is a shape, which is effective to return the light reflected by the reflector 303 to the vicinity of the center of the light source again, and has the effect of preventing adverse influence from refractions of the glass part of the discharge tube 302.

Furthermore, such a configuration makes it possible to handle the reflected light from behind the reflector 303 as the outgoing light almost equivalent to the direct light from the light source, and thereby it is easy to understand and at the same time convenient because it is possible to reduce the size of the entire optical system that follows. Furthermore, the reason that the reflector 303 has a semi-cylindrical shape is that if the reflector 303 is smaller than this size, condensing luminous flux directing sideward will require the optical member 304 to extend backward, making it difficult for the prism surface to direct luminous flux forward using total reflection, and on the contrary, if the reflector 303 is larger than this size, the amount of luminous flux trapped inside the reflector 303 will increase and the efficiency will decrease, both of which are undesirable.

On the other hand, the upper and lower peripheral sections 303b and 303b' of the reflector 303 are shaped like curved surfaces so that luminous flux emitted from the center of the light source is reflected by these peripheral sections 303b and 303b' and then led to the peripheral sections 304d and 304d' of the optical member 304. And as will be explained later, luminous flux refracted through the peripheral sections 304d and 304d' of the optical member 304 provide the most condensed light distribution characteristic.

Furthermore, the areas (hereinafter referred to as "flat surface areas") 303c and 303c' between the semi-cylindrical section 303a of the reflector 303 and the peripheral sections 303b and 303b' are constructed of flat surfaces almost perpendicular to the optical axis L.

Then, the detailed shape of the optical member 304 will be explained. As shown in FIG. 24, the most condensed state is obtained when there is a predetermined distance between the discharge tube 302 and the optical member 304.

First, as shown in FIG. 24(a), the central area through which the optical axis L passes of the optical member 304 receives a large part of the direct light member emitted from the center of the light source forming a relatively small angle with the optical axis L and to refract this member, a non-spherical cylindrical lens surface 304a is formed in the center area on the light source side of the optical member 304.

Then, in the peripheral section of this cylindrical lens surface 304a, refracting surfaces 304b and 304b' to which luminous flux components emitted from the center of the light source which are not incident on the cylindrical lens surface 304a and which form a relatively large angle with the optical axis L enter are formed, and in the area peripheral thereto, reflecting surfaces 304c and 304c' to totally reflect the refracted light which has entered into the prism section from these refracting surfaces 304b and 304b' are formed.

In the area peripheral thereto, as described above, refracting surfaces 304d and 304d' made up of curved surfaces are formed on which luminous flux reflected by the reflectors 303b and 303b' enters. These cylindrical lens surface 304a, reflectors 303b, 303b', refracting surfaces 304d, 304d' and reflecting surfaces 304c, 304c' are shaped so that luminous flux emitted from the center of the light source is quasi-parallel to the optical axis L while there is a predetermined distance between the discharge tube 302 and optical member 304.

Then, luminous flux incident on the respective sections of the optical member 304 is refracted or totally reflected to be changed to predetermined angle members and then goes out of the same exit surface 304e.

FIG. 24(b) shows a light traced lines showing the luminous flux emitted from the center of the light source and incident on the respective surfaces of the optical member 304 and the light path through which this luminous flux passes. As shown in the figure, almost all the luminous flux emitted from the center of the light source is changed in such a way as to be parallel to the optical axis. That is, this optical configuration provides the most condensed state.

On the other hand, it is observed in the optical configuration shown in FIG. 24 that the luminous flux emitted from the center of the light source goes out of almost the entire exit surface 304e of the optical member 304 in the direction quasi-parallel to the optical axis L. In other words, this means that the direction of outgoing light from the center of the light source has a one-to-one correspondence with the position on the exit surface 304e of the optical member 304 and the outgoing light is changed without any gap with the given exit surface 304e and parallel to the optical axis, that is, the most efficient condensing action is performed for the area of aperture of the exit surface.

By the way, this figure is obtained by adding only light beams to the sectional view shown in FIG. 24(a) above and all other shapes are the same.

On the other hand, the state shown in FIG. 25 is a state in which the discharge tube 302 is placed closer to the optical member 304 than the above-described predetermined distance and the optical configuration is set so that the irradiation angle range is widened to a certain degree. FIG. 25(b) is obtained by adding traced lines of light beams emitted from the center of the light source to the sectional view in FIG. 25(a) and all the shapes of the different sections of the optical system remain unchanged.

In such an optical configuration, the edges 304f and 304f' formed by an intersection between the refracting surfaces 304b and 304b' that determine the light path of the luminous flux totally reflected by the reflecting surfaces 304c and 304c' and these reflecting surfaces 304c and 304c' come closer to the flat surface sections 303c and 303c' of the reflector 303. Of the light beams emitted from the center of the light source, luminous flux directed from the gap between the reflectors 303c and 303c' and the edges 304f and 304f' of the optical member 304 toward the peripheral sections 303b and 303b' of the reflector 303 is considerably reduced in this way as shown in FIG. 25(b).

The luminous flux component which is originally directed to the peripheral sections 304d and 304d' of the optical member 304 through the peripheral sections 303b and 303b' is always the condensed member to be changed to a member forming a small angle with the direction of the optical axis because the light source 302 and reflector 303 are maintained as one body. However, as described above, since the edges 304f and 304f' of the optical member 304 come closer to the flat surface sections 303c and 303c' of the reflector 303, this member is reduced extremely and directed to the prism section made up of the refracting surfaces 304b, 304b' and reflecting surfaces 304c, 304c', which is another light path adjacent thereto. Furthermore, simultaneously with this, part of the luminous flux controlled by the reflecting surfaces 304c and 304c' directly enters into the cylindrical lens surface 304a while the discharge tube 302 is separated from the optical member 304 and the amount of the luminous flux component incident on this cylindrical lens surface 304a also increases.

Thus, in contrast to the most condensed state shown in FIG. 24 in which the system is originally constructed so that flux members of all the three areas of the refraction area near the optical axis L, the reflection area of the optical member 304 (prism section) peripheral thereto and the reflection area of the reflector 303 further peripheral thereto are condensed, it is possible to gradually change (that is, change the irradiation angle range) the condensed state of each area by changing the relation of positions between the discharge tube 302 (and reflector 303) and optical member 304 in the direction of the optical axis.

This change in the condensed state will be explained according to the above-described three areas one by one. First, the refraction area in the optical axis L is constructed of a non-spherical cylindrical lens surface 304a with the center of the light source as the focal point to refract luminous flux emitted from the center of the light source in the optical configuration shown in FIG. 24 so that this luminous flux becomes quasi-parallel to the optical axis. In this case, as shown in FIG. 25, when the light source comes close to the cylindrical lens surface 304a, a defocused state is generated having the effect of widening the irradiation range in all directions. Furthermore, in the state shown in FIG. 24, part of luminous flux led toward the reflecting surfaces 304c and 304c' newly enter this area in the state shown in FIG. 25, but this member is also an extension of the luminous flux controlled by the area of this refracted light and is changed to a member with the widest irradiation angle in this refraction area.

However, since the angle range in this area is an action caused by refraction and therefore no drastic change in the irradiation angle range is produced for a relatively small amount of movement expected this time and as a result, only the light distribution limited to the periphery of the central area on the irradiation plane is spread uniformly.

Then, the reflection area of the optical member 304 (prism section) will be explained. This area is an area whose irradiation angle range can be changed drastically by changing the relation of positions between the light source and optical member 304. This is because the change of the light beam direction by reflection can change the irradiation direction drastically and a reflection phenomenon is used in the optical member 304 with a high refractive index and therefore a greater angle change can be expected.

As also shown in FIG. 25(*b*), the luminous flux component emitted from the center of the light source and reflected in this reflection area is changed to a member with a certain narrow angle area in the periphery on the irradiation plane.

The luminous flux component reflected in this reflection area seems to be changed only to a member forming a predetermined angle with the optical axis L in the traced lines of FIG. 25(*b*), but the light source has actually certain dimensions and therefore the reflection angle range also expands to a certain degree and overlaps with the luminous flux component of the above-described refraction area when viewed as a whole, and therefore it is possible to obtain a light distribution characteristic having an almost uniform angle distribution in a wide angle range.

Finally, the luminous flux component reflected in the reflection area by the outermost reflector 303 gradually decreases as the light source comes closer to the optical member 304 from the state in FIG. 24 to the state in FIG. 25 as described above.

However, leaving the reflection member in this reflection area to a certain degree makes it possible to suppress a reduction of the luminous flux component near the optical axis L caused by an increase of the luminous flux component through the above-described two reflection areas and prevent the light quantity near the optical axis L from reducing.

Thus, the configuration according to this embodiment can achieve a drastic change of the irradiation angle range by a small change in the relation of positions between the light source (discharge tube 302) and optical member 304 in the direction of the optical axis and at the same time the members of the three divided areas can compensate for a change in the light distribution characteristic of the respective sections, realizing an optical system which is uniform as a whole and with small light quantity loss with respect to the required irradiation range.

On the other hand, as described above, luminous flux emitted from the center of the discharge tube 302 backward is reflected by the semi-cylindrical section 303*a* of the reflector 303, passes through the center of the discharge tube 302 again and goes out forward. The behavior of the luminous flux thereafter is the same as that shown in FIG. 24(*b*) and FIG. 25(*b*).

Here, an optimal distribution ratio among the three areas of the above-described refraction area, reflection area of the prism section of the optical member 304 and the reflection area of the reflector 303 will be explained.

It is basically preferable to construct the basic condensing optical system with the area of the cylindrical lens surface 304*a* and the reflection area by the peripheral sections 303*b* and 303*b*' of the reflector 303 and construct the minimum part bridging between these areas with the reflection area of the prism section.

Then, in the most condensed state shown in FIG. 24, it is preferable that the angle α formed by the luminous flux from the center of the light source incident on the refracting surfaces 304*b* and 304*b*' of the prism section with the optical axis L be set to:

$$20° \leq \alpha \leq 70° \tag{3}$$

Here, if the angle α is smaller than 20°, which is the lower limit in Formula (3), forming the reflection area of the prism section itself becomes difficult. That is, if the angle α is smaller than 20°, the angles of the prism section edges 304*p* and 304*p*' become extremely acute and at the same time it is necessary to shape the prism section deep in the thickness direction. Thus, it is difficult not only to construct but also to manufacture a low-profile optical system.

On the other hand, when the angle α is greater than 70°, which is the upper limit of above-described Formula (3), the condensing area by the reflector 3 decreases and the fact that the reflection area has been divided into the reflection area of the reflector 303 and the reflection area of the prism section itself becomes meaningless, causing various problems.

That is, the distance between the light source and optical member 304 necessary to change the illuminating angle decreases, which causes a functional problem that it is difficult to make a drastic change of the irradiation angle and another problem that manufacturing is difficult because the prism section itself of the optical member 304 becomes partially thick and long and the molding time is extended. As an ideal mode, it is preferable to narrow this reflection area of the prism section to a necessary minimum and organize the system in a mode with little light quantity loss. Such a configuration makes it possible to minimize the thickness direction, make the configuration of a simple shape and easy to process.

For the above-described reasons, this embodiment forms the prism section according to luminous flux forming an angle with the optical axis L within a 30° range from 30° to 60° for optimization.

Then, optimal shapes of the refracting surfaces 304*b* and 304*b*' which lead luminous flux to the reflecting surfaces 304*c* and 304*c*' of the prism sections will be explained. As shown in FIG. 24(*a*) and 25(*b*), luminous flux emitted from the center of the light source is largely refracted through refracting surfaces 304*b* and 304*b*', led in the direction away from the optical axis L and reach the reflecting surfaces 304*c* and 304*c*'. The ideal shapes of these refracting surfaces 304*b* and 304*b*' are formed so that the largest possible amount of luminous flux emitted from the light source is led to the reflecting surfaces 304*c* and 304*c*' and for this purpose, it is necessary to make luminous flux refracted abruptly through these refracting surfaces 304*b* and 304*b*'.

This also leads to shortening of the length in the direction of the optical axis of the reflecting surfaces 304*c* and 304*c*', that is, reduction of the size in the thickness direction of the optical system, which also agrees with the object of the present invention. As a specific shape, it is preferable to construct the refracting surfaces 304*b* and 304*b*' with flat surfaces whose gradient with respect to the optical axis L is 0°. However, it is difficult to realize such a flat surface with a gradient of 0° for reasons related to the processing accuracy due to the problem of moldability of the optical member. This embodiment constructs these refracting surfaces 304*b* and 304*b*' with flat surfaces whose gradient with respect to the optical axis L is 10° or less or curved surfaces easy to process.

On the other hand, constructing a light control area with a plurality of members and arranging them in such a way as to overlap with one another in the direction of the optical axis can obtain unprecedented effects specific to the present invention.

First, reflecting surfaces (reflecting surfaces 304*c* and 304*c*' of the prism sections and peripheral sections 303*b* and 303*b*' of the reflector 303) are constructed of discrete surfaces made of materials of different types instead of on continuous surface in the direction of the optical axis L as in the case of conventional arts and one reflection member (reflector 303) is made integrally with the light source and the other reflection member (optical member 304) is made movable with respect to the light source and these members are placed in such a way as to overlap with one another in the direction (vertical direction) perpendicular to the optical axis L.

Such a configuration makes it possible to significantly reduce the thickness of the lighting optical system in the depth direction (direction of the optical axis L), which is the major feature of the present invention. That is, as will be explained using the drawings of this embodiment, the reflecting surfaces 304c and 304c' of the optical member 304 to perform the first reflection are placed first and the peripheral sections 303b and 303b' of the reflector 303 to perform the second reflection are placed outside the reflecting surfaces 304c and 304c' and in positions overlapping with them in the direction of the optical axis L, thus making it possible to reduce the thickness of the reflection area in the direction of the optical axis L as a whole.

Second, it is possible to significantly reduce the thickness of the optical member 304 itself. That is, the optical action section required for the optical member 304 only includes the cylindrical lens surface 304a having positive refracting power in the central area, the acute prism sections made up of the refraction surfaces 304b and 304b' to separate the direct light from the light source and the light reflected by the reflector 303 and reflecting surfaces 304c and 304c'. Therefore, it is possible to allow the optical member 304 to accomplish a sufficient optical function although it has a simple shape and significantly reduce the overall thickness of the optical member 304.

This makes it possible not only to improve moldability of the optical member 304 but also to minimize a reduction of light quantity due to transmittance of the resin material, contributing to a weight reduction of the lighting apparatus and therefore a weight reduction of the image pickup apparatus.

Moreover, the shape of the outermost surface of the optical member 304 is extremely simple and is constructed of surfaces with fewer optical restrictions, and therefore it is easy to maintain the optical member 304, and even when mounted on an image pickup apparatus, there is no need to adopt any special support structure, providing a mode quite easy to handle.

Third, constructing the reflection area with a plurality of reflection members can prevent problem with a conventional light guide type electronic flash, that is, the problem that when an optical member made of a resin optical material is placed near the light source, heat produced from the light source melts the optical member, making it impossible to obtain the original optical characteristic depending on the light-emitting condition.

That is, constructing the reflection area with a plurality of reflecting surfaces makes it possible to place the edges 304f and 304f', which is a boundary between the refracting surface and reflecting surface of the optical member 304 which is most vulnerable to heat, away from the light source and also expand the space around the discharge tube 302, and therefore it is possible to minimize influences on resin materials of radiant heat and convection heat produced during continuous light emissions and prevent deterioration of the optical characteristic.

Thus, this embodiment can construct a small and extremely efficient lighting optical system of a variable irradiation angle type with little light quantity loss due to irradiation to the outside of the required irradiation range, even using a fewer members such as the reflector 303 and optical member 304.

Next, a condensing action of this embodiment in the longitudinal direction of the discharge tube 302 will be explained using FIG. 26.

FIG. 26 shows a sectional view of the optical system cut with a plane including the center axis of the discharge tube 302. FIG. 26(a) and FIG. 26(b) show the same sectional view and FIG. 26(b) shows a traced lines of light from the center of the light source together.

As shown in the figure, the side of the optical member 304 from which luminous flux goes out is constructed of a prism array 304f formed in the central area which through the optical axis L passes with both slopes having almost the same angle and acute Fresnel lens sections 304g and 304g' formed in the area peripheral to the prism array 304f.

Furthermore, side reflectors 303d and 303d' molded as one body with the reflector 303 are provided on both sides of the optical member 304. These side reflectors 303d and 303d' are intended to reflect part of luminous flux emitted from the discharge tube 302, which escapes sideward instead of entering the optical member 304, or unnecessary members of reflected light generated at the prism array 304f and Fresnel lens sections 304g and 304g' formed on the side of the exit surface of the optical member 304 and allow these light members to reenter from the sides 304h and 304h' of the optical member 304 to use these light members effectively.

This embodiment sets the apex angle of the prism array 304f in the central area to a constant angle of 105°. The prism array 304f with such an angle setting has the effect of allowing a luminous flux component with a relatively large angle of incidence (luminous flux component with the angle of incidence on the optical member 304 ranging 30° to 40°) to go out of the exit surface with the same angle at which light is refracted through the entrance surface, that is, the effect of allowing a luminous flux component to go out of the exit surface under little influence of refraction on the exit surface, and the effect of condensing incident luminous flux to luminous flux within a certain range of irradiation angle.

The apex angle of this prism array 304f is not limited to 105° and if it is set to a smaller angle, for example, 90°, it is possible to narrow the angle range of luminous flux going out of the optical member 304. On the contrary, if the apex angle is set to a greater angle, for example, 120°, it is also possible to widen the angle distribution of luminous flux going out of the optical member 304.

On the other hand, as shown in FIG. 26(b), there are also some outgoing luminous flux components reaching the prism array 304f, which are reflected by this prism array 304f and returned to the light source again. These luminous flux components are reflected by the reflector 303 and enter the optical member 304 again, are changed to predetermined angle members by the prism array 304f or Fresnel lenses 304g and 304g' and then irradiated onto an object.

Thus, most of luminous flux emitted from the center of the light source is changed to luminous flux with a certain angle distribution and goes out of the optical member 304. The light distribution in this case is solely dependent on the angle setting of the prism array 304f and is not affected by the pitch, etc. of the prism array. This allows the optical member 304 to perform condensing control in an extremely shallow area without requiring the depth in the direction of the optical axis making it possible to drastically reduce the overall size (thickness) of the optical system with respect to the direction of the optical axis.

Furthermore, as shown in the figure, Fresnel lens sections 304g and 304g' with acute angles are formed on the periphery of the optical member 304. Though the optical member 304 is considerably thin, this peripheral area is an area where luminous flux with certain directivity is obtained and forming the Fresnel lens in this area allows efficient condensing action.

From the figure, no conspicuous condensing operation is observable. This is because only luminous flux emitted from the center of the light source is shown and a considerable amount of luminous flux emitted from around the terminals on both sides of the discharge tube 302 is changed to luminous flux components that concentrate on the irradiation optical axis.

Thus, determining the shape of the plane of outgoing light of the optical member 304 allows even an extremely thin optical system placed near the light source to condense luminous flux to a certain angle range efficiently.

Furthermore, the light distribution with respect to the longitudinal direction (horizontal direction) of the discharge tube 302 is determined by a condensing action by the prism array 304f on the side of the exit surface of the optical member 304 or Fresnel lens surfaces 304g and 304g' and the light distribution in the direction perpendicular to the longitudinal direction (vertical direction) of the discharge tube 302 is determined by a highly efficient condensing action by the refraction area of the cylindrical lens surface 304a provided on the light source side (side of the entrance surface) of the optical member 304, the reflection area of the reflector 303 and the reflection area of the prism section of the optical member 304 provided at some midpoint between these two areas. Therefore, this embodiment can provide an unprecedentedly thin lighting optical system with an excellent optical characteristic.

Figure 29:
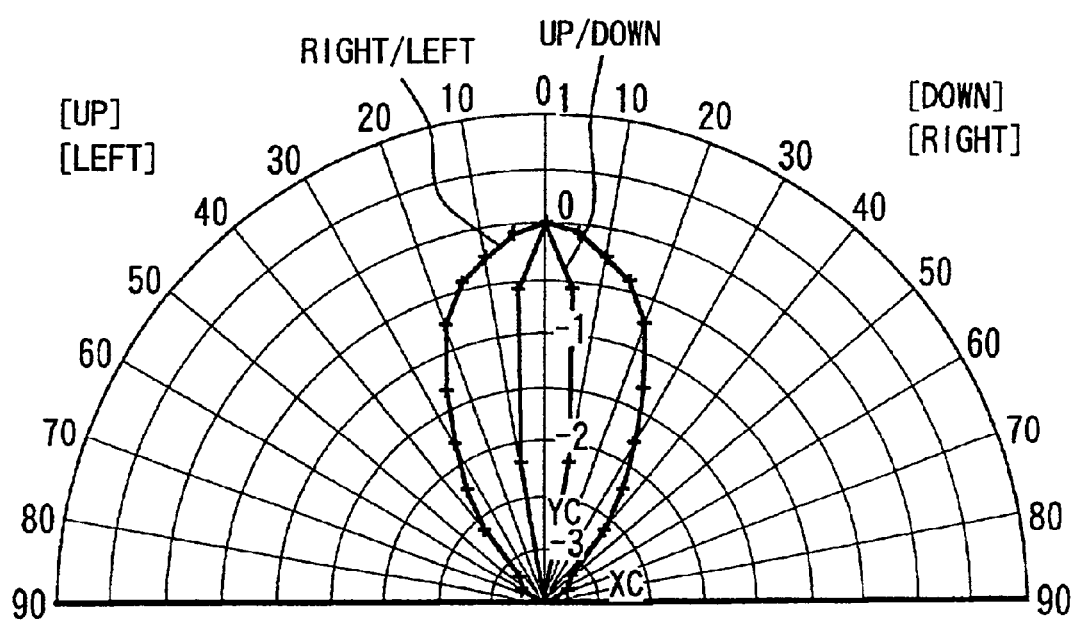
FIG. 29 is a light distribution characteristic diagram of the lighting apparatus (in a condensed state) in FIG. 24.
Figure 30:
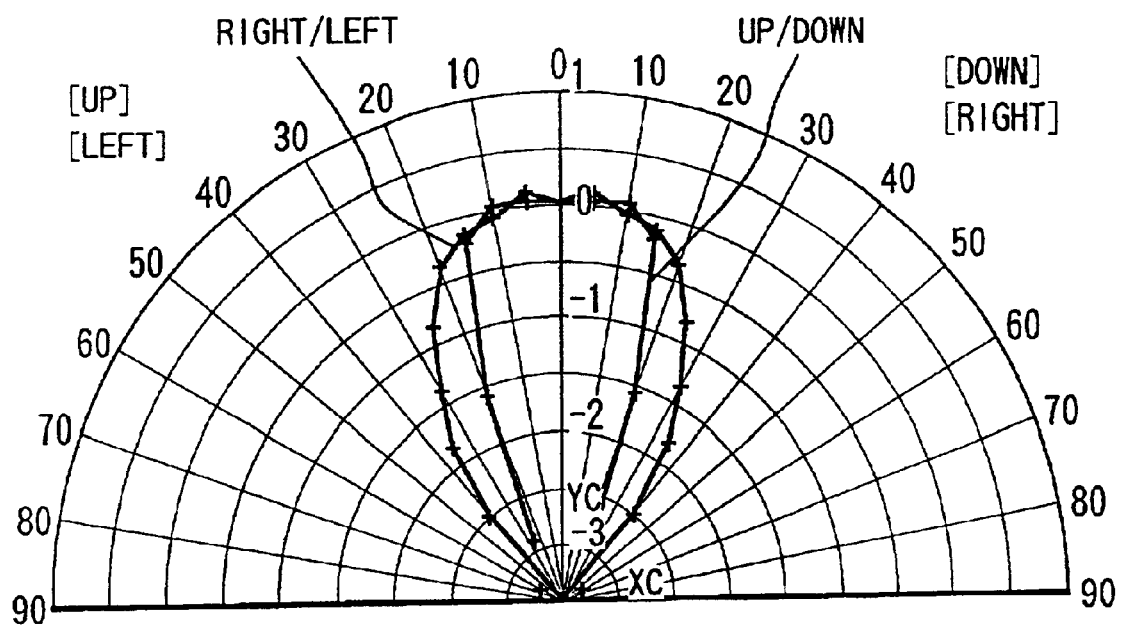
FIG. 30 is a light distribution characteristic diagram of the lighting apparatus (in a diffused state) in FIG. 24.

FIG. 29 and FIG. 30 show examples of the light distribution characteristic obtained by the lighting optical system configured as shown above.

The light distribution characteristic shown in FIG. 29 is a light distribution characteristic corresponding to the optical configuration shown in FIG. 24 in the most condensed state. The light distribution characteristic shown in FIG. 30 is the light distribution characteristic corresponding to the optical configuration shown in FIG. 25 in the most diffused state.

The configuration shown in the figure can make a drastic change in the irradiation angle with respect to the vertical direction. Furthermore, it is also possible to obtain an almost uniform light distribution characteristic with respect to the required irradiation angle range.

In the state shown in FIG. 24, it might also be possible to shape each surface so that all luminous flux emitted from the center of the light source is quasi-parallel to the optical axis of outgoing light so that luminous flux can be condensed within the narrower angle range than the light distribution characteristic shown in FIG. 29. However, the light distribution characteristic actually has a certain degree of extension due to the size of the light source itself. As shown in FIG. 29, the irradiation angle determined by a half value of the illuminance of the central area extends up to 12°.

Furthermore, in the diffused state shown in FIG. 30, the half value irradiation angle extends up to 34°, almost three times the above-described angle.

On the other hand, with respect to the horizontal direction, no drastic angle change is observed for reasons related to the configuration of the optical system. However, the angle range in the diffused state corresponding to FIG. 25 is slightly wider than the angle range in the condensed state corresponding to FIG. 24. This may be attributable to the fact that while the condensed or diffused state near the central area drastically changes according to a change in light distribution in the vertical direction, the distribution in the peripheral sections does not change drastically, and as a result, it is understood that a relative change takes place in this irradiation angle range.

This embodiment has described a lighting apparatus that performs light distribution control in the direction perpendicular to the longitudinal direction of the discharge tube 302 by changing the relative distance between the light source and the optical member 304 and changing the irradiation angle range using three types and five layers of the cylindrical lens surface 304a provided on the light source side, the peripheral sections 303b and 303b' of the reflector 303, and reflecting surfaces 304c and 304c' using the most condensed state shown in FIG. 24 as the standard. However, the present invention is not limited to this embodiment and the reference state need not be set to a state in which luminous flux of all areas is condensed most.

This is because the light source has dimensions of a certain value or greater and the distance between each condensing control plane and the light source varies and it may be convenient not to set the light distribution in a reference state to the one in the most condensed state but to differentiate the reference state from the most condensed state.

As an example of this, when the light source is large, the irradiation angle from the cylindrical lens surface near the light source tends to extend considerably. Especially, luminous flux emitted from ahead of the center of the light source has this strong tendency of spreading and even the most condensing optical configuration cannot be said to include no luminous flux toward the outside of the required irradiation range.

On the other hand, suppose the degree of condensing of the luminous flux member controlled by the reflector at the position farthest from the light source does not decrease even if the size of the light source increases to a certain degree and its distribution does not deviate from the initially set irradiation angle distribution considerably.

From this, by shaping the cylindrical lens surface whose control surface exists near the light source so that the focal point is formed at a position closer to the object than the center of the light source, it is possible to prevent the distribution of luminous flux going out through this cylindrical lens surface from spreading more than necessary.

Furthermore, also in the case where the irradiation angle range is changed with prime importance attached to the wide angle side where the most condensed state is not always necessary, it may be more convenient to determine the shape of each surface so that a relatively wider light distribution characteristic is obtained instead of setting the light distribution to the most condensed state uniformly with respect to luminous flux controlled by the reflectors other than the cylindrical lens surface in the center and the reflecting surfaces of the prism section.

Furthermore, this embodiment has described the case where the configuration of each surface on the light source (entrance surface) side and the configuration of each surface on the side of the exit surface are symmetric with respect to the optical axis, but this embodiment is not limited to such a symmetric shape. For example, the reflecting surfaces 304c and 304c' of the optical member 304 are constructed symmetrical on both sides of the optical axis, but the reflecting surfaces 304c and 304c' need not always be formed in such symmetric positions, but can also be placed asymmetrically. This is not only true for the reflecting surfaces but also for the shape of the reflector and shape of the cylindrical lens surface in the central area.

Furthermore, also with respect to the prism array in the central area formed on the side of the exit surface light, it is also possible to provide a variation in the light distribution characteristic in the horizontal direction using a prism array having different angle settings for right and left. Furthermore, with respect to the Fresnel lens section in the periphery, it is also possible to provide a variation for the degree of condensing and provide a variation for the overall light distribution characteristic.

Furthermore, this embodiment has described the case where the cylindrical lens surface 304a formed in the central area of the optical member 304 is non-spherical, but this cylindrical lens surface is not limited to a non-spherical shape but can be a cylindrical shape. Also, this cylindrical lens can have a toric lens surface considering the condensing performance in the longitudinal direction of the discharge tube 302.

Figure 31:
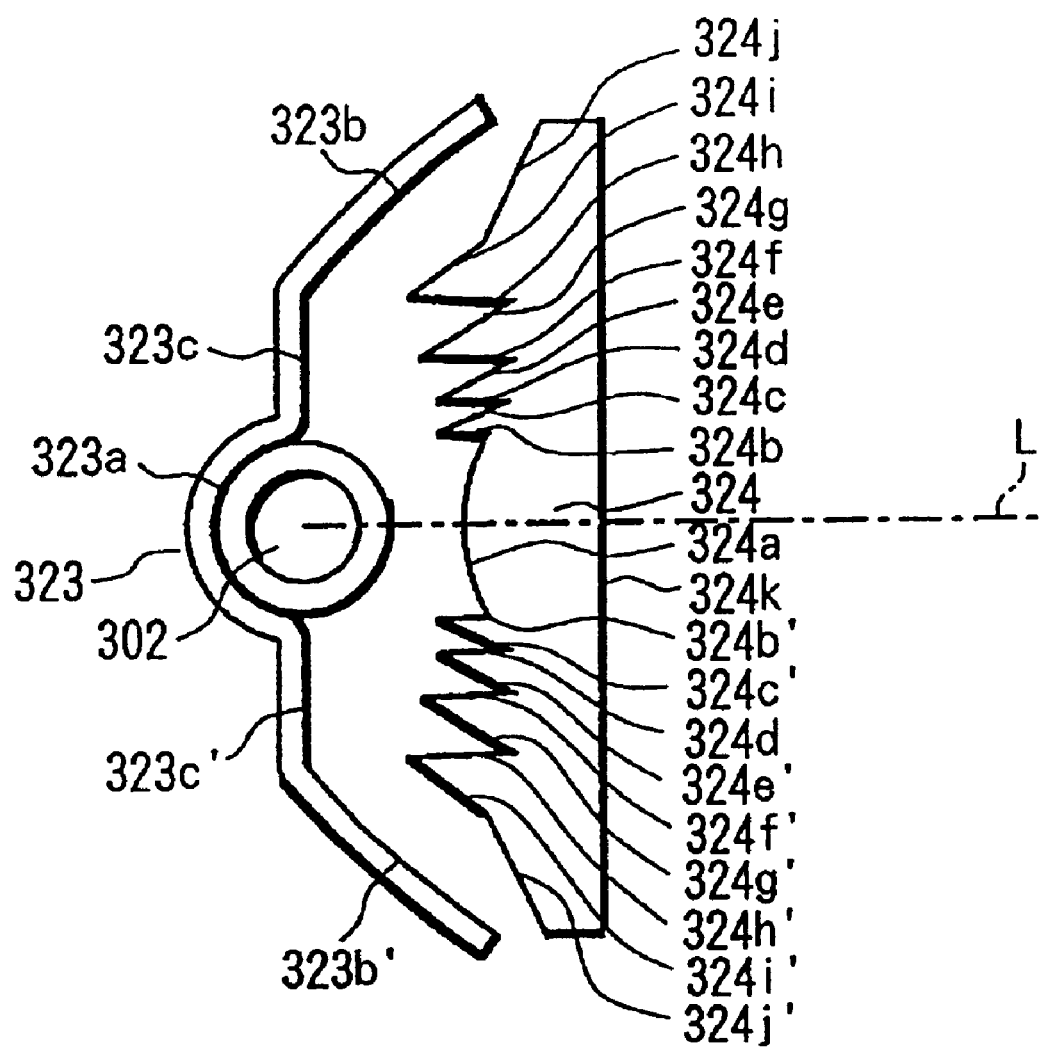
FIG. 31 is a sectional view of a lighting apparatus (in a condensed state), which is another embodiment of the present invention in the radial direction of a discharge tube.
Figure 31:
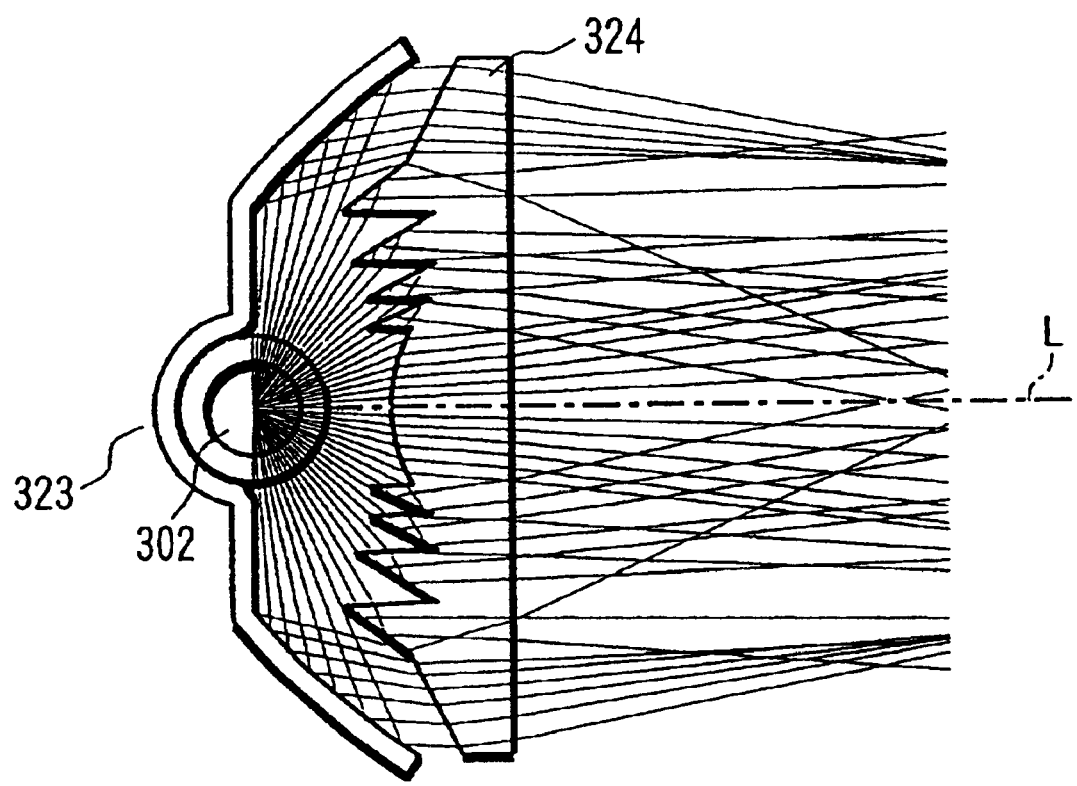
Figure 32:
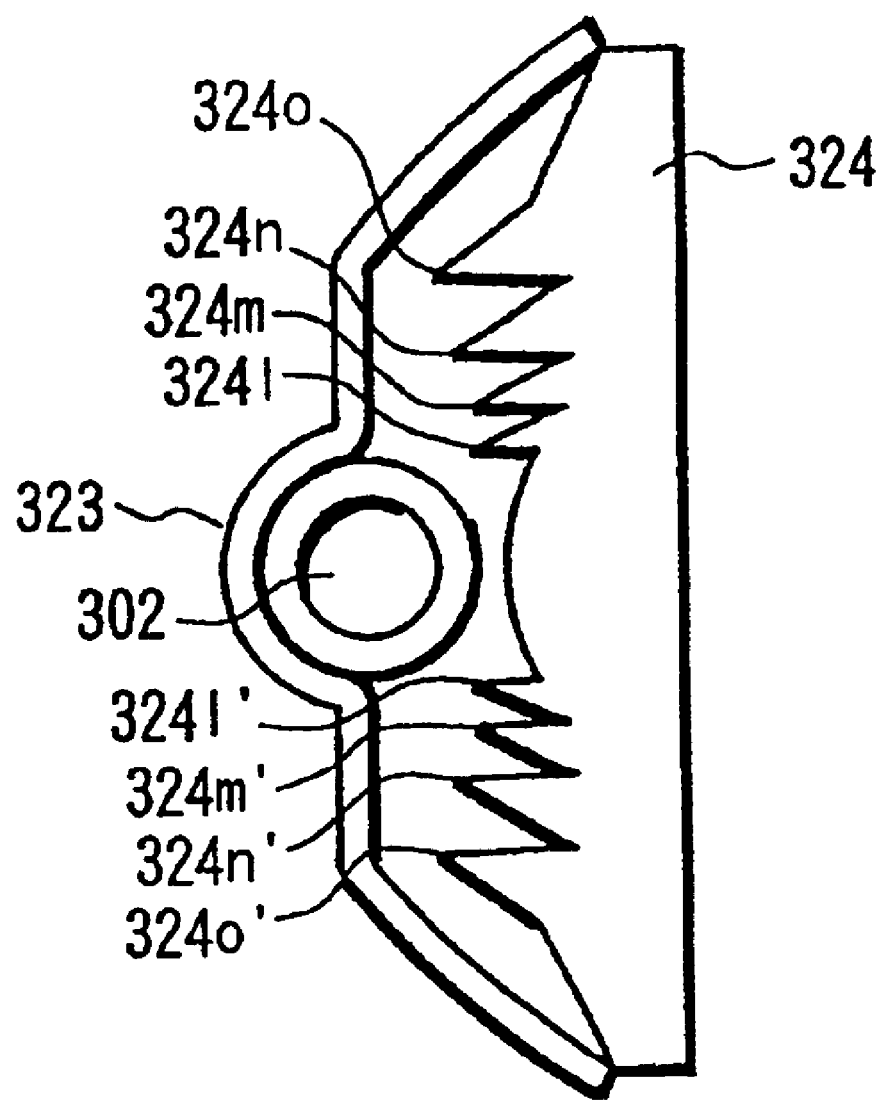
FIG. 32 is a sectional view of the lighting apparatus (in a diffused state) in FIG. 31 in the radial direction of the discharge tube and a traced drawing of representative light beams.
Figure 32:
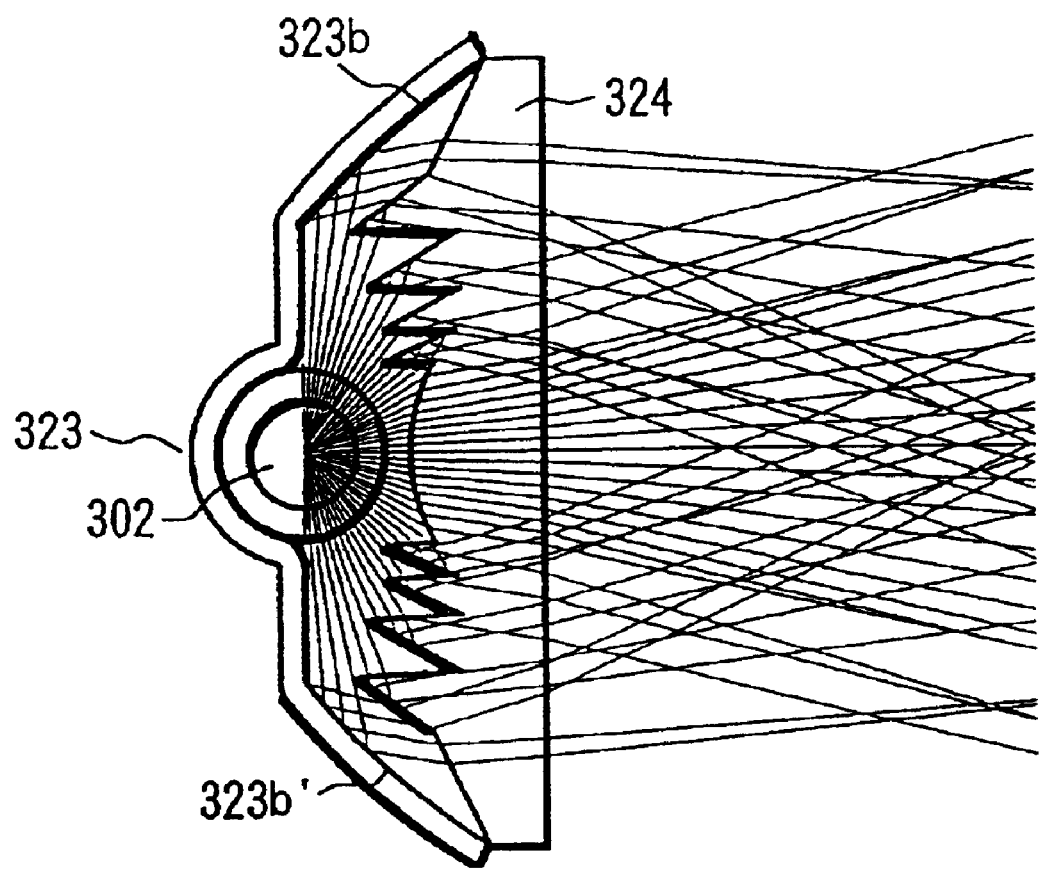

FIG. 31 to FIG. 34 show a configuration of an optical system of a lighting apparatus, which is another embodiment of the present invention. FIG. 31 and FIG. 32 are sectional views of the above-described optical system with the plane including the radial direction of the discharge tube and FIG. 31 shows the case with a narrow irradiation angle range and FIG. 32 shows the case with a wide irradiation angle range.

Figure 33:
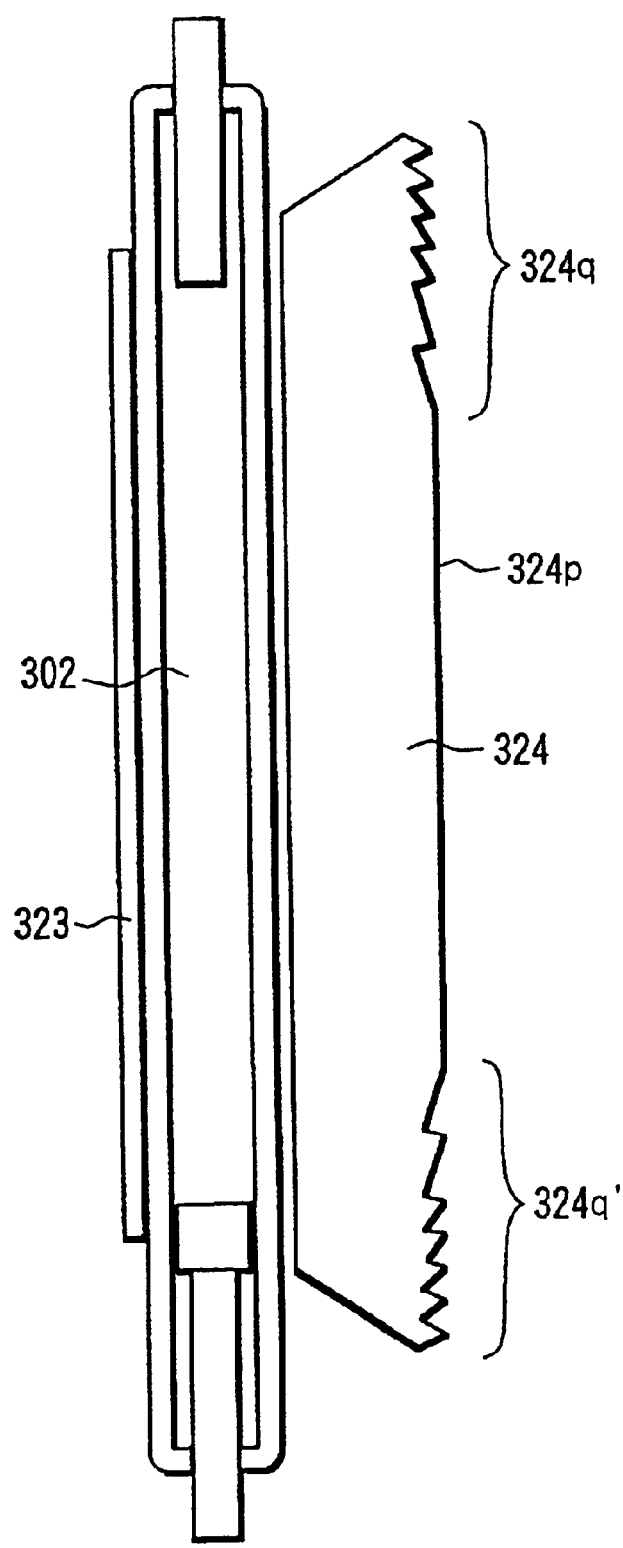
FIG. 33 is a sectional view of the lighting apparatus in FIG. 31 cut with a plane including the center axis of the discharge tube.
Figure 34:
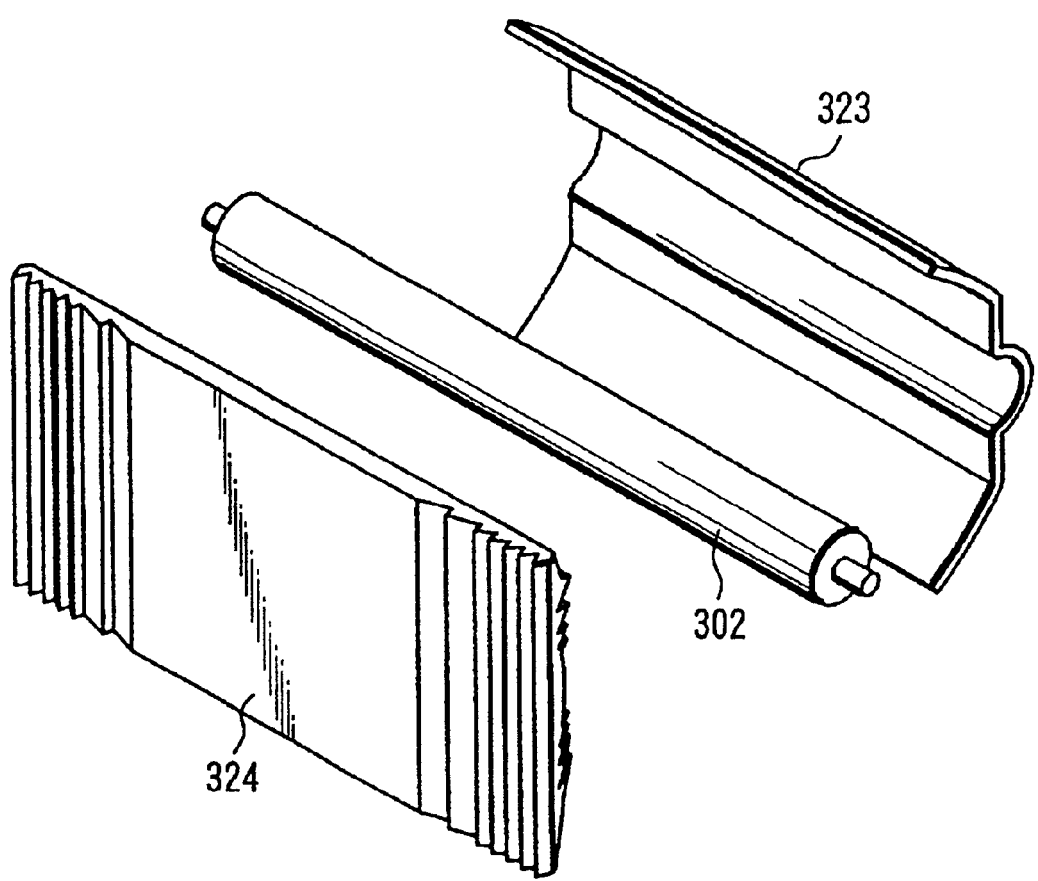
FIG. 34 is an exploded perspective view of the optical system of the lighting apparatus in FIG. 31.

Furthermore, FIG. 33 is a sectional view of the above-described optical system cut with a plane including the center axis of the discharge tube and FIG. 34 is an exploded perspective view of the above-described optical system. FIG. 31(b) and FIG. 32(b) also show traced lines of representative light beams emitted from the center of the discharge tube which is the light source.

Furthermore, the above-described lighting apparatus is mounted in the compact camera (a) and card type camera (b) shown in FIG. 28.

This embodiment is a lighting optical system giving priority to the light distribution characteristic obtained by widening the irradiation angle range shown in FIG. 32 and constructed so that the most excellent light distribution characteristic is obtained regarding this state as a standard.

In the above-described figures, reference numeral 302 denotes a cylindrical discharge tube (xenon tube), which is a light source. Reference numeral 323 denotes a reflector that reflects luminous flux emitted from the discharge tube 302 in the irradiation direction (forward) of the illuminating light. This reflector has a high-reflectance inner surface made of a metallic material such as radiant aluminum or a resin material having an inner surface on which a high-reflectance metal-evaporated surface is formed.

Reference numeral 324 is a prism-like one-piece optical member. On the entrance surface side of the optical member, there is a plurality of prism pairs made up of refracting surfaces 324b, 324d, 324f, 324h, 324b', 324d', 324f', 324h' having refracting power in the direction quasi-perpendicular (vertical direction) to the longitudinal direction of the discharge tube 302 and reflecting surfaces 324c, 324e, 324g, 324i, 324c', 324e', 324g', 324i' that almost satisfy a total reflection condition with respect to the light incident from these refracting surfaces, on the upper and lower sides centered on the optical axis L.

Furthermore, as shown in FIG. 33, Fresnel lens sections 324q and 324q' having refracting power in the longitudinal direction (horizontal direction) of the discharge tube 302 are formed on the right and left peripheries on the side of the exit surface light of the optical member 324.

As the material of this optical member 324, high transmittance optical resin material such as acrylic resin, etc. or glass material is suitable.

This embodiment is a lighting optical system designed to be thinner than the embodiments shown in FIG. 24 to FIG. 27 and capable of obtaining large variations in the irradiation angle while keeping the light distribution characteristic uniformly within the required irradiation range and with a minimum amount of positional change between the light source and optical member. Setting of an optimal shape of each member of this lighting optical system will be explained using FIG. 31 to FIG. 34 in detail below.

First, a basic concept of an irradiation angle change in the vertical direction, which is the radial direction (the direction perpendicular to the longitudinal direction) of the discharge tube, will be explained using FIG. 31 and FIG. 32. Here, FIGS. 31(a) and 31(b) show a state corresponding to the narrowest irradiation angle range and FIGS. 32(a) and 32(b) show a state corresponding to the widest irradiation angle range.

(a) and (b) of each figure show a sectional view of the lighting apparatus cut with the same section and (b) is obtained by adding traced light beams to the sectional view of (a). Reference numerals in the figures correspond to the members in FIG. 33 and FIG. 34.

Furthermore, in these figures, for the same reason in the embodiments shown in FIG. 24 to 27, luminous flux emitted from the center of the light source is regarded as representative luminous flux and the figures only show luminous flux emitted from the center of the light source. As an actual light distribution characteristic, the light distribution characteristic as a whole changes in a direction in which luminous flux spreads slightly due to luminous flux emitted from the periphery of the discharge tube 302 in addition to the representative luminous flux as shown in the figures, but this luminous flux has almost an identical tendency of light distribution characteristic, and therefore the following explanations will be based on this representative luminous flux.

First, the characteristic shapes of the optical system of the above-described lighting apparatus will be explained one by one. The shape of the part of the reflector 323 that covers the back of the discharge tube 302 is semi-cylindrical (hereinafter referred to as "semi-cylindrical section 323a") almost concentric with the discharge tube 302. This is a shape, which is effective to return the light reflected by the reflector 323 to the vicinity of the center of the light source again, and has the effect of preventing adverse influence from refractions of the glass part of the discharge tube 302.

On the other hand, the peripheral sections 323b and 323b' that extend in the vertical direction of this reflector 323 have curved surface shapes so that luminous flux emitted from the center of the light source is reflected by these peripheral sections and led to slopes (324j, 324j') formed in the peripheral sections of the optical member 324. Furthermore, as will be described later, these peripheral sections are formed so that luminous flux refracted through the peripheral sections 324j and 324j' of the optical member 324 has a light distribution characteristic condensed to a certain degree.

Furthermore, the areas (hereinafter referred to as "flat surface areas") 323c and 323c' between the semi-cylindrical section 323a of the reflector 323 and the peripheral sections 323b and 323b' are constructed of flat surfaces almost perpendicular to the optical axis L.

Then, the detailed shape of the optical member 324 which has the largest influence on the light distribution characteristic of the lighting apparatus of this embodiment will be explained. FIG. 31 shows a state in which there is a predetermined distance between the discharge tube 302 and the optical member 324 so that the shape and optical configuration of each section are set to obtain a predetermined condensed state.

First, as shown in FIG. 31(*a*), on the optical member 324, the central area through which the optical axis passes is an area which receives more direct incident light members forming a relatively small angle with the optical axis L of luminous flux emitted from the center of the light source, and to refract these members, a cylindrical lens surface 324*a*, which consists of part of a cylindrical surface, is formed in the optical member 324 facing the light source in the central area.

Then, outside this cylindrical lens surface 324*a*, there are refracting surfaces 324*b* and 324*b*' to receive more luminous flux members not incident on the cylindrical lens surface 324*a* and forming a slightly large angle with the optical axis L of the luminous flux emitted from the center of the light source and behind these refracting surfaces 324*b* and 324*b*', there are reflecting surfaces 324*c* and 324*c*' which almost satisfy total reflection conditions for this refracted light. Up to this point, this optical system is almost the same as the optical system of the embodiment described in FIG. 24 to FIG. 27.

A feature of this embodiment is that there is not only one pair but a plurality of pairs of prism sections made up of these refracting surfaces 324*b* and 324*b*' and reflecting surfaces 324*c* and 324*c*' in the upper and lower sides. That is, outside one pair of upper and lower prism sections made up of refracting surfaces 324*b*, 324*b*' and reflecting surfaces 324*c*, 324*c*' provided near the optical axis L, there is another pair of upper and lower prism sections made up of refracting surfaces 324*d*, 324*d*' and reflecting surfaces 324*e*, 324*e*', and outside these prism sections, there is a further pair of upper and lower prism sections made up of refracting surfaces 324*f*, 324*f*' and reflecting surfaces 324*g*, 324*g*', and outside these prism sections, there is a still further pair of upper and lower prism sections made up of refracting surfaces 324*h*, 324*h*' and reflecting surface 324*i*, 324*i*'.

Then, the respective reflecting surfaces 324*c*, 324*c*', 324*e*, 324*e*', 324*g*, 324*g*', 324*i*, 324*i*' are shaped so that luminous flux reflected here has a light distribution characteristic of a predetermined condensed state.

Furthermore, as described above, in the area peripheral to the outermost prism sections of the optical member 324 facing the light source, there are inclined surfaces 324*j* and 324*j*' which receive the luminous flux reflected by the peripheral sections 323*b* and 323*b*' of reflector 323. The shapes of the peripheral sections 323*b* and 323*b*' of this reflector 323 and the above-described inclined surfaces (refracting surfaces) 324*j* and 324*j*' are also determined so as to obtain a light distribution characteristic of a predetermined condensed state as in the case of the light path via the above-described prism sections.

Luminous flux incident on different sections of the optical member 324 is changed to predetermined angle members by refractions and reflections and then goes out of the same exit surface 324*k*.

Thus, forming a plurality of prism section pairs on the optical member 324 as multiple layers in the vertical direction centered on the optical axis L has an advantage of significantly reducing the depth in the direction of the optical axis of the lighting optical system. At the same time, when applied to a lighting apparatus, which allows the irradiation angle to be variable, this embodiment also has an advantage of significantly reducing the amount of change in the relation of positions in the direction of the optical axis between the light source and optical member 324 when changing the irradiation angle. This can be said to be an extremely effective mode in realizing a lighting optical system of a variable irradiation angle type with a minimum volume, which is extremely thin, yet capable of obtaining a desired light distribution characteristic.

FIG. 31(*b*) is a light traced lines showing how luminous flux emitted from the center of the light source passes through each surface of the optical member 324 and what light path the luminous flux takes. As shown in the figure, most luminous flux emitted from the center of the light source is changed to members forming a relatively small angle with the optical axis L. That is, it is possible to obtain the most condensed state in the optical system of this embodiment using this optical configuration.

On the other hand, FIG. 32 shows a state in which the discharge tube 302 is placed close to the optical member 324, which provides a wider irradiation angle range than the state shown in FIG. 31. This embodiment adjusts the light distribution characteristic in this state to a light distribution characteristic when a wide angle lens is mounted and optimizes the system so as to obtain the most uniform light distribution characteristic and regards this state as the design standard state.

In such an optical configuration, edges 324*l*, 324*l*', 324*m*, 324*m*', 324*n*, 324*n*', 324*o* and 324*o*' come closer to the flat surface sections 323*c* and 323*c*' of the reflector 323, which consist of intersections between the refracting surfaces and reflecting surfaces of the respective prism sections. Thus, when the optical member 324 comes closer to the reflector 323, the amount of the luminous flux component emitted from the center of the light source and incident on the cylindrical lens surface 324*a* increases as shown in FIG. 32(*b*), while the amount of luminous flux component which would originally be directed to the peripheral sections 323*b* and 323*b*' of the reflector 323 is decreased significantly.

More specifically, since the discharge tube 302 and the reflector 323 are maintained as one body, the members originally directed to the peripheral sections 324*j* and 324*j*' of the optical member 324 through these peripheral sections 323*b* and 323*b*' are the members which should always be condensed to a small range of angle formed with the direction of the optical axis. However, as described above, the edges 324*o* and 324*o*' of the optical member 324 come closer, and therefore these members are reduced extremely and allocated to different prism sections adjacent there to one by one. At the same time, while the optical member 324 is away from the reflector 323, part of luminous flux controlled by the reflecting surfaces 324*c* and 324*c*' directly enters the cylindrical lens surface 324*a* formed in the central area through which the optical axis L passes and the ratio of the luminous flux components incident on this cylindrical lens surface 324*a* increases.

Thus, as opposed to the original configuration in the condensed state in FIG. 31 in which luminous flux of three areas; the refraction area in the central area, the reflection area of the optical member 324 (prism section) peripheral thereto and the reflection area of the reflector 323 on the outermost periphery is condensed to a certain range, this embodiment can gradually change the condensed state of each area above by allowing the light-emitting section made up of the light source and reflector 323 and the optical member 324 to come closer in direction of the optical axis L. This is not only because this phenomenon can change, through reflections, the orientation of the luminous flux component whose outgoing direction would be controlled through refractions in the previous state and can drastically change the irradiation direction, but also because this reflection phenomenon is handled in the optical member 324 with a higher refractive index, and therefore a greater angle change can be expected.

This reflection component of light is changed to a member in a certain narrow angle area in the periphery on the irradiation plane as shown in FIG. 32(b). In the traced lines of light in FIG. 32(b), this reflection member seems to be changed to only a predetermined angle member in a certain direction, but actually the light source has a certain dimension, and therefore the angle area extends to a certain area and also overlaps with the member in the refraction area in the central area, and therefore it is possible to obtain a light distribution characteristic having an almost uniform angle distribution over a wide angle range as a whole.

Furthermore, the luminous flux component in the reflection area of the reflector 323 is reduced gradually as the light source and optical member 324 come closer. Here, leaving a certain amount of the luminous flux component of this reflection area makes it possible to suppress a reduction of the light component forming a small angle with the direction of the optical axis and prevent luminous flux near the optical axis from reducing in the light distribution characteristic, and therefore it is effective to leave a certain amount of this member.

Thus, the configuration of this embodiment can drastically change the irradiation angle range by making a small change to the relation of positions between the light source and optical member 324 in the direction of the optical axis L, and at the same time allow luminous flux components of multiple areas to compensate for changed distribution characteristics and thereby realize a uniform optical system with little light quantity loss with respect to the required irradiation range as a whole.

Especially, placing a plurality of layers of prism sections in the direction (vertical direction) perpendicular to the direction of the optical axis makes it possible to realize a lighting optical system with a significantly reduced depth in the direction of the optical axis.

According to the configuration of this embodiment, it is possible to reduce the maximum dimensions of the optical system in the direction of the optical axis shown in FIG. 31 to 4.9 mm, smaller than 5 mm. On the other hand, the state with the widest irradiation angle shown in FIG. 32 is realized by making a change as small as 0.6 mm to the relation of positions between the light source and optical member 324 in the direction of the optical axis L compared to the state in FIG. 31.

Thus, since the configuration of this embodiment allows a drastic change of the irradiation angle range with a fewer members, the configuration of this embodiment includes the following advantages:

1. Light from the light source can be irradiated without many parts, and therefore higher efficiency is achieved.
2. Ultra-miniaturization is possible though the system is also equipped with the function of changing the irradiation angle range.
3. A cost reduction is possible.

Then, an optimal distribution ratio between three areas; the above-described refraction area, reflection area of the prism sections and reflection area of reflector 323, will be explained.

Basically, the largest feature of this embodiment is that a plurality of reflecting surfaces of the prism section is formed and placed in such a way as to overlap with one another in the form of layers in the direction perpendicular to the optical axis to minimize the thickness of the optical system in the direction of the optical axis. Thus, unlike the concept of the embodiments shown in FIG. 24 to FIG. 27, the way for extending the reflection area of the plurality of layers of prism sections determines the extent to which the thickness of the lighting apparatus can be reduced.

Furthermore, in the most condensed state shown in FIG. 31, it is preferable that the angle α, which is an angle that luminous flux incident on the refracting surface of this prism section from the center of the light source forms with the optical axis L be:

$$20°\leq\alpha\leq 80°  \quad (4)$$

Here, if the angle α is smaller than 20°, which is the lower limit of the above-described Formula (4), forming the reflection area of the prism section itself becomes difficult. That is, the angle of the edges of the prism section itself becomes considerably acute and at the same time it is necessary to form a shape deep in the thickness direction of the prism section. This makes it difficult not only to construct but also to manufacture a thin-shaped optical system, which is the main subject of the present invention, and is therefore not desirable. On the other hand, if the angle α is larger than 80°, which is the upper limit, the ratio of the luminous flux component condensed by the reflector 323 decreases resulting in a reduction of the amount of luminous flux directed toward the central area with the widened irradiation angle, making it impossible to always obtain a uniform light distribution characteristic.

For the above-described reasons, this embodiment forms a plurality of prism section pairs corresponding to luminous flux forming an angle with the optical axis L within an approximately 50° range from 25° to 75° for optimization.

As an ideal mode, it is preferable to widen this reflection area by this prism section wherever possible and this allows a configuration with dimensions in the thickness direction of the optical member 324 reduced most, making it possible to realize an ultra-thin-shaped optical system, reduce the time for molding the optical member 324 with a resin material, providing an inexpensive and easy to process mode.

Then, optimal shapes of refracting surfaces 324b, 324b', 324d, 324d', 324f, 324f', 324h and 324h' which lead luminous flux in the prism section to reflecting surfaces 324c, 324c', 324e, 324e', 324g, 324g', 324i and 324i' will be explained. As is apparent from the light traced lines shown in FIG. 31(b) and 32(b), luminous flux emitted from the center of the light source is refracted through the respective refracting surfaces a great deal, directed in the direction away from the optical axis L and reaches the reflecting surface of the same prism section.

An ideal shape of this refracting surface have a configuration leading the largest possible ratio of luminous flux emitted from the light source to the reflecting surfaces and for this purpose it is necessary to drastically refract light through this refracting surface. This also leads to reducing the length of each reflecting surface in the direction of the optical axis L, that is, reducing dimensions of the optical system in the thickness direction, which also agrees with the subject of the present invention.

As a specific shape, it is preferable that the refracting surfaces 324b, 324b', 324d, 324d', 324f, 324f', 324h and 324h' be flat surfaces having a gradient of 0° with respect to the optical axis L. However, it is difficult to form a flat surface having a gradient of 0° for reasons related to the moldability and processing accuracy of the optical member. Taking into account the processing condition, this embodiment constructs these refracting surfaces 324b, 324b', 324d, 324d', 324f, 324f', 324h and 324h' with flat surfaces having a gradient of 10° or less with respect to the optical axis L or with curved surfaces which are easy to process.

On the other hand, this embodiment can achieve unprecedented effects specific to the present invention by constructing reflection areas made up of a plurality of prism sections for a single optical member and changing the relation of positions between this optical member and light source.

First, it is possible to minimize the volume required for the lighting optical system of a variable irradiation angle type. That is, instead of constructing the reflecting surfaces with a conventional single curved surface (reflector or reflecting surface) continuous in the direction of the optical axis, this embodiment constructs the reflecting surfaces with a plurality of discrete reflecting surfaces utilizing total reflection and places the plurality of reflecting surfaces in such a way as to overlap with one another in the direction perpendicular to the optical axis. Constructing the reflecting surfaces in this way can significantly reduce the thickness in the depth direction (the direction of the optical axis L) of the lighting optical system and minimize the volume necessary for the lighting optical system.

According to FIG. 31 and FIG. 32, the reflecting surfaces 324c and 324c' are placed near the optical axis first and the reflecting surfaces 324e and 324e' are placed at positions peripheral to the reflecting surfaces 324c and 324c' and overlapping them in the direction of the optical axis. Likewise, this embodiment adopts a configuration significantly reducing the thickness of the reflecting surface in the direction of the optical axis as a whole by placing the reflecting surfaces 324g, 324g' and 324i, 324i' so that their positions in the direction of the optical axis L overlap with one another.

Second, since the optical member 324 is of a thin-shaped type, it has excellent moldability and can be manufactured at a low cost. That is, the optical action section required for the optical member 324 is only the cylindrical lens surface 324a having positive refracting power in the central area and a plurality of prism sections with acute angles made up of refracting surfaces and reflecting surfaces. Therefore, though having a simple shape, the optical member 324 can perform sufficient optical functions making it possible to significantly reduce the thickness of the optical member 324 as a whole.

This not only improves moldability of the optical member 324 using resin but also minimizes a reduction of light quantity due to the transmittance of the resin material and also contributes to a reduction of weight of the lighting apparatus and therefore a reduction of weight of the image pickup apparatus.

Furthermore, the shape of the outermost plane of the optical member 324 is quite simple and constructed of a surface with few optical restrictions, and therefore it is easy to maintain the optical member 324 and there is no need to adopt a special support structure even when mounted on an image pickup apparatus and it is a mode quite easy to handle.

Third, constructing a reflecting area with a plurality of reflection members can prevent a problem of a conventional light guide type electronic flash, that is, a problem that when an optical member made of a resin optical material is placed close to a light source, the optical member is generally melted by heat produced by the light source making it impossible to obtain the original optical characteristic depending on the light-emitting condition.

That is, by constructing a reflecting area with a plurality of reflecting surfaces, it is possible to place the edges 324l and 324l', which is a boundary between the refracting surface and reflecting surface of the optical member 324 which is most vulnerable to heat, away from the light source.

Furthermore, it is also possible to expand the space around the discharge tube 302. This minimizes the influence of radiant heat and convection heat produced during continuous light emission on the resin material and prevents deterioration of the optical characteristic.

Thus, it is possible to construct a small and highly efficient lighting optical system of a variable irradiation angle with little loss of light quantity due to irradiation toward the outside of the required irradiation range using a small number of members of only the reflector 323 and optical member 324.

Then, a condensing action in the longitudinal direction of the discharge tube 302 according to this embodiment will be explained using FIG. 33.

As shown in the figure, this embodiment forms a flat surface section 324p in the central area of the outgoing light side of the optical member 324 and provides Fresnel lens sections 324q and 324q' in the peripheral sections to provide a predetermined light distribution characteristic.

Here, though the optical member 324 has a considerably thin-shaped configuration, the peripheral sections near the terminal sections at the right and left ends of the discharge tube 302 are areas where certain luminous flux directivity exists. Furthermore, forming the Fresnel lens sections 324q and 324q' in this area makes it possible to generate a relatively good condensing action.

On the other hand, in the central area of the exit surface, the flat surface section 324p is constructed for the following reason. That is, for a lighting optical system in which the irradiation angle is changed within a wide view angle range according to a relatively wide angle lens as shown in this embodiment, it is possible to realize uniform irradiation using a flat plane rather than a complicated plane configuration to condense luminous flux for areas near the optical axis where it is difficult to control luminous flux.

Determining the shape of each section of the outgoing light side of the optical member 324 makes it possible to uniformly and efficiently condense outgoing luminous flux within a certain angle range although this is quite a thin-shaped optical system with the optical member 324 placed close to the light source.

Thus, this embodiment performs condensing control for the longitudinal direction (horizontal direction) of the discharge tube 302 by using Fresnel lens sections 324q and 324q' on the outgoing light side of the optical member 324 and performs condensing control for the direction perpendicular (vertical direction) to the longitudinal direction of the discharge tube 302 by using the cylindrical lens surface 324a and reflector 323 provided on the light source side of the optical member 324 and a plurality of reflecting surfaces (prism sections) of the optical member 324 placed at a some midpoint between these two areas, and can thereby provide an ultra-thin lighting optical system with an excellent optical characteristic unprecedented by the previous arts.

As shown above, this embodiment performs light distribution control in the direction perpendicular to the longitudinal direction of the light source by changing the relative distance between the light source and the optical member 324 and changing the irradiation angle range using areas of three types and 11 layers of the cylindrical lens surface 324a provided on the light source side, the reflector 323 and reflecting surfaces of a plurality of prism section pairs.

Moreover, as shown in this embodiment, the present invention is sufficiently applicable to an optical system that makes a change of the irradiation angle giving priority to the light distribution characteristic on the wide angle side, and is also applicable to a lighting optical system provided with a required condensing action by moving the optical member 324 and light source in the direction so as to increase the distance between them by a predetermined amount using this state as the reference.

Furthermore, this embodiment has presented examples of cases where all the configurations of the light source planes and the configurations of the outgoing light planes are symmetric with respect to the optical axis, but the present invention is not limited to such symmetric configurations. For example, it is also possible to place the reflecting surfaces of the prism section of the optical member 324 asymmetrically with respect to the optical axis or the number of reflecting surfaces may vary between the upper side and lower side of the optical axis. Furthermore, it is possible to provide asymmetric shapes not only for the above-described reflecting surfaces but also for the reflector and the cylindrical lens surface. Likewise, with respect to the Fresnel lens surfaces formed on the plane of outgoing light side, it is possible to provide variations for the light distribution characteristic in the horizontal direction using Fresnel lenses with different angle settings on the right and left.

Furthermore, the cylindrical lens surface 324a formed in the central area of the optical member 324 is constructed of part of the cylindrical surface, but can also be non-spherical or toric lens surface, taking into account the condensing performance in the longitudinal direction of the light source.

Figure 35:
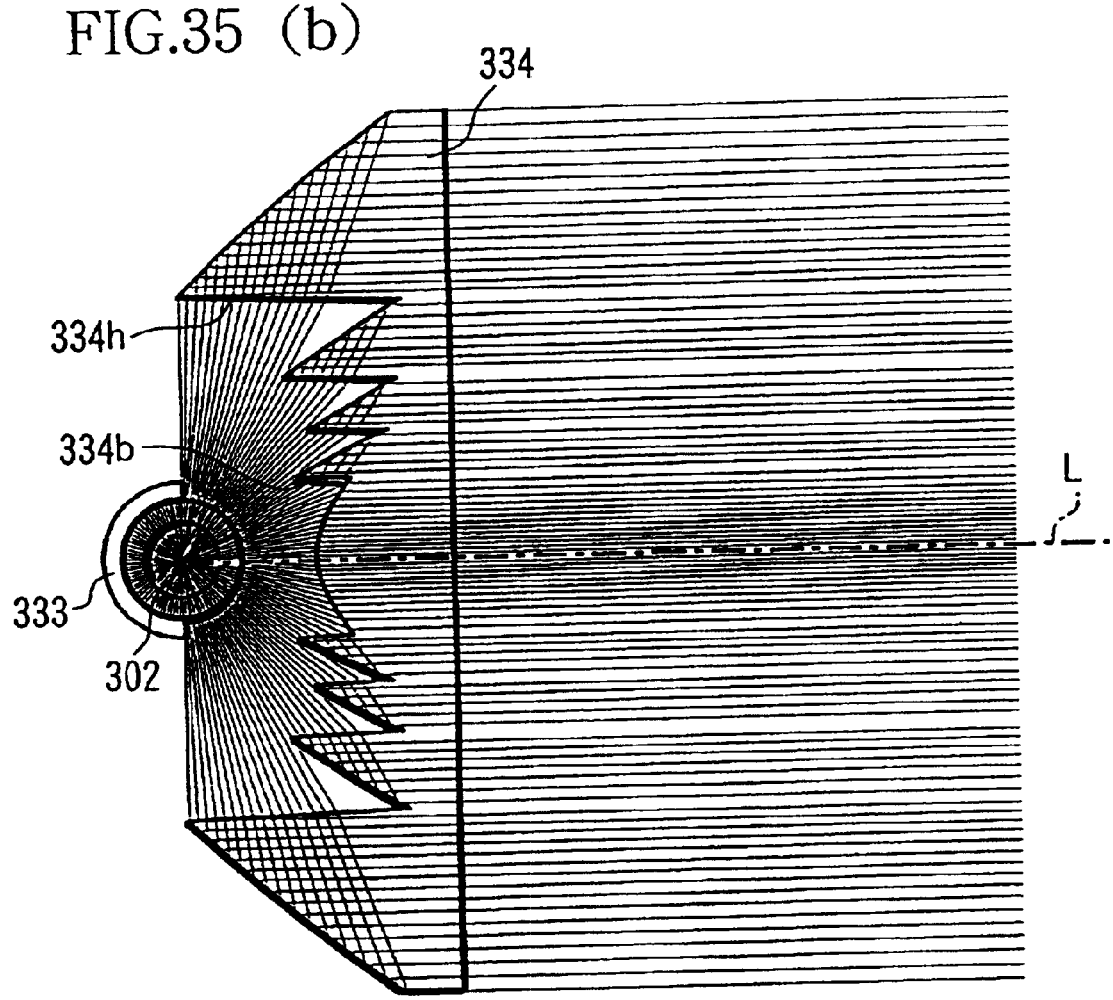
FIG. 35 is a sectional view of a lighting apparatus (in a condensed state), which is another embodiment of the present invention in the radial direction of a discharge tube.
Figure 36:
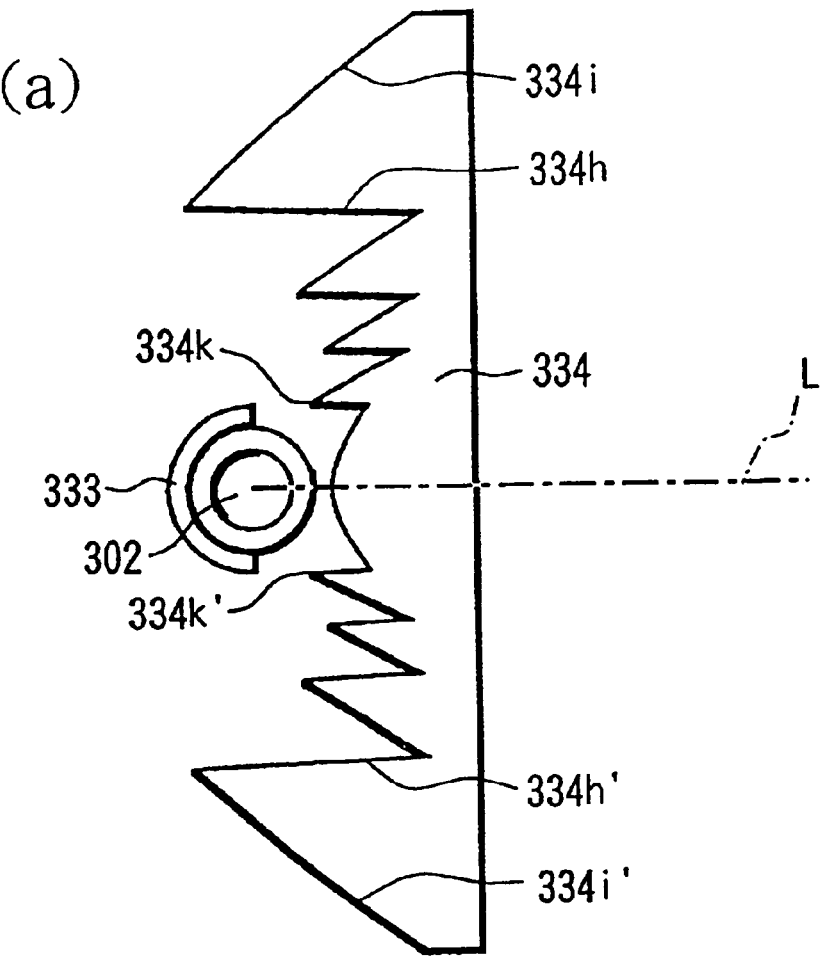
FIG. 36 is a sectional view of the lighting apparatus (in a diffused state) in FIG. 35 in the radial direction of the discharge tube and a traced drawing of representative light beams.
Figure 36:
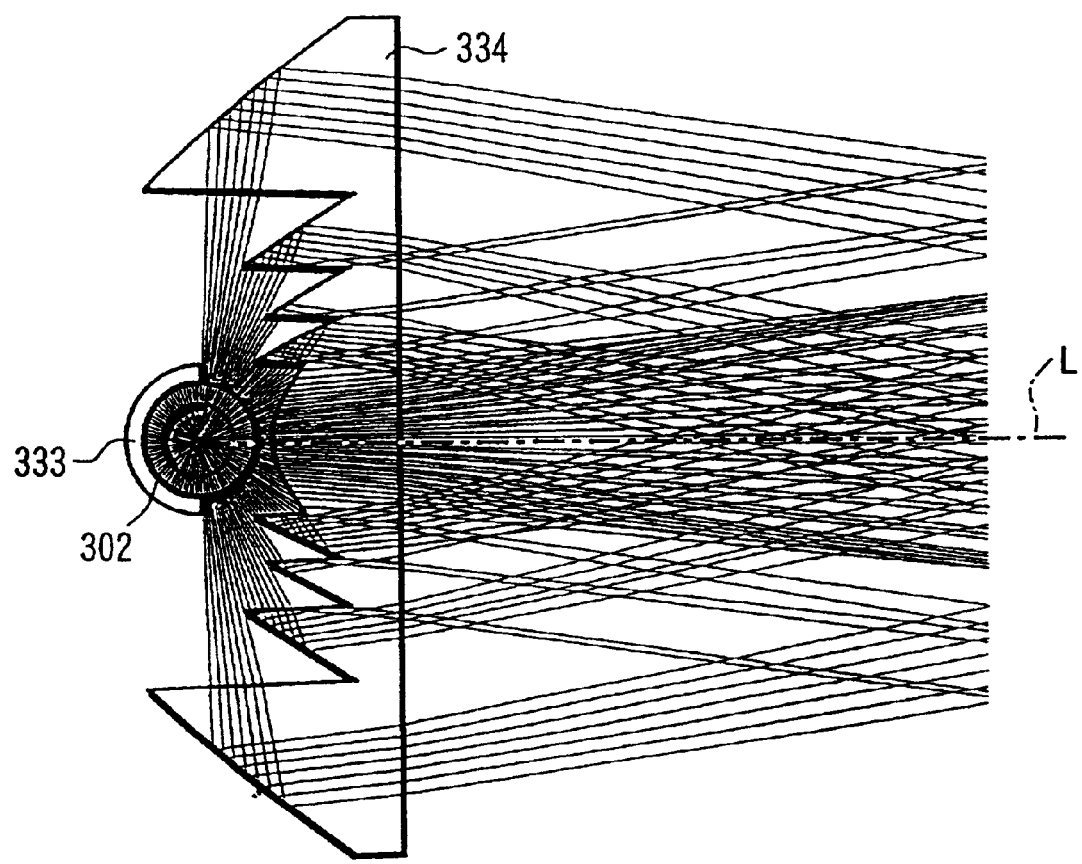

FIG. 35 and FIG. 36 show a configuration of an optical system of a lighting apparatus, which is another embodiment of the present invention. FIG. 35 shows a condensed state with the narrowed irradiation angle range and FIG. 36 shows a diffused state with the widened irradiation angle range. This embodiment is a lighting optical system that gives priority to the light distribution characteristic with the narrowed irradiation angle range shown in FIG. 35 and determines the shape of each section so that the characteristic with the most excellent condensing performance is obtained in this condition. Furthermore, FIG. 35(b) and FIG. 36(b) also show light traced lines of representative light beams emitted from the center of the light source together.

Furthermore, the above-described lighting apparatus is mounted in the compact camera (a) and card type camera (b) shown in FIG. 28.

In the above-described figures, reference numeral 302 denotes a cylindrical discharge tube (xenon tube) which is a light source. Reference numeral 333 denotes a semi-cylindrical reflector that reflects luminous flux emitted from the discharge tube 302 forward. This reflector has a high-reflectance inner surface made of a metallic material such as radiant aluminum or a resin material having an inner surface on which a high-reflectance metal-evaporated surface is formed.

Reference numeral 334 is an optical member provided with a plurality of prism section pairs made up of refracting surfaces having refracting power in the direction quasi-perpendicular to the longitudinal direction (vertical direction) of the discharge tube 302 and reflecting surfaces on entrance surface. As the material of this optical member 334, high transmittance optical resin material such as acrylic resin, etc. or glass material is suitable.

This embodiment is capable of making large changes of the irradiation angle while significantly reducing the thickness of the overall shape of the lighting optical system, keeping the light distribution characteristic within the required irradiation range uniformly and with a minimum amount of positional change between the light source and optical member 334 and the largest difference from the embodiments shown in FIG. 24 to FIG. 27 is that this embodiment performs light distribution control using a total reflection action of the optical member 334 without wrapping around the peripheral sections of the reflector 333 behind the optical member 334.

The shape of the discharge tube 302 in the axial direction is the same as that of the discharge tube 302 according to the embodiments in FIG. 24 to 27 and FIG. 31 to 34. An optimal shape of the lighting optical system according to this embodiment will be explained using FIG. 35 and FIG. 36 in detail below.

FIG. 35 and FIG. 36 show a basic concept of making a change of the irradiation angle in the vertical direction according to this embodiment. Here, FIGS. 35(a) and 35(b) show a state corresponding to the narrowest irradiation angle range and FIGS. 36(a) and 36(b) show a state corresponding to the widest irradiation angle range. (a) and (b) in the figures are drawings of the same section.

Furthermore, for simplicity of explanation, for the same reasons explained in the embodiments in FIG. 24 to 27, these figures show only luminous flux emitted from the center of the light source as representative luminous flux.

First, the characteristic shape of the above-described lighting optical system will be explained one by one. Reflector 333 is formed so as to cover the back of the discharge tube 302 and the shape is semi-cylindrical almost concentric with the discharge tube 302. This is attributable to the same reason explained in the embodiment described in FIG. 24 to FIG. 27.

Then, the detailed shape of the optical member 334 will be explained. FIG. 35 shows a state in which there is a predetermined distance between the discharge tube 302 and optical member 334 and this is the most condensed state obtained in this embodiment.

As shown in FIG. 35(a), in the central area through which the optical axis L passes on the light source side of the optical member 334, a non-spherical cylindrical lens surface 334a is formed to refract the direct light member of luminous flux emitted from the center of the light source, which forms a relatively small angle with the optical axis L. Because of the non-spherical shape of this cylindrical lens surface 334a, luminous flux emitted from the center of the light source is refracted so that the luminous flux emitted from the center of the light source becomes quasi-parallel to the optical axis L with respect to this section.

In the area peripheral to the cylindrical lens surface 334a, a plurality of prism section pairs made up of refracting surfaces 334b, 334b', 334d, 334d', 334f, 334f', 334h and 334h' to receive incident luminous flux components forming a relatively large angle with the optical axis without passing through the cylindrical lens surface 334a out of the luminous flux emitted from the center of the light source and reflecting surfaces 334c, 334c', 334e, 334e', 334g, 334g', 334i and 334i' that satisfy almost the total reflection condition for the light members incident from the respective refracting surfaces, in the vertical direction centered on the optical axis L.

Then, the reflecting surfaces 334c, 334c', 334e, 334e', 334g, 334g', 334i and 334i' are shaped so that luminous flux reflected here is in a predetermined condensed state.

Thus, the luminous flux incident on the respective sections of the optical member 334 is refracted or totally reflected by the optical member 334 and then goes out of the same exit surface 334j.

Since this embodiment places a plurality of prism section pairs in such a way as to overlap with one another in the vertical direction perpendicular to the optical axis L on the light source side of the optical member 334, this embodiment has an advantage of significantly reducing the depth in the direction of the optical axis L of the lighting optical system. When this configuration is applied to the lighting optical system whose irradiation angle can be changed, this embodiment also has an advantage of significantly reducing the amount of change of the relation of positions in the direction of the optical axis L between the light source and optical member 334 when the irradiation angle is changed. This is extremely effective in realizing a lighting optical system of a variable irradiation angle type with a minimum volume capable of achieving a desired light distribution characteristic despite a very thin configuration.

Furthermore, since this embodiment has no peripheral sections of the reflectors located outermost with respect to the optical axis L and no light path through refractions of the optical member shown in FIG. 24 to FIG. 27, and FIG. 31 to FIG. 34, it is possible to obtain a stable optical characteristic easily without the need to consider the accuracy of positioning between the reflector and the optical member or mutual interference between the reflector and optical member.

FIG. 35(*b*) is a light traced drawing showing what light path is taken by luminous flux emitted from the center of the light source and incident on the respective surfaces of the optical member 334. As shown in the figure, most of luminous flux emitted from the center of the light source is changed so as to be almost parallel to the optical axis L. That is, the most condensed state can be realized with this optical configuration in the optical system of this embodiment.

On the other hand, FIG. 36 shows the discharge tube 302 placed closer to the optical member 334 compared to the state shown in FIG. 35 and the optical configuration is set so as to extend the irradiation angle range by a predetermined amount. In this embodiment, the light distribution characteristic in this state corresponds to the light distribution characteristic when a wide angle lens is mounted.

First, in the case of such an optical configuration, the edges 334*k* and 334*k*' formed of an intersection between the refracting surfaces 334*b*, 334*b*' and reflecting surfaces 334*c*, 334*c*' come closer to the reflector 333. Thus, as the optical member 334 comes closer to the reflector 333, the member of light emitted from the center of the light source and incident on the cylindrical lens surface 334*a* increases as shown in FIG. 36(*b*), while the amount of luminous flux incident on the refracting surfaces 334*h*, 334*h*' of the peripheral sections of the optical member 334 is extremely reduced.

Thus, in the condensed state shown in FIG. 35 while the all luminous flux from the refraction area in the central area and the reflection area of the prism sections peripheral thereto is quasi-parallel to the optical axis. And as described in FIG. 36, it is possible to gradually change the condensed state of light from the above-described areas by allowing the light-emitting section made up of the light source and reflector 333 and the optical member 334 to come closer in the direction of the optical axis L.

This makes it possible to make a drastic change of the irradiation angle range with a small change to the relative positions between the light source and optical member 334 in the direction of the optical axis. Especially placing a plurality of reflecting surfaces of the prism sections so as to overlap one another from the optical axis side to the peripheral side makes it possible to realize a lighting optical system having an extremely small depth in the direction of the optical axis L.

This embodiment forms four layers of reflecting surfaces in both the upper and lower sides of the optical member 334, but the present invention is not limited to the four layers of reflecting surfaces. As the number of layers of reflecting surfaces increases, it is possible to construct a thinner optical system.

Furthermore, to reduce the overall size of the optical system, it is also necessary to consider the pitch of reflecting surfaces in addition to multiple layers of reflecting surfaces. This embodiment is designed to achieve balance in the overall shape by segmenting the pitch of reflecting layers in the area close to the cylindrical lens surface 334*a* formed in the central area of the optical member 334 and widening this pitch toward the periphery for the following reasons:

First, from the relation of positions between the light source and the respective refracting surfaces that lead luminous flux to the reflecting surfaces, as the angle of incidence on each refracting surface changes and the luminous flux goes away from the optical axis L, the angle of incidence decreases. This is also apparent from FIG. 35(*b*) and light incident on the refracting surface 334*b* near the optical axis has a considerably large angle of incidence, while light incident on the refracting surface 334*h* in the peripheral section has a smaller angle of incidence. Thus, the difference in the angle of incidence of light incident on each refracting surface also has a considerable influence on the shape of the reflecting surface provided for this refracting surface.

That is, for the refracting surface having an acute angle of incidence, it is necessary to form the reflecting surface which is deeper, that is, the reflecting surface which extends to the exit surface side. However, extending the reflecting surface in this way makes it more difficult to reduce the thickness of the lighting optical system in the direction of the optical axis, which is the greatest object of the present invention.

Thus, to avoid this problem, this embodiment narrows the area of incidence on the refracting surface near the optical axis where luminous flux has a large angle of incidence. In other words, this embodiment narrows the pitch of the prism section near the optical axis to prevent the reflecting surface from exceeding a predetermined depth.

For this reason, by narrowing the pitch of the prism section near the optical axis and widening the pitch of the prism section in the periphery, it is possible to maintain the position in the direction of the optical axis at the end of the reflecting surface on the entrance surface side almost constant and reduce the thickness of the optical member. For the same reason, by increasing the number of reflecting surfaces, it is possible to reduce the depth of the reflecting surfaces and reduce the overall thickness of the optical member. Therefore, if it is intended to reduce the overall size of the optical system to a minimum, it is desirable to narrow this pitch.

By the way, when the number of reflecting surfaces increases, the miniaturization in the direction of the optical axis may be achieved, but the dimensions in the vertical direction perpendicular to the the optical axis L increases. Thus, this embodiment prevents this unnecessary expansion of dimensions by widening the pitch of the reflecting surfaces as the distance from the optical axis L increases. Especially, this embodiment prevents expansion of dimensions in the direction perpendicular to the optical axis by covering the layers of the outermost refracting surfaces 334*h*, 334*h*' and reflecting surfaces 334*i*, 334*i*' up to a large angle range with respect to the light source.

This embodiment has described the case where the optical characteristic is optimized with respect to the optical member 334 with four layers of reflecting surfaces, and this embodiment also attains a reduction of dimensions in the vertical direction through the above-described measure that minimizes the thickness in the direction of the optical axis L.

The effects specific to this embodiment include the following:

First, this configuration is very simple. As the reflector 333, a minimum semi-cylindrical reflector concentric with the discharge tube 302, which is the light source, can be used. Furthermore, with respect to a change to the irradiation angle range, it is possible to realize a lighting optical system whose irradiation angle range can be changed by only changing the relation of positions between the light source and optical member 334 with a very simple configuration.

Second, this embodiment can irradiate an object with luminous flux emitted from the light source very efficiently. This embodiment performs light distribution control on all luminous flux emitted from the light source forward (including luminous flux reflected by the reflector 333) through refractions or reflections by the optical member 334. Thus, this embodiment can efficiently lead luminous flux compared to reflections on metallic surfaces of conventional reflectors and can also use limited energy effectively.

Third, this embodiment can form a wide range of air layer on the periphery between the reflector 333 and optical member 334. In a conventional light guide electronic flash, a resin material is often placed near the light source, which causes a problem that heat generated from the light source deforms the optical member, making it impossible to obtain the original optical characteristic depending on the light-emitting condition. Adopting the configuration of this embodiment can also expand a space around the discharge tube, minimize influences of radiant heat and convection heat generated during continuous light emission on the resin material and prevent deterioration of the optical characteristic.

Figure 37:
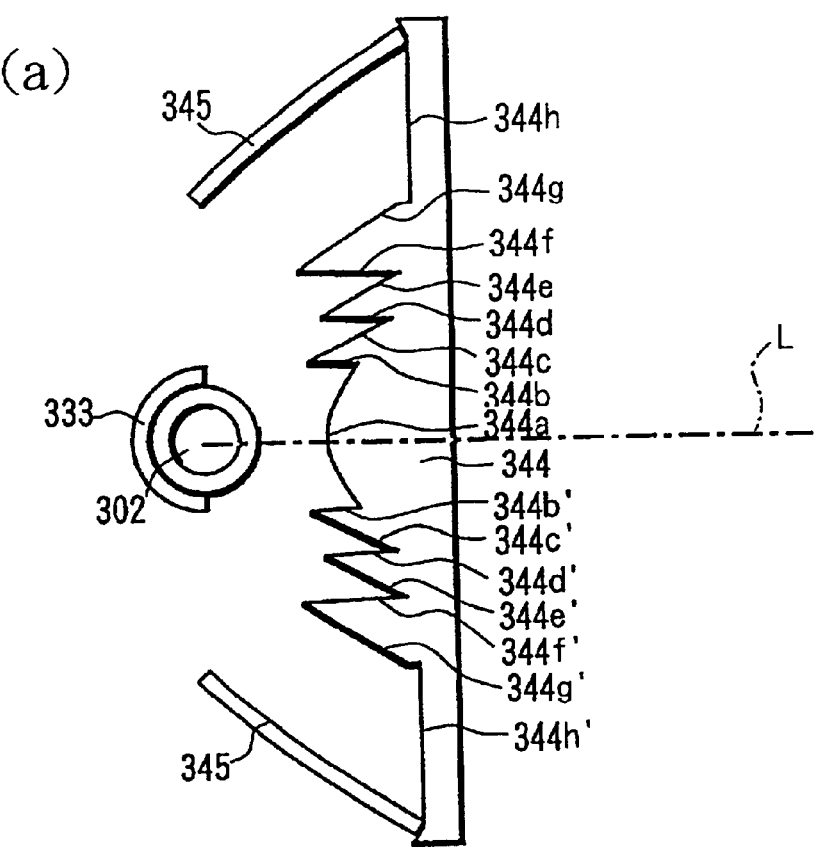
FIG. 37 is a sectional view of a lighting apparatus (in a condensed state), which is another embodiment of the present invention in the radial direction of a discharge tube.
Figure 37:
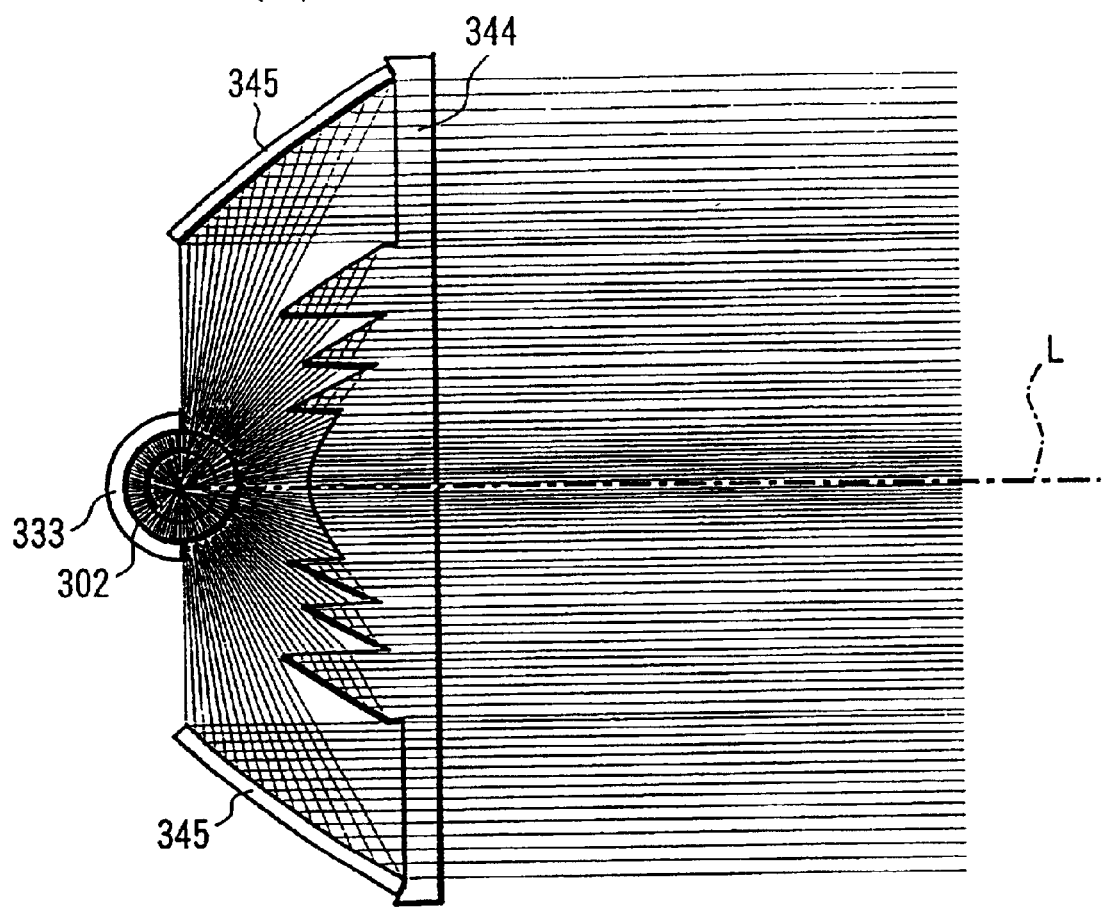
Figure 38:
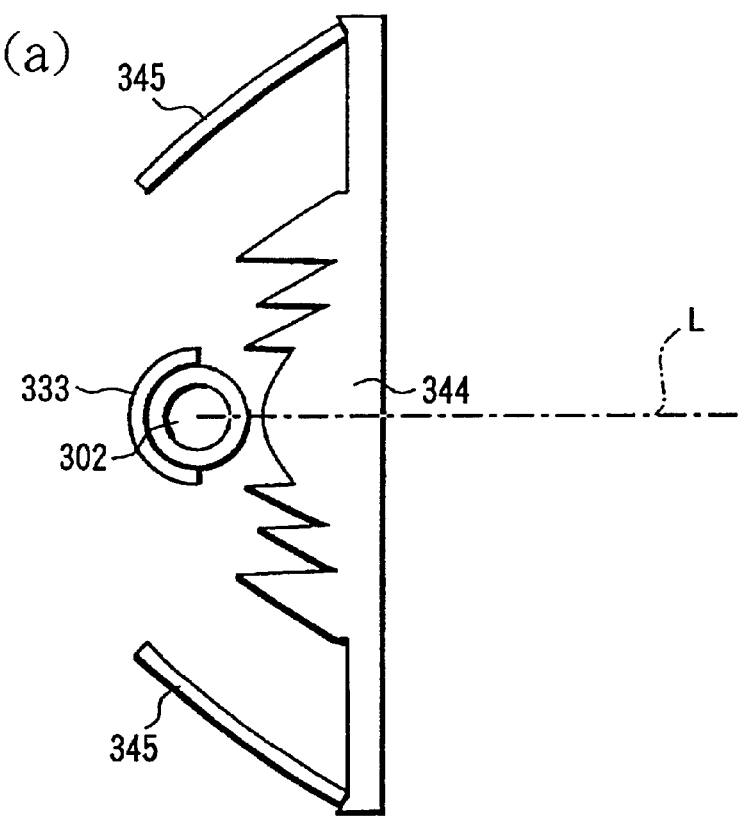
FIG. 38 is a sectional view of the lighting apparatus (in a diffused state) in FIG. 37 in the radial direction of the discharge tube and a traced drawing of representative light beams.
Figure 38:
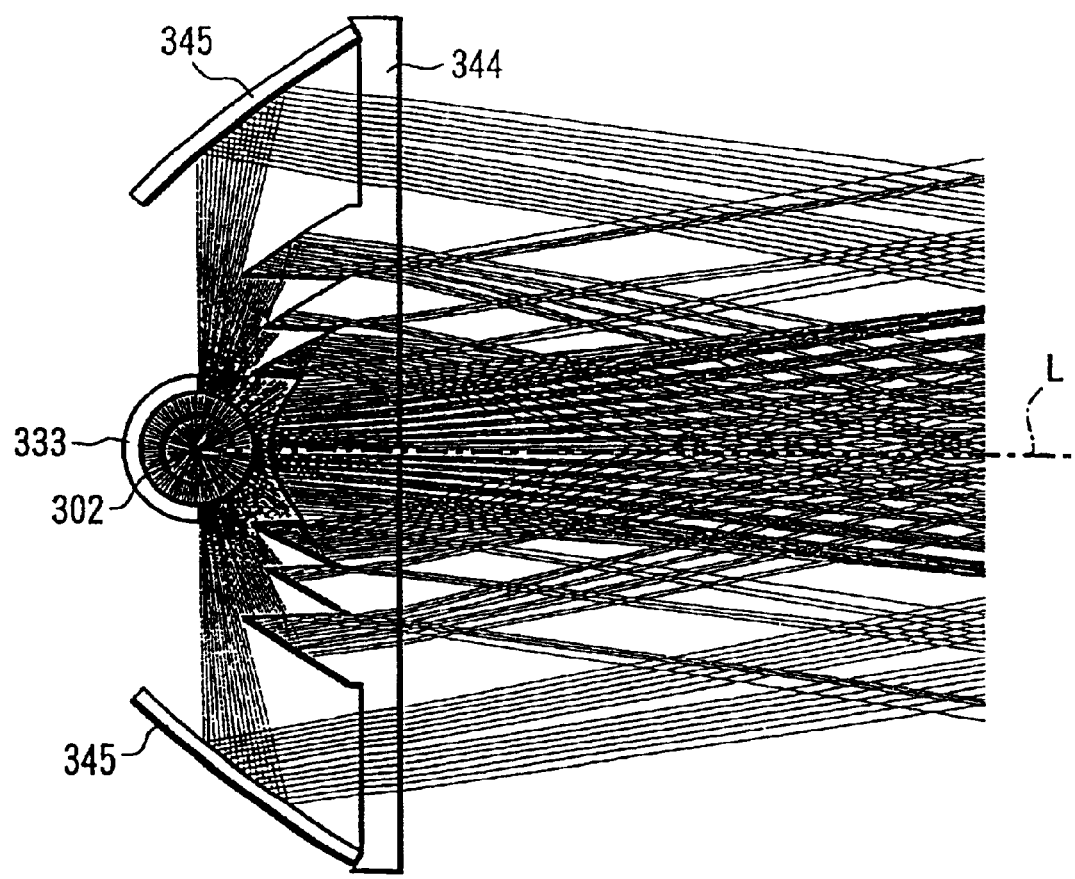

FIG. 37 and FIG. 38 show the configuration of an optical system of a lighting apparatus, which is another embodiment of the present invention. This embodiment is a mode in which the embodiments shown in FIG. 35 and FIG. 36 are partially changed. FIG. 37 shows a condensed state with the narrowed irradiation angle range and FIG. 38 shows a diffused state with the widened irradiation angle range. This embodiment is a lighting optical system giving priority to the light distribution characteristic obtained by narrowing the irradiation angle range shown in FIG. 37 and determines the shapes of the respective sections so that the most excellent condensing characteristic is obtained in this state. FIG. 37(b) and FIG. 38(b) also show light traced lines of representative light beams emitted from the center of the light source together.

In the above-described figures, reference numeral 302 denotes a cylindrical discharge tube (xenon tube) which is a light source. Reference numeral 333 denotes a semi-cylindrical reflector that reflects luminous flux emitted from the discharge tube 302 forward.

Reference numeral 344 is an optical member provided with a plurality of prism section pairs made up of refracting surfaces having refracting power in the vertical direction perpendicular to the longitudinal direction of the discharge tube 302 on the entrance surface and reflecting surfaces, and a reflector 345 is fixed thereto as one body. This reflector 345 is intended to construct reflecting surfaces having the functions equivalent to those of the outermost prism sections (334h, 334i) in the embodiments shown in FIG. 35 and FIG. 36. The reflecting surface of this reflector 345 is constructed of a paraboloidal metallic reflecting surface. Furthermore, as the material of the optical member 344, a high transmittance optical resin material such as acrylic resin or glass material is suitable.

This embodiment is capable of obtaining large changes of the irradiation angle while significantly reducing the thickness of the overall shape of the lighting optical system of an image pickup apparatus in particular, keeping the light distribution characteristic within the required irradiation range uniformly with a minimum amount of positional change between the light source and optical member 344 and the reflector 345 in the direction of the optical axis L. The largest difference from the embodiments in FIG. 35 and FIG. 36 above is that part of the reflecting surface of the optical member is replaced by a reflection member.

The shape of the discharge tube 302 in the axial direction is the same as that in the embodiments in FIG. 24 to FIG. 27 and FIG. 31 to FIG. 34. An optimal shape of the lighting optical system according to this embodiment will be explained in detail below.

FIG. 37 and FIG. 38 show a basic concept of making a change of the irradiation angle in the vertical direction. Here, FIGS. 37(a) and 37(b) show a state corresponding to the narrowest irradiation angle range and FIGS. 38(a) and 38(b) show a state corresponding to the widest irradiation angle range. (a) and (b) in the figures are drawings of the same section. (b) is a light traced lines added to the sectional view in (a).

Furthermore, for simplicity of explanation, for the same reasons explained in the first embodiments, FIG. 37(b) and FIG. 38(b) show only luminous flux emitted from the center of the light source as representative luminous flux.

Here, of the optical configuration, mainly the differences from the embodiments in FIG. 35 and FIG. 36 will be explained. FIG. 37 shows a state in which there is a predetermined distance between the discharge tube 302 and optical member 344 and the most condensed state is obtained in this embodiment.

As shown in FIG. 37(a), a cylindrical lens surface 344a in the central area through which the optical axis passes and three prism section pairs peripheral thereto (constructed of refracting surfaces 344b, 344d, 344f, 344b', 344d', 344f' and reflecting surface 344c, 344e, 344g, 344c', 344e', 344g') have almost the same shapes as those in the embodiments in FIG. 35 and FIG. 36. The outermost area of the optical member 345 is constructed of flat surface sections 344h and 344h' in this embodiment.

Furthermore, reflection members 345 are formed as one body with the optical member 344 on the side of flat surface sections 344h and 344h' facing the light source. The reflection members 345 have a paraboloidal plane whose focal point is the center of the light source so that luminous flux emitted from the center of the light source is changed to luminous flux quasi-parallel to the optical axis in the most condensed state shown in FIG. 37.

Determining the shapes of members in this way, this embodiment can provide almost the same optical characteristic as that of the third embodiment. In the state of the widest irradiation angle shown in FIG. 38, the reflector 345 functions so as to widen the irradiation angle range having almost the same effects as those of the embodiments in FIG. 35 and FIG. 36.

Here, the reason that this embodiment uses the reflectors 345 formed as one body with the optical member 344 will be explained.

The first reason is that the outermost area including the reflecting surface 334i is a part having the largest thickness of the optical member 334 in the embodiments in FIG. 35 and FIG. 36, which can require more time to mold the optical member 344 and cause a cost increase. That is, this embodiment aims at making the overall thickness of the optical member 344 uniform to shorten the molding time.

This embodiment uses reflectors with a metallic reflecting surface as the reflectors 345 giving the highest priority to the cost, but the present invention is not limited to this mode. It is possible to provide a similar optical characteristic using a method of using these peripheral sections not as prisms but as the reflecting surfaces, that is, a method of constructing the reflecting surfaces with a thin material and using part of the material as a evaporated surface or constructing the reflecting surfaces with a high-reflectance thin material pasted instead of using a high-reflectance reflector.

The second reason is that this embodiment aims at reducing the weight of the optical member. The weight of the optical member largely depends on this outermost prism section and it is one of objects to reduce the weight of this part.

As shown above, this embodiment provides three pairs of reflecting surfaces (prism sections) for the optical member 344 and a pair of reflectors 345 peripheral thereto, constructing an optical system having four layers of reflecting surfaces in both the upper and lower sides as a whole, but the present invention is not limited to such an optical system having four layers. For example, it is also possible to provide two or more layers of reflectors or form inner reflecting surfaces, instead of outermost reflecting surfaces, using reflectors. As the number of reflecting surfaces increases, it is possible to construct a thinner optical system. As explained in the embodiments in FIG. 35 and FIG. 36, it is also possible to change the pitch of reflecting surfaces.

Figure 39:
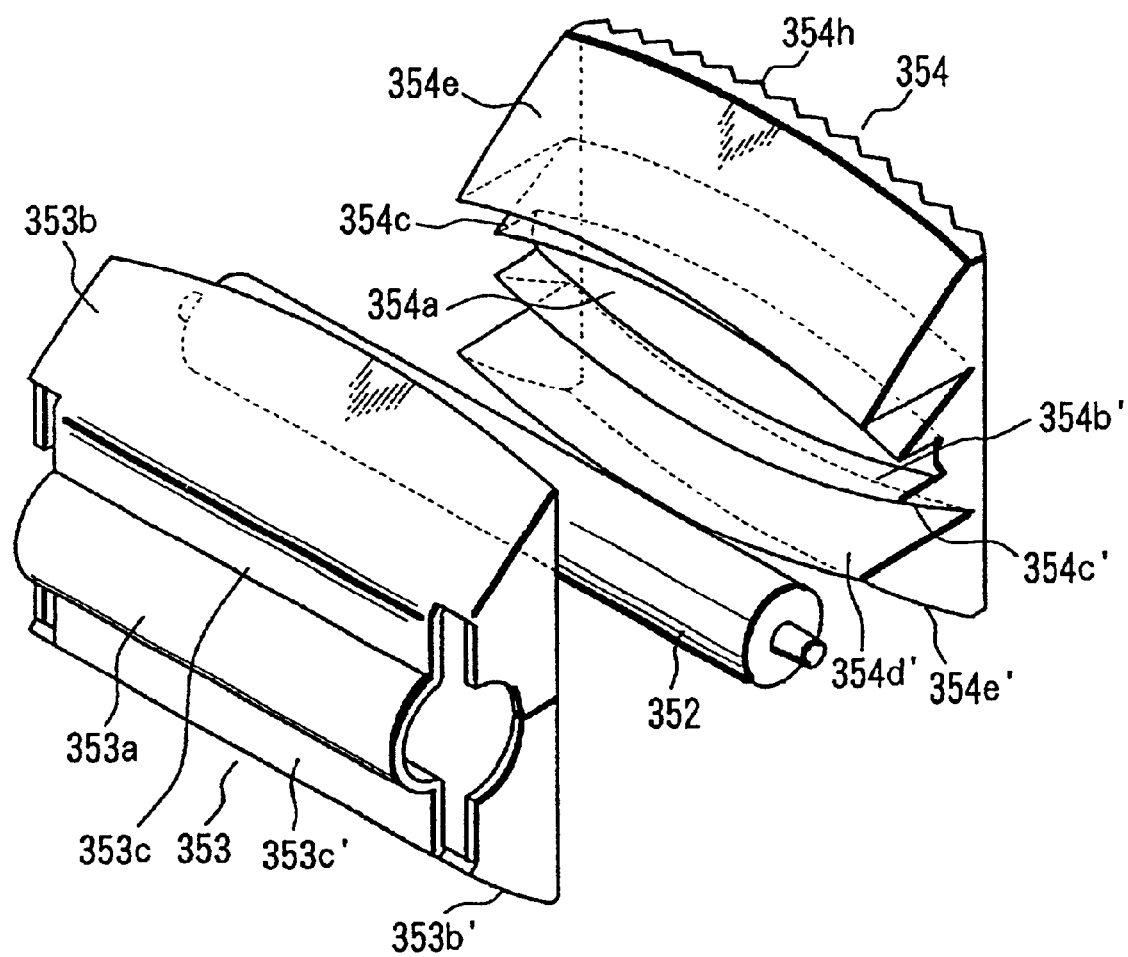
FIG. 39 is an exploded perspective view of an optical system of a lighting apparatus, which is another embodiment of the present invention.
Figure 40:
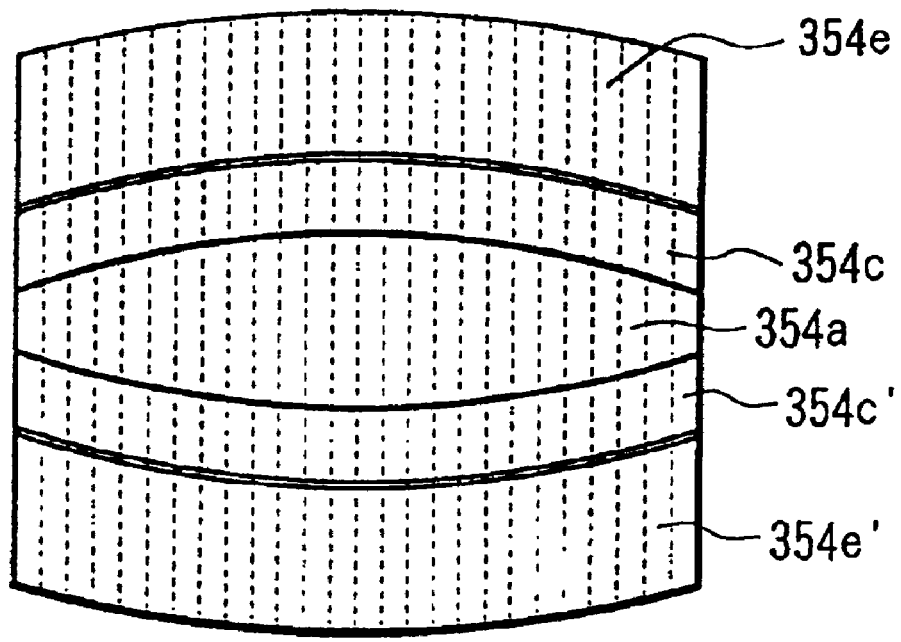
FIG. 40 is a rear view of the optical member making up the lighting apparatus in FIG. 39.

FIG. 39 and FIG. 40 show a configuration of a lighting apparatus, which is another embodiment of the present invention. This embodiment is an example of modification to the above-described embodiments in FIG. 24 to 27. FIG. 39 is an exploded perspective view of the optical system of the lighting apparatus and FIG. 40 is a rear view of only the optical member. Since light traced drawings and light distribution characteristics, etc. are almost the same as those of the other embodiments, and so detailed explanations thereof will be omitted.

This embodiment consists of two pairs of reflecting surfaces of the lighting optical system of the lighting apparatus explained in the embodiments in FIG. 24 to FIG. 27 and the optical member 354 with the shape on the entrance surface side modified three-dimensionally. This embodiment aims at mainly improving the light distribution characteristic toward four corners on the surface of the object.

The operation of changing the irradiation angle is performed by maintaining the discharge tube 352 and the reflector 353 as one body as in the case of the embodiments shown in FIG. 24 to FIG. 38 and changing the relation of positions between these members and the optical member 354 in the direction of the optical axis. The change of the irradiation angle range is the same as for the other embodiments.

In FIG. 39 and FIG. 40, reference numeral 352 denotes a cylindrical light source which is a light source, 353 denotes a reflector and 354 denotes a one-piece prism-like optical member. The functions of these members are almost equivalent to those of the embodiments in FIG. 24 to FIG. 27, but this embodiment is characterized by the shape of each surface on the discharge tube 352 side of the optical member 354.

In the same figure, the part of the reflector 353 covering the back of the discharge tube 352 is formed semi-cylindrical (hereinafter referred to as "semi-cylindrical section 353$a$") almost concentric with the discharge tube 352 and further includes toric surface 353$b$, 353$b$' covering the back of the outermost reflecting surfaces 354$e$, 354$e$' in the vertical direction of the optical member 354 and flat surface sections 353$c$, 353$c$' connecting these toric surfaces 353$b$, 353$b$' and semi-cylindrical section 353$a$.

On the other hand, a lens surface 354$a$ having positive refracting power in the direction perpendicular to the optical axis (vertical direction) is formed in the central area through which the optical axis passes on the entrance surface side of the optical member 354 and two layers each for upper and lower side (two pairs) of prism sections made up of refracting surfaces and reflecting surfaces are formed on the periphery on the entrance surface side.

This embodiment is different from the embodiments in FIG. 24 to FIG. 27 in that the lens surface 354$a$ in the central area and reflecting surfaces 354$c$, 354$c$', 354$e$, 354$e$' in the periphery are constructed of three-dimensional curved surfaces.

More specifically, a toric surface is formed as the lens surface 354$a$ in the central area and conical first refracting surfaces 354$b$, 354$b$' making up the prism section and toric-surfaced first reflecting surfaces 354$c$, 354$c$' are formed symmetrically with respect to the optical axis in the vertical direction in the area peripheral to the above-described toric surface.

In the area further peripheral thereto, conical second refracting surfaces 354$d$, 354$d$' making up the prism section and toric-surfaced second reflecting surfaces 354$e$, 354$e$' are formed symmetrically with respect to the optical axis in the vertical direction. Furthermore, a plurality of prism arrays is formed on the plane of outgoing light 354$h$.

A condensing operation and effect of shaping the optical member 354 in this way will be explained.

First, between the center of the lens surface and the peripheral sections of right and left direction, the toric lens surface 354$a$ deforms gradually, its width in the vertical direction decreases and refracting power in the direction perpendicular to the optical axis (vertical direction) at each position in the horizontal direction also changes gradually.

This makes the overall light distribution characteristic uniform and prevents variations of light distribution on the irradiation surface of an object, which are likely to occur on the boundary edge between the refracting surface and reflecting surface of the prism section.

Furthermore, constructing not only the central area with a toric surface but also constructing the reflecting surfaces 354$c$, 354$c$', 354$e$, 354$e$' in the peripheral sections with toric surfaces whose sectional shape in the horizontal and vertical directions changes gradually according to the position makes it possible to make the light distribution characteristic up to four corners of the irradiation range uniform.

Thus, this embodiment can construct a lighting optical system with a highly condensed light distribution with a narrow irradiation angle range as a whole by actions of the toric lens surface 354$a$ and the reflecting surfaces as two pairs of toric surfaces with respect to the luminous flux emitted from the center of the discharge tube 352.

Furthermore, segmenting the reflecting surfaces of the optical member 354 into smaller portions than the conventional arts and placing those segments in the vertical direction makes it possible to reduce the thickness of the optical member 354 as in the case of the above-described embodiments in FIG. 24 to FIG. 38. Moreover, since the boundary edge between the refracting surface and reflecting surface of the prism section goes away from the center of the light source, it is possible to prevent the optical resin material from being affected by radiant heat from the light source and reduce adverse influences on the optical characteristic.

Furthermore, using a toric-surfaced configuration for the lens surfaces and each reflecting surface, this embodiment has a specific effect of making it possible to easily construct a lighting optical system with a uniform light distribution characteristic toward four corners in the irradiation range without any additional special optical system.

As described above, the above-described embodiments in FIG. 24 to FIG. 30 can provide a lighting apparatus capable of drastically reducing the thickness of the system compared to the conventional variable range type lighting apparatus and using energy from the light source with high efficiency and obtaining a uniform light distribution characteristic on the irradiation surface.

Furthermore, this embodiment can provide a thin-shaped lighting apparatus capable of obtaining a uniform light distribution characteristic by providing a pair or a plurality of pairs of reflection sections arranged in the direction perpendicular to the optical axis within the plane including the radial direction of the light source centered on the optical axis.

Furthermore, by setting angle α formed by light emitted from the center of the light source and incident on the above-described reflecting sections with the optical axis within the range:

$$20°≤α≤70°$$

this embodiment can reduce both the thickness and the size in the vertical direction of the lighting apparatus at the same time.

Then, the above-described lighting apparatus can be mounted on a small image pickup apparatus, especially a card type image pickup apparatus as a lighting apparatus whose irradiation range can be changed.

What is claimed is:

1. A lighting apparatus comprising:
    a light source;
    an optical member which is placed in front of said light source and provided with a reflecting surface to reflect light from said light source forward;
    wherein said optic member includes a plurality of pairs of said reflecting surfaces arranged on both sides of the optical axis within a plane including the radial direction of said light source in the direction perpendicular to the optical axis.

2. The lighting apparatus according to claim 1,
    wherein said optic member comprises a prism section provided with a refracting surface that receives light incident from said light source and a reflecting surface that reflects the light incident from the refracting surface, and
    a plurality of pairs of said prism sections are formed on said optical member, arranged on both sides of the optical axis within the plane including the radial direction of said light source in the direction perpendicular to the optical axis.

3. The lighting apparatus according to claim 1, wherein a lens section having positive refracting power is formed on and close to the optical axis on the entrance surface side of said optical member and said plurality of reflecting surface pairs is formed in the peripheral section.

4. The lighting apparatus according to claim 1,
    wherein said light source has a cylindrical shape, and
    a prism array having refracting power in the longitudinal direction of said light source is formed on the exit surface side of said optical member.

5. The lighting apparatus according to claim 1, wherein said reflecting surface is a curved surface.

6. The lighting apparatus according to claim 2, wherein an edge in said light source side formed by an intersection between said refracting surface and said reflecting surface of each of prism section is located closer to said light source side for a prism section which is farther from the optical axis in the direction perpendicular to the optical axis within the plane including the radial direction of said light source.

7. The lighting apparatus according to claim 2, wherein said edges of a pair of prism sections of said plurality of prism section pairs, farthest from the optical axis within the plane including the radial direction of said light source in the direction perpendicular to the optical axis is placed substantially in the same position as the center position of said light source in the direction of the optical axis.

8. The lighting apparatus according to claim 2, further comprising a reflection member which is placed behind said light source and which reflects light from said light source forward,
    wherein said reflection member extends to a position to cover at least part of the reflecting surface of a pair of prism sections of said plurality pairs of prism sections, farthest from the optical axis within the plane including the radial direction of said light source in the direction perpendicular to the optical axis.

9. The lighting apparatus according to claim 3, wherein each of said reflecting surface is shaped in such a way that the irradiation range of light irradiated through each of said reflecting surface and the irradiation range of light irradiated through said lens section substantially overlap with each other.

10. The lighting apparatus according to claim 1, wherein the irradiation range of light irradiated from said optical member is made variable by changing a relation of positions in the direction of the optical axis between said light source and said optical member.

11. An image pickup apparatus comprising:
    a light source; and
    an optical member which is placed in front of said light source and provided with a reflecting surface that reflects light from said light source forward,
    wherein a plurality of pairs of said reflecting surfaces is formed on said optical member, arranged on both sides of the optical axis within a plane including the radial direction of said light source in the direction perpendicular to the optical axis.

12. The image pickup apparatus according to claim 11,
    wherein said optical member comprises a prism section provided with a refracting surface that receives light incident from said light source and a reflecting surface that reflects the light incident form refracting surface, and
    a plurality of pairs of said prism sections is formed on said optical member, arranged on both sides of the optic axis within the plane including the radial direction of said light source in the direction perpendicular to the optical axis.

13. The image pickup apparatus according to claim 11, wherein a lens section having positive refracting power is formed on and close to the optical axis on the entrance surface side of said optical member and said plurality of reflecting surface pairs is formed in the peripheral section.

14. The image pickup apparatus according to claim 11,
    wherein said light source has a cylindrical shape, and
    a prism array having a refracting power in the longitudinal direction of said light source is formed on the exit surface side of said optical member.

15. The image pickup apparatus according to claim 11, wherein said reflecting surface is a curved surface.

16. The image pickup apparatus according to claim 12, wherein an edge in said light source side formed by an intersection between said refracting surface and said reflecting surface of each prism section is located closer to said light source side for a prism section which is farther from the optical axis in the direction perpendicular to the optical axis within the plane including the radial direction of said light source.

17. The image pickup apparatus according to claim 12, wherein said edges of a pair of prism sections of said plurality of prism section pairs, farthest from the optical axis within the plane including the radial direction of said light source in the direction perpendicular to the optical axis is placed substantially in the same position as the center position of said light source in the direction of the optical axis.

18. The image pickup apparatus according to claim 12, further comprising a reflection member which is placed behind said light source and which reflects light from said light source forward, wherein said reflection member extends to a position to cover at least part of the reflecting surface of a pair of prism sections of said plurality pairs of prism sections, farthest from the optical axis within the plane including the radial direction of said light source in the direction perpendicular the optical axis.

19. The image pickup apparatus according to claim 13, wherein each of said reflecting surface is shaped in such a way that the irradiation range of light irradiated through each of said reflecting surface and the irradiation range of light irradiated through said lens substantially overlap with each other.

20. The image pickup apparatus according to claim 11, having a card type configuration.

21. The image pickup apparatus according to claim 11, wherein the irradiation range of light irradiated from said optical member is made variable by changing a relation of positions in the direction of the optical axis between said light source and said optical member.

* * * * *

UNITED STATES PATENT AND TRADEMARK OFFICE
CERTIFICATE OF CORRECTION

PATENT NO. : 6,850,375 B2
DATED : February 1, 2005
INVENTOR(S) : Yoshiharu Tenmvo It is certified that error appears in the above-identified patent and that said Letters Patent is hereby corrected as shown below:

Column 67,
Lines 39 and 65, delete "said optic" and insert -- said optical --.

Signed and Sealed this

Twenty-eighth Day of March, 2006

JON W. DUDAS
*Director of the United States Patent and Trademark Office*